(12) United States Patent
Fukuda et al.

(10) Patent No.: US 8,610,952 B2
(45) Date of Patent: Dec. 17, 2013

(54) PRINTING CONTROL DEVICE AND PRINTING CONTROL PROGRAM

(75) Inventors: Masami Fukuda, Shiojiri (JP); Nao Kaneko, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 13/407,323

(22) Filed: Feb. 28, 2012

(65) Prior Publication Data

US 2012/0218574 A1   Aug. 30, 2012

(30) Foreign Application Priority Data

Feb. 28, 2011   (JP) ................................ 2011-041887

(51) Int. Cl.
*H04N 1/60*   (2006.01)
*G06F 3/12*   (2006.01)
*G06K 15/02*   (2006.01)

(52) U.S. Cl.
USPC .............. 358/1.9; 358/1.1; 358/1.2; 358/1.15

(58) Field of Classification Search
USPC ................... 358/1.9, 1.1, 1.2, 1.15
See application file for complete search history.

(56) References Cited

U.S. PATENT DOCUMENTS

| | | | | |
|---|---|---|---|---|
| 6,827,418 | B2 * | 12/2004 | Otokita | 347/19 |
| 6,940,612 | B1 * | 9/2005 | Murai | 358/1.1 |
| 7,147,296 | B2 * | 12/2006 | Kakutani | 347/15 |
| 7,542,167 | B2 | 6/2009 | Ito et al. | |
| 7,611,219 | B2 * | 11/2009 | Kakutani | 347/15 |
| 2004/0036897 | A1 * | 2/2004 | Yamauchi | 358/1.9 |
| 2006/0176529 | A1 | 8/2006 | Ito et al. | |

FOREIGN PATENT DOCUMENTS

| | | |
|---|---|---|
| JP | 2006/103640 A | 4/2006 |
| JP | 2006/197080 A | 7/2006 |
| JP | 2006-217150 A | 8/2006 |
| JP | 2007/511175 A | 4/2007 |
| JP | 2009/220356 A | 10/2009 |
| JP | 2011/005875 A | 1/2011 |
| WO | 2005/043889 A1 | 5/2005 |

* cited by examiner

*Primary Examiner* — Twyler Haskins
*Assistant Examiner* — Henok Shiferaw
(74) *Attorney, Agent, or Firm* — Nutter McClennen & Fish LLP; John J. Penny, V.

(57) ABSTRACT

Provided is a printing control device capable of: a reception process of receiving designation of a printing medium; an adjustment process of adjusting a printing apparatus in accordance with a printing result of a first test pattern; a color conversion table generation process of generating a color conversion table for the designated printing medium; and a profile generation process of generating a device profile of the printing apparatus on the basis of a colorimetric value of a second test pattern by performing color conversion on data, which represents the second test pattern, through the color conversion table, and by causing the printing apparatus to print the second test pattern.

8 Claims, 30 Drawing Sheets

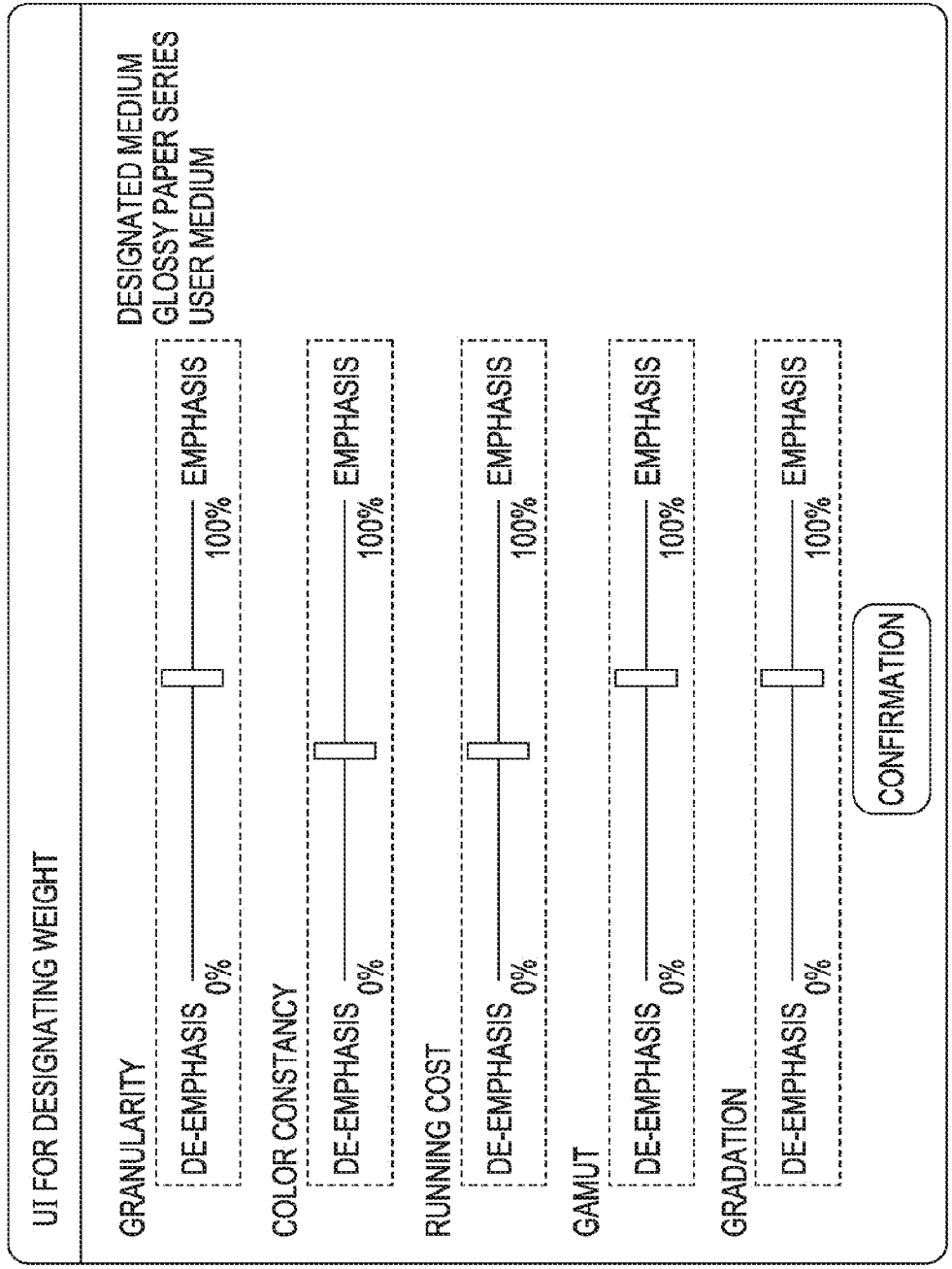

FIG. 4

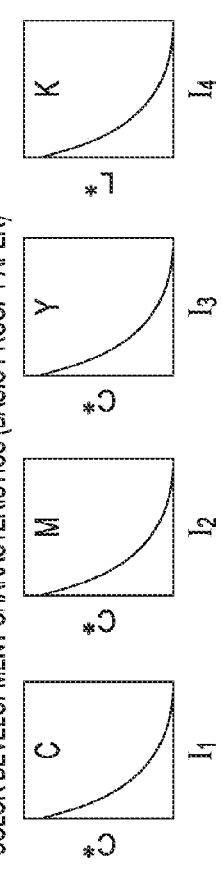

| MEDIUM | TYPE | DEFAULT WEIGHT | | | | | | DUTY LIMIT | | | | | |
|---|---|---|---|---|---|---|---|---|---|---|---|---|---|
| | | GRANULARITY | COLOR CONSTANCY | RUNNING COST | GAMUT | GRADATION | | C | M | ... | M+Y | C+M+Y+K |
| BASIC GLOSSY PAPER | GLOSSY PAPER TYPE | 60% | 50% | 50% | 60% | 60% | | 237 | 236 | ... | 249 | 247 |
| BASIC MATTE PAPER | MATTE PAPER TYPE | 50% | 50% | 50% | 50% | 50% | | 245 | 241 | ... | 249 | 250 |
| BASIC PLAIN PAPER | PLAIN PAPER TYPE | 50% | 50% | 70% | 30% | 50% | | 250 | 247 | ... | 247 | 254 |
| BASIC PROOF PAPER | PROOF PAPER TYPE | 50% | 50% | 50% | 80% | 50% | | 241 | 247 | ... | 237 | 252 |
| USER MEDIUM | GLOSSY PAPER TYPE | 60% | 50% | 50% | 60% | 60% | | — | — | ... | — | — |
| USER MEDIUM | MATTE PAPER TYPE | 50% | 50% | 50% | 50% | 50% | | — | — | ... | — | — |
| USER MEDIUM | PLAIN PAPER TYPE | 50% | 50% | 70% | 30% | 50% | | — | — | ... | — | — |
| USER MEDIUM | PROOF PAPER TYPE | 50% | 50% | 50% | 80% | 50% | | — | — | ... | — | — |
| USER MEDIUM | UNCLASSIFIED TYPE | 50% | 50% | 50% | 50% | 50% | | — | — | ... | — | — |

COLOR DEVELOPMENT CHARACTERISTICS (BASIC PROOF PAPER)

FIG. 5

| MEDIUM | WEIGHT | | | | COLOR TONE OF GRAY TARGET | | DUTY LIMIT | | | | |
|---|---|---|---|---|---|---|---|---|---|---|---|
| | GRANULARITY | COLOR CONSTANCY | RUNNING COST | GAMUT | GRADATION | a* | b* | C | M | ... | M+Y | C+M+Y+K |
| BASIC GLOSSY PAPER | 60% | 60% | 40% | 60% | 60% | 0 | 0 | 237 | 236 | ... | 249 | 247 |

STB (BASIC MEDIUM) (SUBSTITUTED MEDIUM)

| MEDIUM | WEIGHT | | | | COLOR TONE OF GRAY TARGET | | REFERENCE DUTY LIMIT | | | | |
|---|---|---|---|---|---|---|---|---|---|---|---|
| | GRANULARITY | COLOR CONSTANCY | RUNNING COST | GAMUT | GRADATION | a* | b* | C | M | ... | M+Y | C+M+Y+K |
| USER MEDIUM | 60% | 50% | 50% | 60% | 60% | 5 | 6 | 237 | 236 | ... | 249 | 247 |

STB (SUBSTITUTE MEDIUM)

| CONVERSION COEFFICIENT | PSEUDO-DUTY LIMIT | | | | |
|---|---|---|---|---|---|
| γ | C | M | ... | M+Y | C+M+Y+K |
| 0.8 | 190 | 189 | ... | 199 | 198 |

FIG. 11A
STEP S100
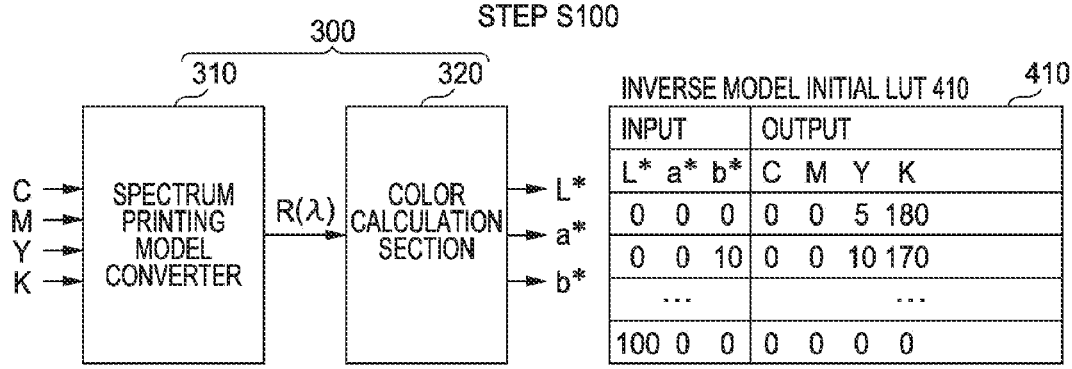
FIG. 11B
STEP S200
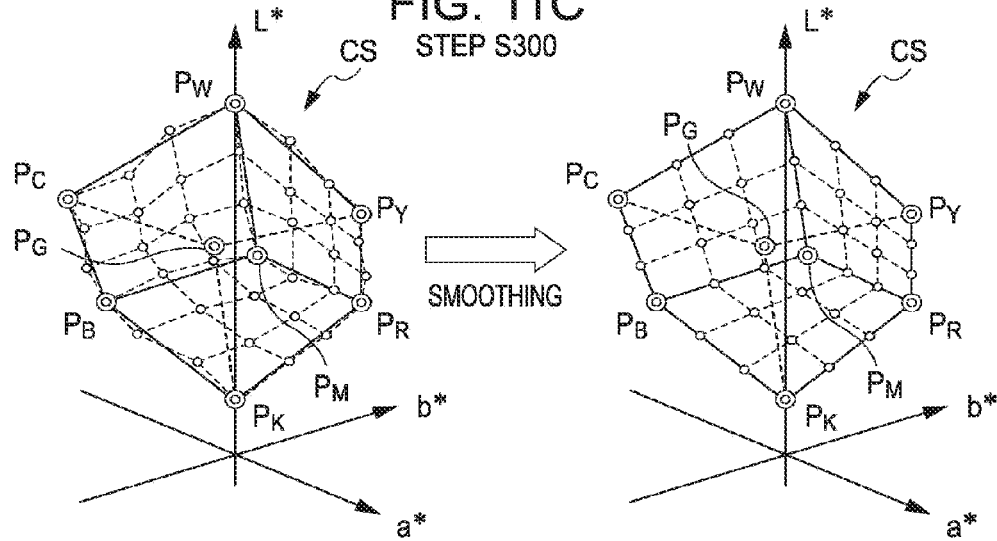
FIG. 11C
STEP S300

COLOR POINTS OF INPUT COLOR COORDINATE SYSTEM

COLOR POINTS OF L*a*b* COLOR COORDINATE SYSTEM (BEFORE SMOOTHING)

COLOR POINTS OF L*a*b* COLOR COORDINATE SYSTEM (AFTER SMOOTHING)

SMOOTHING

FIG. 13A
STEP S100
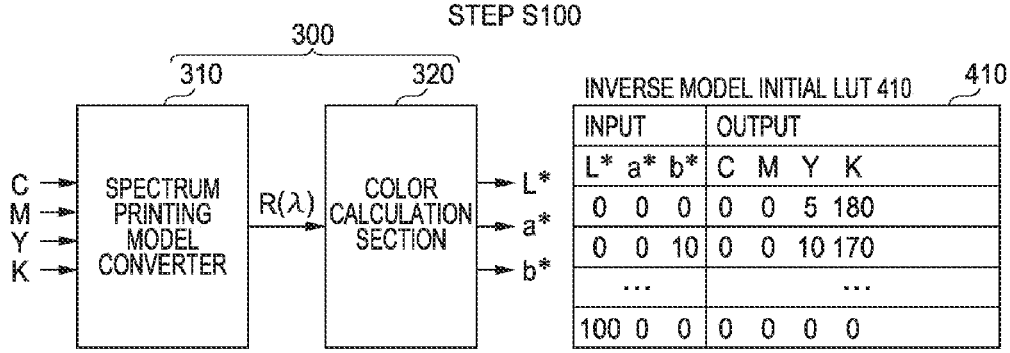
FIG. 13B
STEP S200
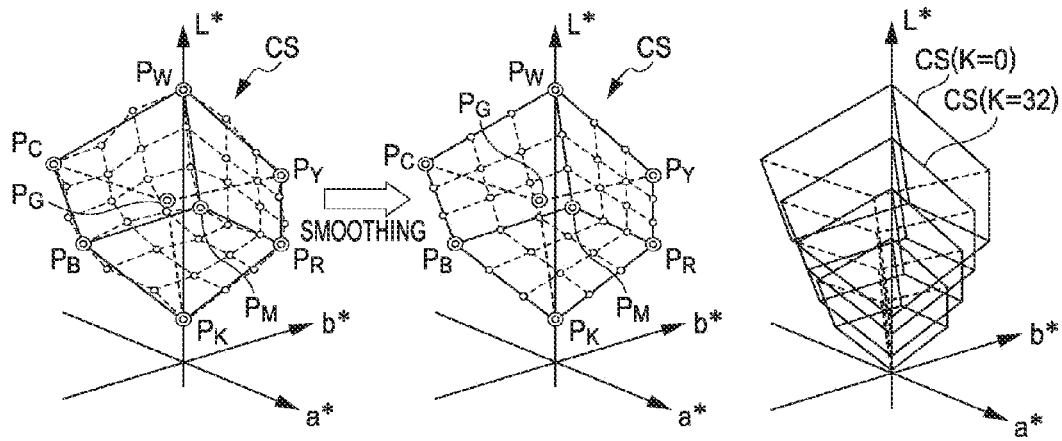
FIG. 13C
STEP S300

FIG. 14

DYNAMIC MODEL

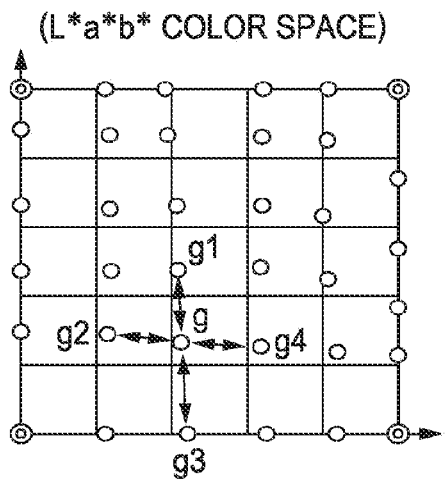

(L*a*b* COLOR SPACE)

VIRTUAL RESULTANT FORCE RELATING TO COLOR POINT OF INTEREST g AMONG NON-UNIFORM COLOR POINTS $$\vec{F}_{pg} = \vec{F}_g - k_v \vec{V}_g$$
$$= k_p \sum_{n=1}^{N} (\vec{X}_{gn} - \vec{X}_g) - k_v \vec{V}_g$$

$\vec{F}_{pg}$ : VIRTUAL RESULTANT FORCE
  (ATTRACTION FORCE + RESISTANCE FORCE)

$\vec{F}_g$ : SUM OF ATTRACTION FORCE OF COLOR POINT OF INTEREST g RECEIVED FROM ADJACENT COLOR POINTS gn $-k_v \vec{V}_g$ : RESISTANCE FORCE DEPENDING ON VELOCITY $\vec{V}_g$ : VELOCITY VECTOR OF COLOR POINT OF INTEREST g $\vec{X}_g$ : POSITION VECTOR OF COLOR POINT OF INTEREST g $\vec{X}_{gn}$: POSITION VECTOR OF ADJACENT COLOR POINTS gn $k_p, k_v$ : COEFFICIENTS

FIG. 18A
COLOR POINTS AS SMOOTHING
PROCESSING TARGETS
(L*a*b* COLOR SPACE)

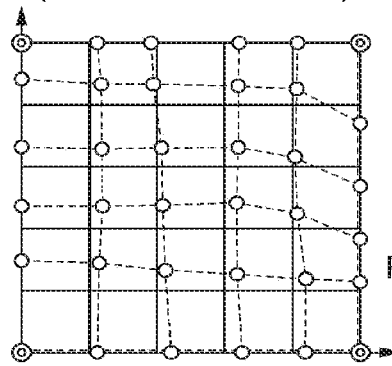

FIG. 18B
AFTER INFINITESIMAL SHIFT
BASED ON DYNAMIC MODEL
(L*a*b* COLOR SPACE)

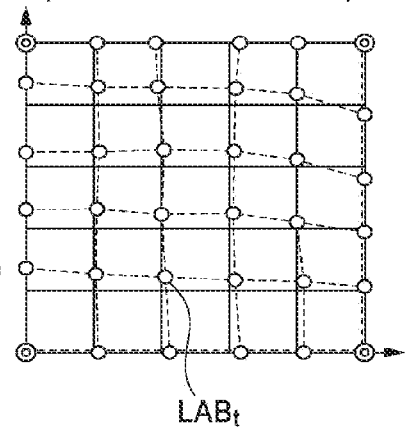

SMOOTHING PROCESSING $LAB_t$

FIG. 18C
INK AMOUNT SEARCH
(OPTIMIZATION PROCESSING BY QUADRATIC PROGRAMMING)

SEARCH FOR INK AMOUNT MINIMIZING OBJECTIVE FUNCTION E $$E = w_{L*}(\Delta L^* - \Delta L^*_t)^2 + w_{a*}(\Delta a^* - \Delta a^*_t)^2 + w_{b*}(\Delta b^* - \Delta b^*_t)^2$$
$$+ w_{GI}(\Delta GI - \Delta GI_t)^2$$
$$+ w_{CII(A)}(\Delta CII_A - \Delta CII_{At})^2 + \cdots + w_{CII(F12)}(\Delta CII_{F12} - \Delta CII_{F12t})^2$$
$$+ w_{GMI}(\Delta GMI - \Delta GMI_t)^2$$
$$+ w_{TI}(\Delta TI - \Delta TI_t)^2 \qquad \cdots (EQ1)$$

$$E = \frac{1}{2} I^T A I - g I \qquad \cdots (EQ2)$$

FIG. 18D
RECALCULATE Lab VALUES FROM INK AMOUNTS

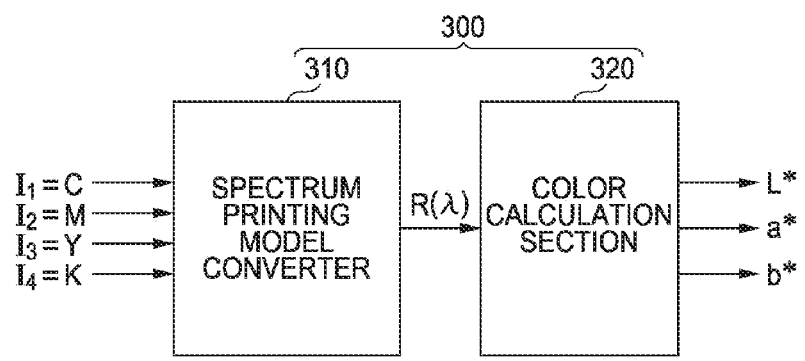

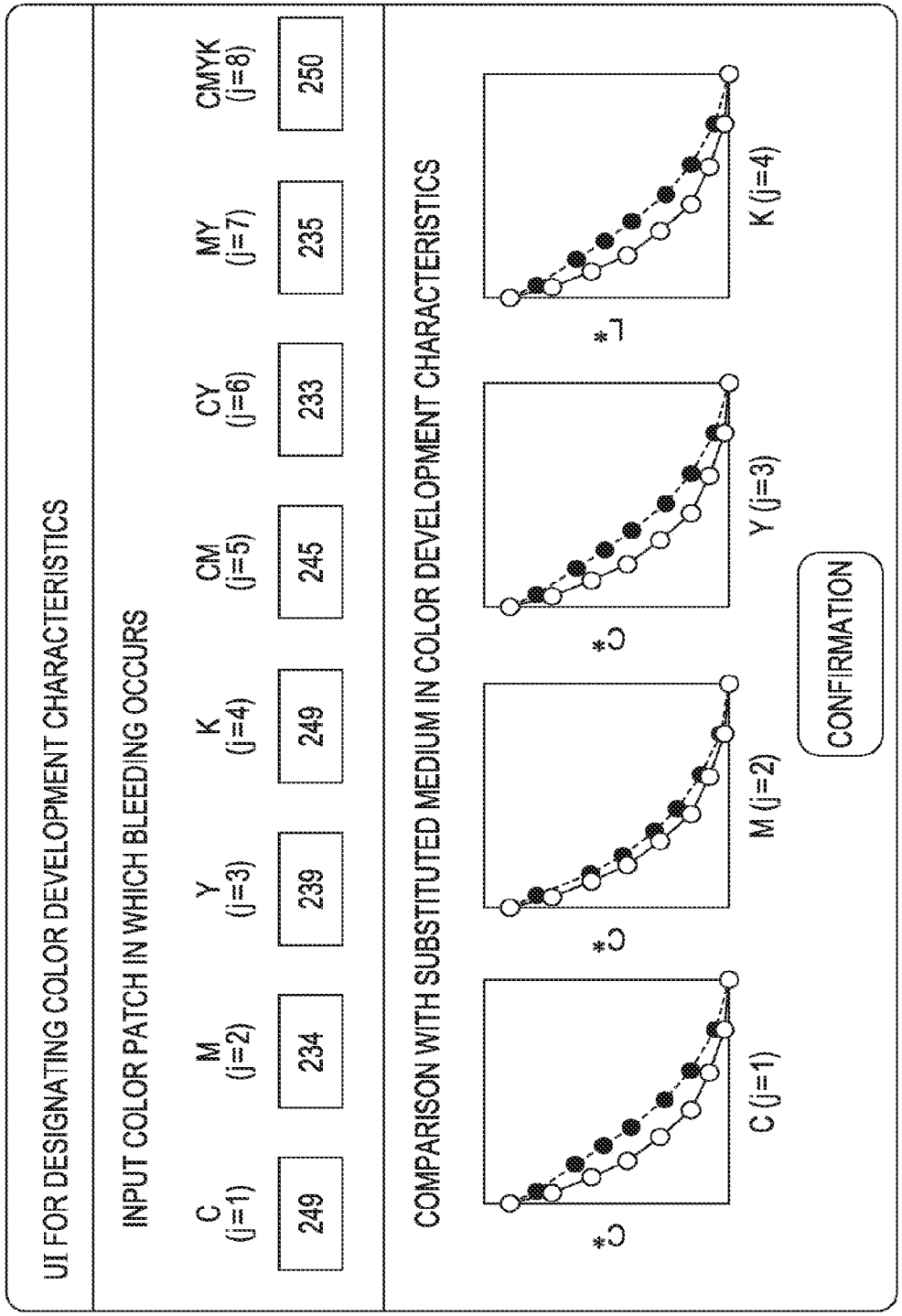

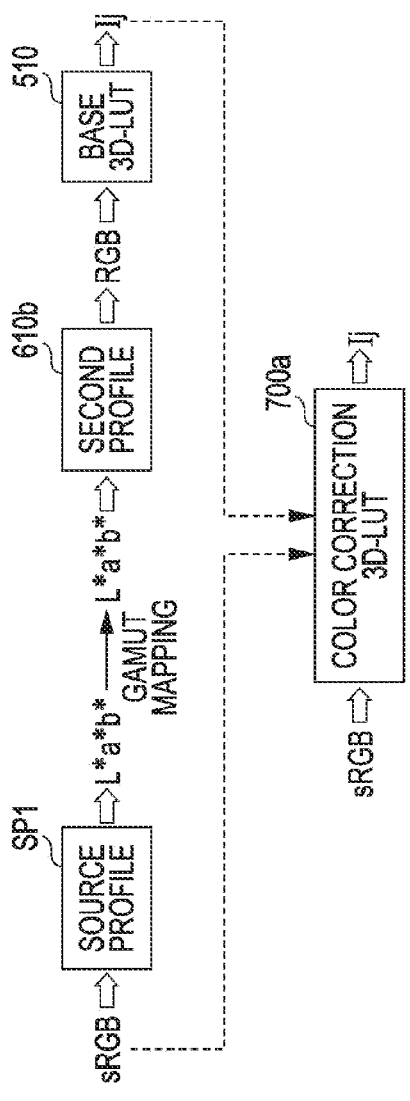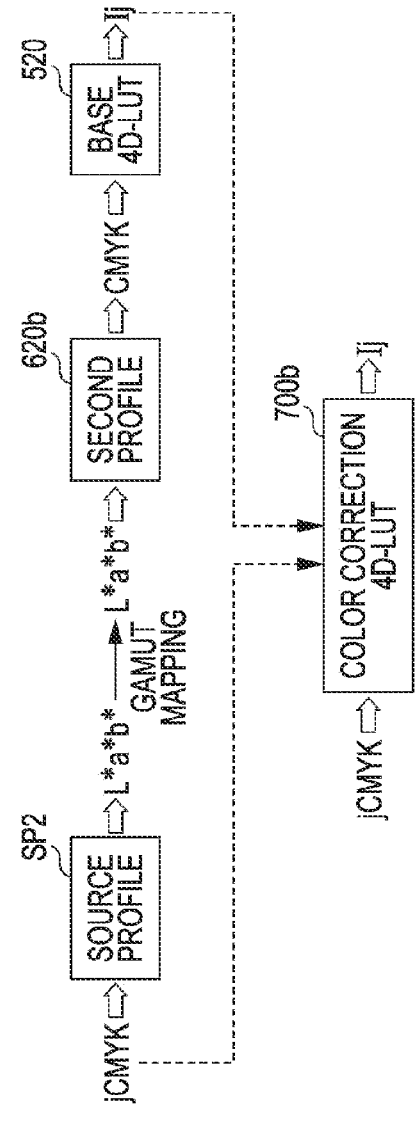
FIG. 27A
CONVERSION PROCESSING FOR TEST PRINTING USING DEVICE 3D-PROFILE
FIG. 27B
CONVERSION PROCESSING FOR TEST PRINTING USING DEVICE 3D-PROFILE

FIG. 29

UI FOR RECEIVING RATING

PLEASE SELECT PRESENT PROBLEM

◉ ANY OF COLOR TONE, GRANULARITY,
  AND GRADATION OF PRINTING RESULT IS UNSATISFACTORY

○ IN PRINTING RESULT, BANDING (STRIPE-LIKE UNEVENNESS) OCCURS

○ IN PRINTING RESULT, EITHER OF BLEEDING AND BLURRING OCCURS

○ OTHERS
  DETAIL

CONFIRMATION

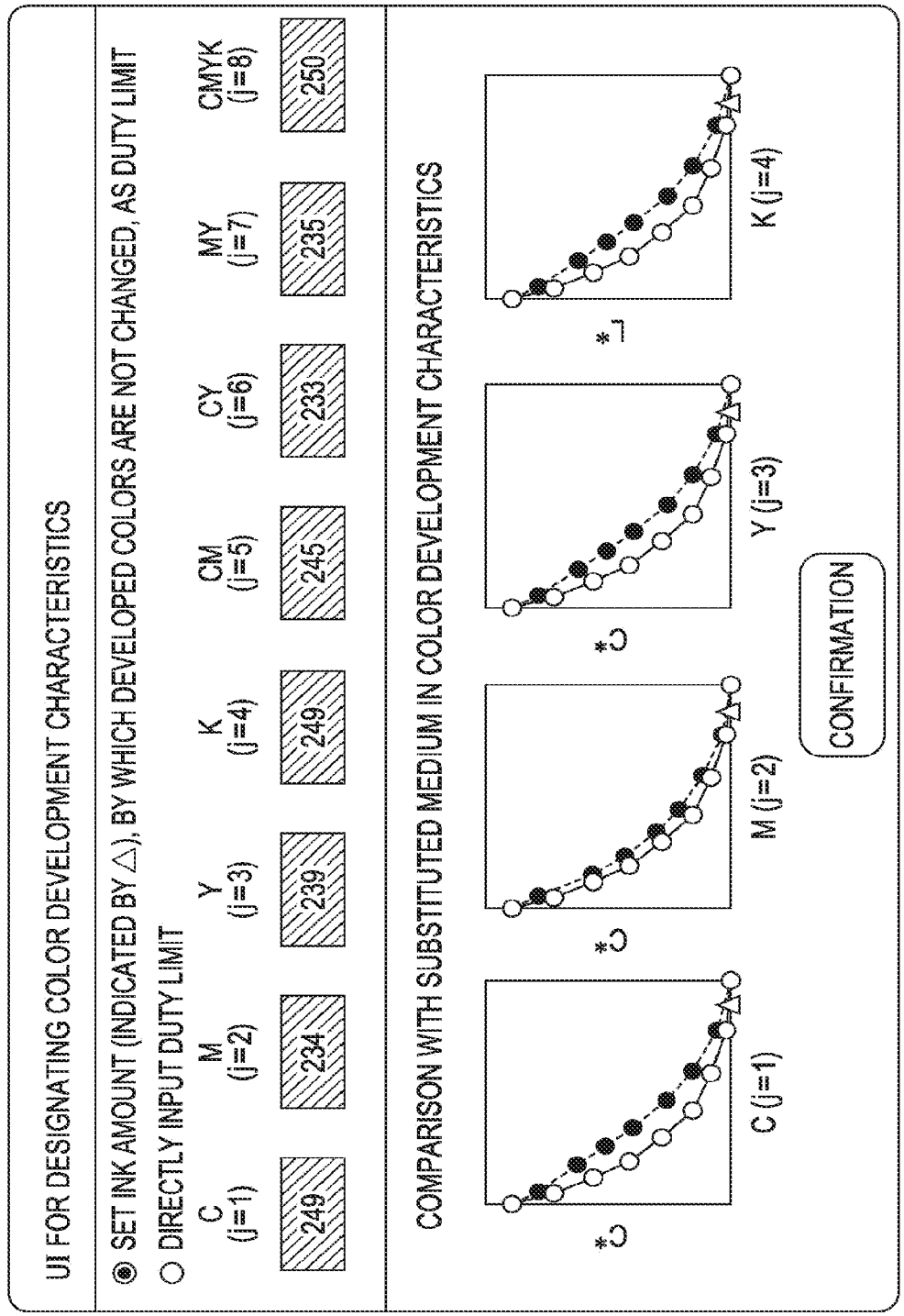

PRINTING CONTROL DEVICE AND PRINTING CONTROL PROGRAM

BACKGROUND

1. Technical Field

The present invention relates to a technique of creating a color conversion table and a device profile.

2. Related Art

The color conversion table is information that represents a correspondence relationship between an input color coordinate system and an output color coordinate system. Coordinate values of the input color coordinate system of the color conversion table represent positions of points in the color space of the input color coordinate system, and coordinate values of the output color coordinate system represent positions of points in the color space of the output color coordinate system. In addition, in the present specification, an arbitrary point in the color space is referred to as a "color point" or "grid point". Further, the color point, represented by an input value registered in the color conversion table, and the color point, represented by an output value registered therein, are respectively referred to as an "input grid point" and an "output grid point".

As a technique of a smoothing arrangement of the input grid points and the output grid points of the color conversion table, for example, there is a technique disclosed in JP-A-2006-197080 by the applicants of the present application. In this smoothing, after the grid points of the Lab color coordinate system are shifted, through an optimization process using an objective function, an ink amount which is optimal to reproduce L*a*b* grid points after the shift, is determined. The optimal ink amount is determined as an ink amount minimizing the objective function.

Further, as a known conversion table setting method, there is a method of setting a conversion table corresponding to a certain medium among multiple kinds of media, each having a known conversion table which is used as a reference when the input picture data is converted into print data, as a conversion table corresponding to a medium whose type is unknown (JP-A-2009-220356).

However, for each type of the printing media, the color development characteristic (color value characteristic) in a case of using the same ink amount is different, and the ink amount (duty limit) which can be adhered onto a unit area is different. For this reason, there is a problem in that it is necessary to provide an objective function for each type of printing media in order to create a color conversion table for each of the multiple printing media. Further, the objective function includes a term for rating picture quality on the basis of color values of reproduced colors when inks with respective ink amounts are adhered onto a printing medium. For this reason, there is a problem in that a color prediction model, which is for predicting color values on the basis of the amounts of ink, and the like have to be provided for each type of printing media. However, great efforts and resources are necessary to provide the color prediction model and the like in advance for each type of printing media, and originally it is difficult to provide the color prediction model and the like for an unknown printing medium. Accordingly, until now, particularly, as for a printing medium which is arbitrarily selected by a general user in his house or working place, even when the color conversion table defining amounts of ink for reproducing favorable colors on the printing medium is intended to be created, there is the above-mentioned restriction (the restriction that it is difficult to provide the color prediction model and the like corresponding to the printing medium which is arbitrarily selected), and thus it has been difficult to create an optimal color conversion table. Further, in JP-A-2009-220356, the conversion table corresponding to the medium included in the multiple types of media each having a known conversion table is substituted for a conversion table corresponding to an unknown type medium. Hence, it is difficult to create a color conversion table most appropriate for the printing medium which is arbitrarily selected by a user.

Further, when a printing process is performed by using the color conversion table or the device profile which is created by a user, the user may not satisfy the printing result (picture quality). In such a case, although the user intends to perform a certain process for obtaining a satisfactory printing result, it is difficult for the user, who is largely inexperienced at the printing process, to know which process should be performed for which printing result.

SUMMARY

An advantage of some aspects of the invention is to provide a printing control device and a printing control program capable of generating a color conversion table or a profile most appropriate for a printing medium, which is arbitrarily designated by a user, and implementing optimal processing when a user's rating on the printing result is low.

According to an aspect of the invention, there is provided a printing control device capable of performing: a reception process of receiving designation of a printing medium; an adjustment process of adjusting a setting of a printing environment of a printing apparatus based on a printing result of a first test pattern, which is for determining whether or not the setting is favorable, by causing at least a printing apparatus to print the first test pattern on the designated printing medium; a color conversion table generation process of generating a color conversion table for the designated printing medium by determining an ink amount, which is for reproducing a color value indicated by a grid point of a device-independent color coordinate system, through ink amount optimization using an objective function, which is for rating picture quality obtained when an ink is adhered onto a basic printing medium different from the designated printing medium, after the adjustment process, and by defining a correspondence relationship between a grid point of a predetermined input color coordinate system and an ink amount into which the determined ink amount is converted on the basis of a conversion relationship between an ink color development characteristic of the basic printing medium and an ink color development characteristic of the designated printing medium; and a profile generation process of generating a device profile, which defines characteristics of the printing apparatus, on the basis of a colorimetric value of a second test pattern, by performing color conversion on data, which represents the second test pattern, through the generated color conversion table, and by causing the printing apparatus to print the second test pattern on the designated printing medium on the basis of the color-converted data. When receiving a prescribed low rating on the printing which is performed on the designated printing medium by the printing apparatus through printing control processing including the color conversion based on the generated device profile, in accordance with contents of the rating, the printing control device performs at least one of the adjustment process, the color conversion table generation process, and the profile generation process.

According to the aspect of the invention, it is possible to generate the color conversion table and the device profile based on the table most appropriate for the printing medium which is arbitrarily designated by a user. Further, when the printing result in the printing after the device profile is used is that the user's rating is low, in accordance with contents of the rating, at least any one of the adjustment process, the color conversion table generation process, and the profile generation process is further performed. Hence, a user is able to obtain the optimal color conversion table and device profile.

In the color conversion table generation process, the printing control device may cause the printing apparatus to print a third test pattern on the designated printing medium, acquire a limit of an ink amount, which can be adhered onto the designated printing medium, and the color development characteristic of the designated printing medium on the basis of the printing result of the third test pattern, and restrict a range of the ink amount in the case of determining the ink amount through the optimization on the basis of the limit.

With such a configuration, the printing environment of the printing apparatus is optimized by performing the adjustment process, and subsequently the third test pattern is printed. Hence, it is possible to reliably obtain the color development characteristic and the limit of the ink amount for the designated printing medium.

There are various combinations between the contents of the low rating determined by a user and the processing which should be performed in accordance with the rating. For example, when receiving a low rating on any of color tone, granularity and gradation in the printing result, by performing the profile generation process, the printing control device may adjust a predetermined parameter having an effect on a conversion characteristic of the device profile in the profile generation process.

With such a configuration, by regenerating the device profile while adjusting the parameter, it is possible to provide the optimal device profile to a user.

Further, when receiving the low rating on the color tone, the granularity, and the gradation, the printing control device may perform color conversion on data, which represents a fourth test pattern, on the basis of the color conversion table, cause the printing apparatus to print the fourth test pattern on the designated printing medium on the basis of the color-converted data, compare a predetermined reference value with a colorimetric value of the fourth test pattern, perform calibration for correcting an ink amount, which is defined by the color conversion table, on the basis of the comparison result, and subsequently perform the profile generation process. That is, after the color conversion table is corrected such that the output change caused by the temporal change of the printing apparatus due to the calibration is compensated, the device profile may be created.

Further, when receiving a low rating to the effect that color unevenness is present in the printing result, the printing control device may perform the adjustment process. In the adjustment process, the printing control device may perform processing of printing the first test pattern, which is for determining whether or not setting of an amount of feed is favorable when the printing apparatus transports the printing medium, and adjusting the amount of feed in accordance with the printing result of the first test pattern, and/or processing of printing the first test pattern, which is for determining whether or not setting of a gap between a printing head provided in a printing apparatus and a platen on which the transported printing medium is placed is favorable, and adjusting the gap in accordance with the printing result of the first test pattern.

With such a configuration, by performing the adjustment, which is effective to resolve color unevenness, on the platen gap or adjusting the amount of feed in the printing apparatus, it is possible to appropriately improve the printing result.

Further, when receiving a low rating to the effect that either bleeding or blurring occurs in the printing result, the printing control device may perform the adjustment process. In the adjustment process, the printing control device may print the first test pattern, which is for determining whether or not setting for drying a printed image is favorable, and adjusts the setting for the drying in accordance with the printing result. With such a configuration, by performing the adjustment, which is effective to resolve bleeding and blurring, on the setting for drying the printed picture, it is possible to appropriately improve the printing result.

Further, when an adjustment amount is equal to or greater than a predetermined amount in the adjustment process which is performed in accordance with occurrence of color unevenness, bleeding, blurring, and the like, the printing control device may further perform the profile generation process, or perform the color conversion table generation process and the profile generation process. With such a configuration, by adjusting various printing environments such as the setting of the amount of feed, the platen gap, and the drying, it may be predicted that the printing result after the adjustment is greatly changed. In this case, since the color conversion table or the device profile may be regenerated, by using the regenerated color conversion table or device profile, a user is able to thereafter obtain the optical printing result.

The technical scope of the invention can be embodied by something other than the printing control device. For example, it may be possible to adopt an embodiment of the invention of a method including a process performed by the printing control device, or an embodiment of the invention of a program that realizes a process performed by the printing control device in a computer and controls the printing apparatus. Further, it may be possible to adopt an embodiment of the invention of a printing apparatus, in which the color conversion table or profile created as described above is built and the profile or the like is used in the color conversion process of the picture data, (a printing apparatus that adheres the ink amount obtained by performing the color conversion with reference to the profiles onto the printing medium), a method corresponding to the printing apparatus, a program, and a method of manufacturing the printing apparatus.

BRIEF DESCRIPTION OF THE DRAWINGS

The invention will be described with reference to the accompanying drawings, wherein like numbers reference like elements.

FIG. 3 is a diagram illustrating a picture of a UI for weight designation.

FIG. 4 is a diagram illustrating an example of a medium table MTB.

FIG. 5 is a diagram illustrating an example of a setting table STB.

FIGS. 11A to 11C are explanatory diagrams illustrating processing contents in a case of creating a base 3D-LUT through steps S100 to S300 of FIG. 10.

FIGS. 13A to 13C are explanatory diagrams illustrating processing contents in a case of creating a base 4D-LUT through steps S100 to S300 of FIG. 10.

FIG. 14 is an explanatory diagram illustrating a dynamic model used in smoothing processing.

FIGS. 18A to 18D are explanatory diagrams illustrating processing contents of steps T120 to T150 of FIG. 16.

FIG. 22 is a diagram exemplifying a picture of a UI for medium characteristic designation.

FIGS. 27A and 27B are diagrams illustrating conversion processing for test printing using the device profile.

FIG. 29 is a diagram exemplifying a UI screen for receiving rating.

FIG. 30 is a diagram illustrating a picture of the UI for medium characteristic designation according to a modified example.

DESCRIPTION OF EXEMPLARY EMBODIMENTS

Hereinafter, the embodiments of the invention will be described in order of the following items: 1. Device Configuration and Overall Processing Sequence; 2. Base LUT Generation of Basic Medium; 2-1. Basic Sequence; 2-2. Dynamic Model; 2-3. Smoothing Processing (Smoothing and Optimization Processing); 2-4. Contents of Optimization Processing; 3. Printer Adjustment; 4. Base LUT Generation of Substitute Medium; 5. Device Profile Generation; 6. Reprocessing in Case of Receiving Low rating; and 7. Modified Example.

1. Device Configuration and Overall Processing Sequence

Figure 1:
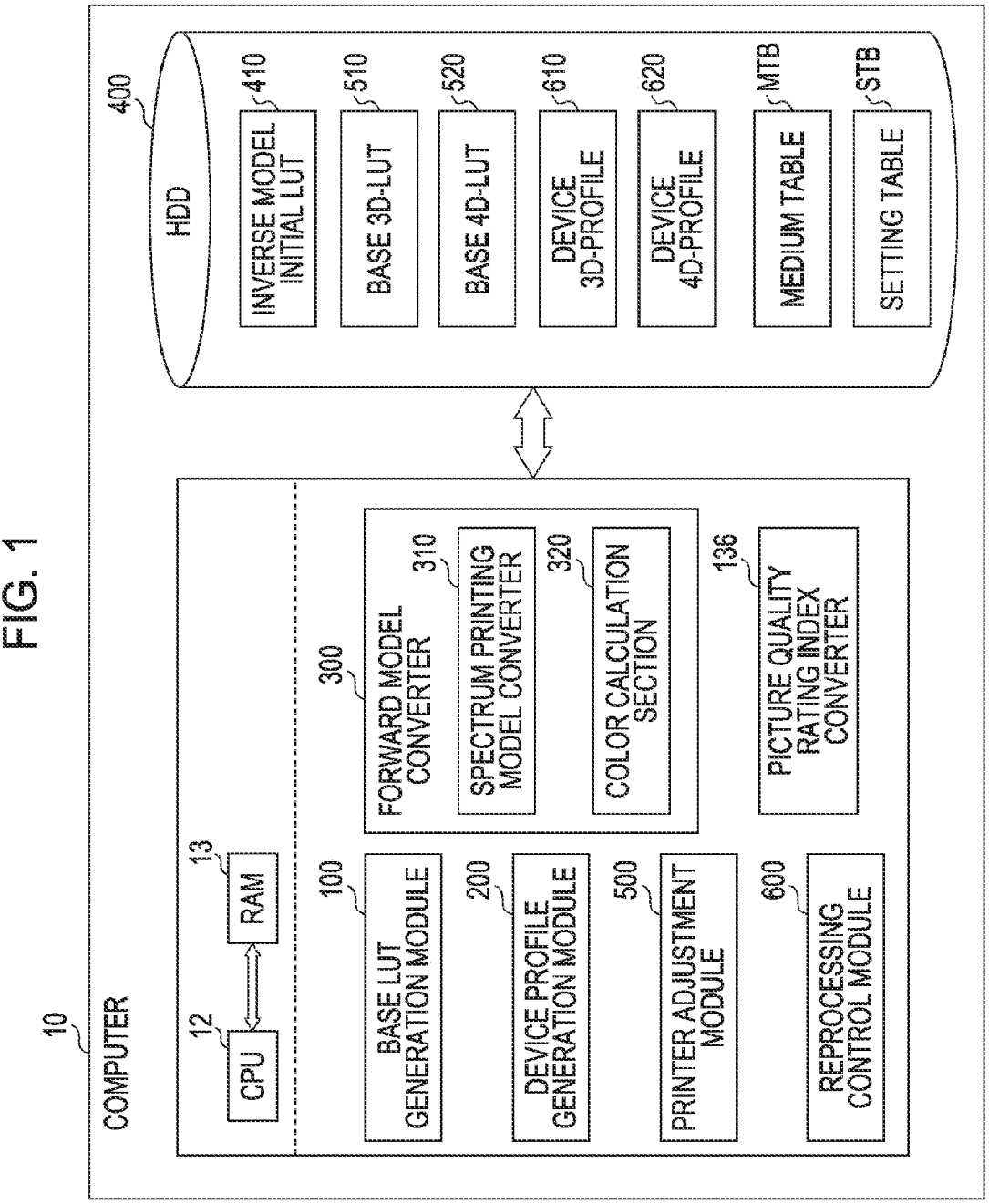
FIG. 1 is a block diagram illustrating a configuration of a printing control device according to an embodiment.

FIG. 1 is a block diagram illustrating a configuration of a printing control device in an embodiment. The printing control device is a control device for a printer, and the principal sections of the device are practically embodied by a computer 10. Specifically, a CPU 12 provided in the computer 10 reads a program (a printing control program or the like) stored in a hard disk drive (HDD) 400 or the like, and execute calculation according to the program while developing the program in a RAM 13, thereby implementing the respective functions such as a base LUT generation module 100, a device profile generation module 200, a printer adjustment module 500, and a reprocessing control module 600. The computer 10 is connected to a display device (for example, a liquid crystal display) which is not shown, and thus a UI (user interface) necessary for each processing is displayed on the display device. Further, the computer 10 is connected to an input device (for example, a keyboard or a mouse) which is not shown, and thus information necessary for each processing is input through the input device. Furthermore, the computer 10 is connected to a colorimeter which is not shown in a printer 20 (FIG. 3). In addition, the computer 10 includes a forward model converter 300, and a picture quality rating index converter 136. The forward model converter 300 further includes a spectrum printing model converter 310 and a color calculation section 320. The forward model converter 300 corresponds to a color prediction model. The functions of these modules and sections will be described later. In the specification, "LUT" is an abbreviation of look-up table.

The HDD 400 stores a medium table MTB and a setting table STB. These tables will be described later. The HDD 400 is also a storage device for storing an inverse model initial LUT 410, a base 3D-LUT 510, a base 4D-LUT 520, a device 3D-profile 610, a device 4D-profile 620, and the like. Here, the base 3D-LUT 510 and the base 4D-LUT 520 are created by the base LUT generation module 100, and the device 3D-profile 610 and the device 4D-profile 620 are created by the device profile generation module 200. The base 3D-LUT 510 is a color conversion LUT in which an RGB color coordinate system is set as an input and an ink amount is set as an output. The base 4D-LUT 520 is a color conversion LUT in which a CMYK color coordinate system is set as input and an ink amount is set as an output. The meaning of the "3D" and "4D" is the number of input values. The RGB color coordinate system and the CMYK color coordinate system, which are input color coordinate systems of the base LUTs 510 and 520, are not so-called device-dependent color coordinate systems, but are virtual color coordinate systems (or abstract color coordinate systems) which are set regardless of a specific device. These base LUTs 510 and 520 are used, for example, during creation of the device profiles 610 and 620. The reason is that the "base LUT" is used as a base for creating a device profile. Further, the "base LUT" corresponds to a "color conversion table" which is created in the embodiment of the invention. The device profiles 610 and 620 are printer profiles that define characteristics of the printer 20. The inverse model initial LUT 410 will be described later. In the embodiment, the printer is supposed to be able to use inks of four types of cyan (C), magenta (M), yellow (Y), and black (K). In the embodiment, for simplification of description, the inks of four types are exemplified, but the embodiment of the invention is also applicable in a case of creating a LUT or a profile for a different ink.

Figure 2:
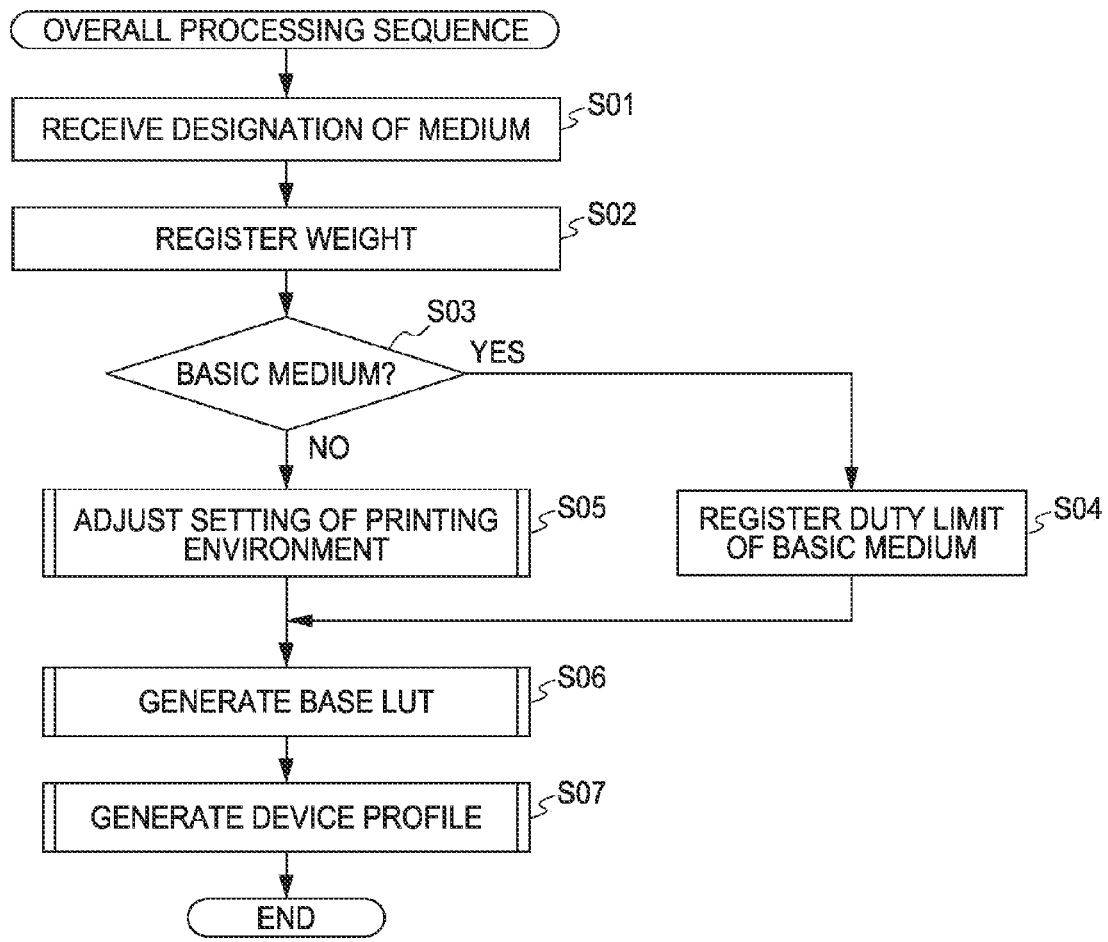
FIG. 2 is a flowchart illustrating an overall processing sequence of the example.

FIG. 2 is a flowchart illustrating an overall processing sequence in which a computer 10 executes the printing control program until generating the device profile. In step S01, the base LUT generation module 100 receives designation of a medium as a processing target through a display device and an input device. The base LUT generation module 100 displays a medium selection UI picture, which causes a user to select a desired basic medium from a list of respective media, on the display device. The user is able to select, for example, a basic glossy paper, a basic matte paper, a basic plain paper, a basic proof paper, or the like as a basic medium. The "basic medium" means a typical printing medium corresponding to each type of general media, and in the embodiment of the invention, particularly means a printing medium for which a forward model converter 300 (a spectrum printing model converter 310) and a picture quality, rating index converter 136 are provided in advance. The characteristics of each basic medium are known, and data, which specifies a color development characteristic or a duty limit when ink is adhered onto each basic medium, is stored in the medium table MTB in advance. The basic glossy paper, the basic matte paper, the basic plain paper, the basic proof paper respectively belong to a glossy paper type, a matte paper type, a plain paper type, and a proof type.

On the other hand, through the medium selection UI picture, a user is able to arbitrarily select a printing medium (a substitute medium) other than the basic media. Examples of the selectable substitute medium include a glossy paper type sheet, a matte paper type sheet, plain paper type sheet, a proof type sheet, an unclassified sheet, and the like. The "substitute medium" means a printing medium which is not the same as any of the basic media, and in the embodiment of the invention, particularly means a printing medium for which preparation is not made in advance by the forward model converter 300 (the spectrum printing model converter 310) and the picture quality rating index converter 136. When it is difficult for a user to distinguish whether the medium for which the base LUT and the like are intended to be created is a basic medium or a substitute medium, the user may select the substitute medium. At this time, when the user knows the type of the medium for which the base LUT and the like are intended to be created, the user is able to select the substitute medium of the corresponding type. When the type of the medium is unknown or it is difficult to classify the type, the user is able to select an unclassified paper. In addition, the medium may not be designated by the user, but the type of the medium may be automatically determined (automatically designated) by the computer 10 on the basis of the hue and the like which are obtained by measuring the color of the medium. In step S01, when a target medium is designated, information specifying the medium is registered in the setting table STB. Hereinafter, the medium, which is designated through step S01, is referred to as a "designated medium". Step S01 corresponds to the reception process of the embodiment of the invention.

In step S02, the weights $w_{L*}, w_{a*} \ldots$ of the respective terms constituting the objective function E, which is used in order to optimize the ink amount to be described later, are registered in setting table STB. In this case, first, the base LUT generation module 100 acquires default weights corresponding to the type of the designated medium by referring to the medium table MTB stored in the HDD 400. The types of the media include the glossy paper type, matte paper type, the plain paper type, the proof type, and the unclassified type, the default weights $w_{L*}, w_{a*} \ldots$ for each type are stored in the medium table MTB. Next, the base LUT generation module 100 displays the picture of the UI for weight designation on the display device, and receives the designation of the weights through the input device.

FIG. 3 shows the picture of the UI for weight designation, and FIG. 4 shows an example of the medium table MTB. Through the picture of the UI for weight designation, the designation of the weights $w_{L*}, w_{a*} \ldots$ (0 to 100%) of the respective terms constituting the objective function E is received. As shown in the drawing, a slider bar is provided for each setting item of granularity, color constancy, running cost, gamut, and gradation, and the weight of each item is set to increase as each pointer is slid to be closer to the right side. Further, the center position of the slider bar corresponds to the center values (50%) of the weights $w_{L*}, w_{a*} \ldots$. In the picture of the UI for weight designation, as the pointer of the granularity is slid to be closer to the right side, the value of the weight $w_{GI}$ is set be larger. As the pointer of the color constancy is slid to be closer to the right side, the values of the weights $w_{CII(A)} \ldots w_{CII(F12)}$ are set be larger. In this embodiment, the values of the weights $w_{CII(A)} \ldots w_{CII(F12)}$ are set to be equal to each other. It is apparent that the values of the weights $w_{CII(A)} \ldots w_{CII(F12)}$ may be set to be different from each other in accordance with the degree of importance. As the pointer of the running cost is slid to be closer to the right side, the value of the weight $w_{TI}$ is set be larger. As the pointer of the gamut is slid to be closer to the right side, the value of the weight $w_{GMI}$ is set be larger. As the pointer of the gradation is slid to be closer to the right side, the values of the weights $w_{L*}, w_{a*},$ and $w_{b*}$ are set be larger. In this embodiment, the values of the weights $w_{L*}, w_{a*},$ and $w_{b*}$ are set to be equal to each other. In addition, for each of the lightness L*•saturation a*, b*, different weights $w_{L*}, w_{a*},$ and $w_{b*}$ may be set. The relationship between the position of the pointer in the slider bar and the values of the respective weights is preferable if it is a monotonically increasing relationship, and can be defined by various functions such as a linear function and a quadratic function.

In the picture of the UI for weight designation, the initial positions of the respective pointers at the time of displaying the slider bars first are set to positions corresponding to the default weights $w_{L*}, w_{a*}, \ldots$ acquired from the medium table MTB. The default weights $w_{L*}, w_{a*}, \ldots$ are set to values, which are appropriate for each type of media, in the medium table MTB. As shown in FIG. 4, as for the plain paper type, the default weight $w_{TI}$ of the running cost is set to be larger than the center value, and the default weight $w_{GMI}$ of the gamut is set to be smaller than the center value, and the others are set to be the center values. As for the matte paper type and the unclassified type, the default weights $w_{L*}, w_{a*} \ldots$ of the all terms are set to be the center values. As for the glossy paper type, the weights $w_{GI}, w_{L*}, w_{a*}, w_{b*},$ and $w_{GMI}$ of the granularity, the gradation, and the gamut are set to be larger than the center value, and the others are set to be the center values. As for the proof paper type, only the weight $w_{GMI}$ of gamut is set to be larger than the center value, and the others are set to be the center values. When a user clicks the confirmation button in the picture of the UI for weight designation without changing the initial positions of the pointers, the default weights $w_{L*}, w_{a*} \ldots$ acquired from the medium table MTB is set as it is.

The default weights $w_{L*}, w_{a*} \ldots$ are set as very appropriate values in consideration of purpose of use of each type of media. Hence, basically there is no necessity to change them. If a user intends to change them, the user is able to set the desired weights $w_{L*}, w_{a*} \ldots$ by sliding the pointer from the initial position to the desired position. In addition, relative size difference between the respective weights $w_{L*}, w_{a*} \ldots$ makes an effect, and thus if the weights are increased or decreased equally as a whole, the effect is small. Accordingly, by shifting the pointer of a certain item, the pointer of another item may be equally shifted in an opposite direction. The base LUT generation module 100 registers the weights $w_{L*}, w_{a*} \ldots$, which correspond to the positions of the respective pointers when the confirmation button in the picture of the UI for weight designation, in the setting table STB.

In step S03, the base LUT generation module 100 determines whether or not the designated medium is the basic medium. If it is the basic medium, the routine advances to step S04, the module acquires the duty limit for the basic medium by referring to the medium table MTB. In contrast, if the designated medium is the substitute medium, the routine advances to step S05. In this embodiment, the inks of four types of CMYK are distinguished by natural number subscripts j (j=1 to 4), and the amounts of inks onto a medium are represented as the ink amounts $I_1$ to $I_4$ of the individual inks, where vector I=($I_1$, $I_2$, $I_3$, $I_4$). In addition, when the ink amounts $I_j$ (which also include $I_{j(R, G, B)}$, $\Delta I_j$, $I_{jr}$, and $h_j$ to be described later) is indicated by adding the subscript j, the ink amounts $I_j$ of the respective inks are represented as a matrix (vector) of which respective row elements are the ink amounts $I_j$. Further, ink amounts with secondary colors, which are obtained by mixing colors of two type inks among the three type inks of CMY, are indicated by the subscripts j (j=5 to 7). That is, $I_5=I_1+I_2$, $I_6=I_1+I_3$, $I_7=I_2+I_3$. The amounts of secondary color inks $I_5$ to $I_7$ reproduce colors, which correspond to hues of blue (B), red (R), and green (G), on the medium. Furthermore, the ink amount, of which the color is obtained when all the inks of four types of CMYK are mixed, is indicated by the subscript j (j=8). That is, $I_8=I_1+I_2+I_3+I_4$.

In this embodiment, the ink amount $I_j$ of each ink is expressed by 8 bits. As shown in FIG. 4, the duty limits $D_{Ij}$ of the respective individual inks (primary color), the mixture of the inks with the secondary color, and the mixture of all inks are written. The duty limit $D_{Ij}$ means an ink amount, which can be maximally adhered onto each basic medium, per unit area, and is set as, for example, a lower limit at which ink bleeding occurs. The physical property of ink droplets on the medium is different for each combination between ink and medium, and thus the different duty limit $D_{Ij}$ is set for each combination. Further, even when a plurality of inks is mixed, the mixed ink has a different physical property from a single ink. Hence, in this embodiment, the duty limit $D_{Ij}$ (j=1 to 8) is set for not only the primary colors but also the secondary colors (the mixed color of two inks) and the mixture of all inks. When the duty limits $D_{Ij}$ of the basic medium can be acquired, the base LUT generation module 100 registers the acquired duty limits $D_{Ij}$ in the setting table STB (step S04). After step S04, the base LUT generation module 100 advances the routine to step S06 (precisely, in the course of step S06). In the specification, when the ink amount $I_j$ is simply noted, the range of the subscript j is j=1 to 4, and when the duty limit $D_{Ij}$ is noted, the range of the subscript j is j=1 to 8.

FIG. 5 shows an example of the setting table STB. If the designated medium is the basic medium, the type of the basic medium mentioned above, the weights $w_{L*}$, $w_{a*}$ ..., the duty limits $D_{Ij}$, the color tone ($a_{gt}*$, $b_{gt}*$) of the gray target are stored in the setting table STB. In the case of the basic medium, the gray target color tone ($a_{gt}*$, $b_{gt}*$)=(0, 0).

In step S05, the printer adjustment module 500 causes at least the printer 20 to print a test pattern, which is for determining whether or not the setting of the printing environment of the printer 20 is favorable, on the designated printing medium so as to thereby adjust the setting of a printing environment of the printer 20 based on the printing result of the test pattern (adjustment process). The printing environment described herein means various conditions (mostly, mechanical conditions) having an effect on the printing result of the printer 20. For example, the environment is defined to include a paper feeding amount in the printer 20, a platen gap, a temperature and a wind force of drying means provided in the printer 20, an absorption force of the medium on the platen, a moving speed of the printing head, a tension applied to the medium (a tension generated by the transport roller). By performing step S05, favorable printing environment is constructed which does not cause troubles such as color unevenness, bleeding, and blurring in the printing result obtained by the printer 20. Details of step S05 will be described later.

In step S06, the base LUT generation module 100 determines the ink amount, which is for reproducing the color value most appropriate for the designated medium, through the optimization using the objective function E, and generates the base LUT in which the determined ink amount is defined by the output value. Here, if the designated medium is the substitute medium, the module determines the ink amount, which is for reproducing the color value indicated by the grid point of the device-independent color coordinate system, through the ink amount optimization using the objective function E, which is for rating the picture quality obtained when the ink is adhered onto the basic medium different from the designated medium. Then, the module generates the base LUT for the designated medium by defining the correspondence relationship between the grid point of the predetermined input color coordinate system and the ink amount into which the determined ink amount is converted on the basis of the conversion relationship between the ink color development characteristic of the basic medium and the ink color development characteristic of the designated medium (color conversion table generation process). Details of step S06 will also be described later.

In step S07, the device profile generation module 200 generates the device profile on the basis of the base LUT which is generated in step S06. That is, the module performs color conversion on data, which represents a test pattern for prescribed profile generation, by using the generated base LUT, and causes the printer 20 to print the test pattern on the basis of the color-converted data so as to thereby generate the device profile which defines characteristics of the printer 20 on the basis of the colorimetric value of the test pattern (profile generation process). After the base LUT and device profile are generated as described above, by using the base LUT and device profile, a user is able to perform the color conversion on the arbitrary picture data and cause the printer 20 to print the data on the designated medium. Details of step S07 will also be described later.

Figure 6:
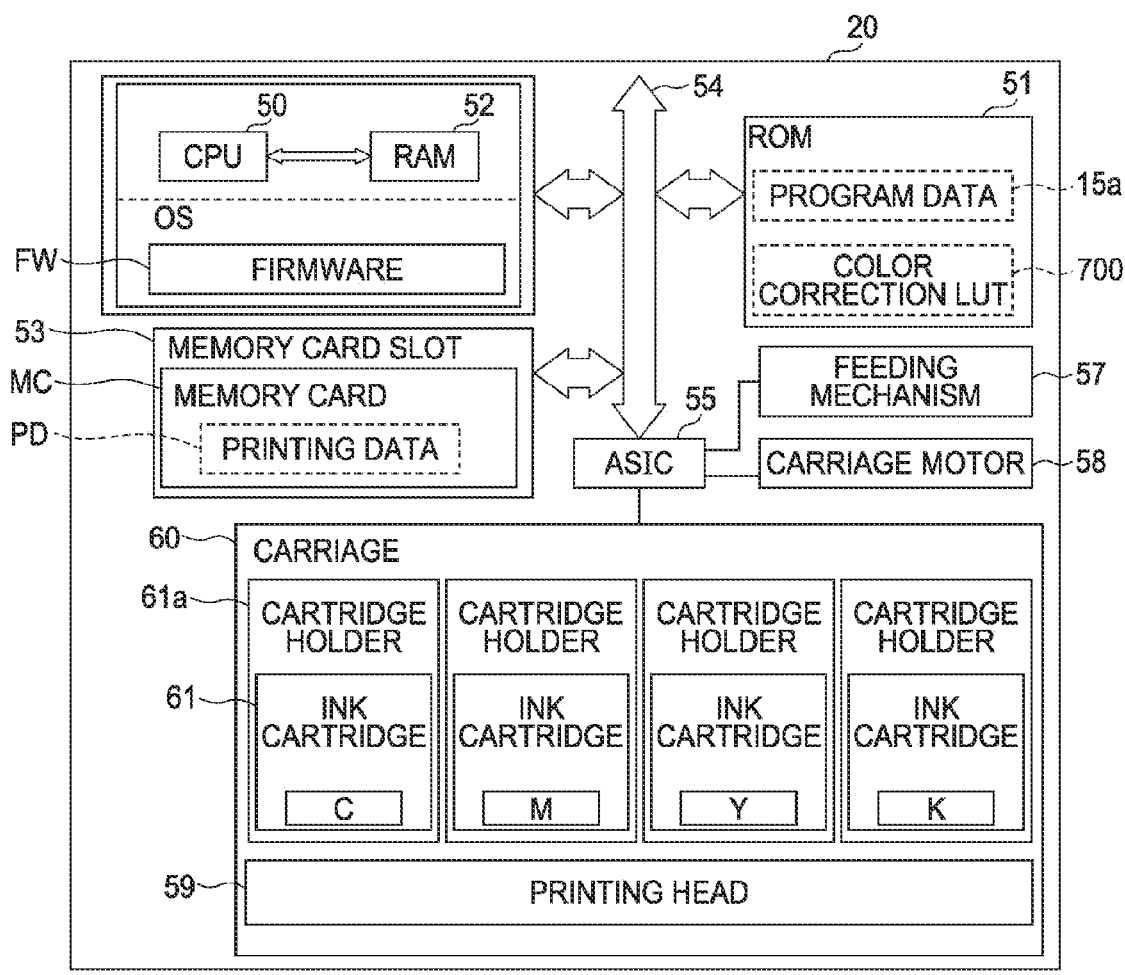
FIG. 6 is a block diagram illustrating a configuration of a printer in the embodiment.

FIG. 6 shows a configuration of the printer 20. In the drawing, the printer 20 includes a CPU 50, a RAM 52, a ROM 51, a memory card slot 53, a bus 54, and an ASIC 55. The CPU 50 performs calculation based on program data 15a while developing the program data 15a, which is stored in the ROM 51, into the RAM 52, thereby executing firmware FW for controlling the printer 20. The firmware FW is able to generate driving data on the basis of the print data PD which is acquired (for example, which is stored in the memory card MC mounted on the memory card slot 53). The ASIC 55 acquires the driving data, and generates signals for driving a paper feeding mechanism (such as paper feeding motor) 57, a carriage motor 58, and a printing head 59. The ROM 51 stores a color correction LUT 700 transmitted from the computer 10. The information of the corresponding medium types is recorded in the color correction LUT 700. The color correction LUT 700 is an LUT for converting the standard device-dependent color coordinate system, for example, the sRGB color coordinate system into the ink amounts (CMYK) of the printer 20, or an LUT for converting the Japan color coordinate system into the ink amounts (CMYK) of the printer 20. The color correction LUT 700 is an LUT which is generated on the basis of the base LUT or the device profile as described later. The printer 20 includes a carriage 60, and the carriage 60 includes a cartridge holder 61a on which a plurality of ink cartridges 61 can be mounted. The carriage 60 includes the printing head 59 that ejects ink droplets with respective colors of CMYK, which are supplied from the respective ink cartridges 61, from multiple nozzles.

Figure 7:
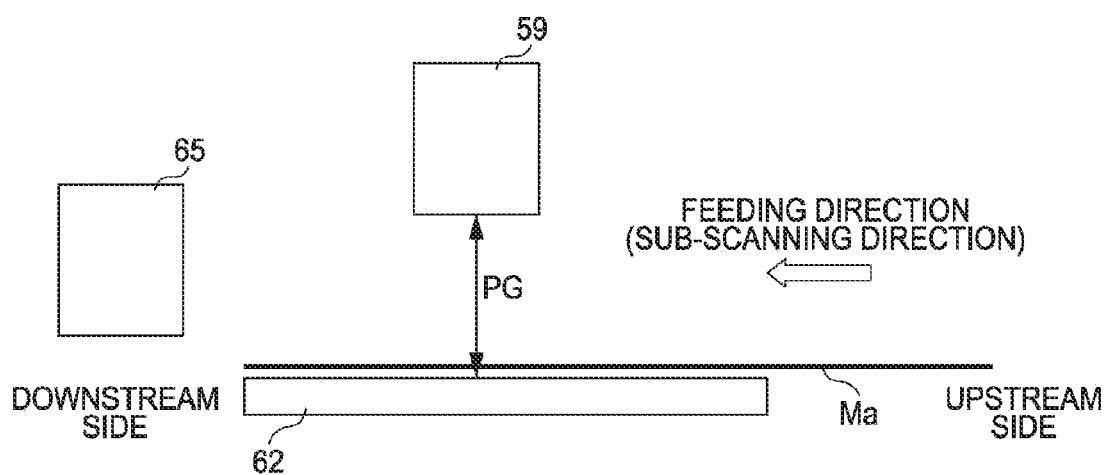
FIG. 7 is a diagram briefly exemplifying a configuration of the vicinity of a printing head in the printer.

FIG. 7 briefly exemplifies a configuration of the vicinity of the printing head 59 in the printer 20. The printing head 59, which is mounted on the carriage 60, can be reciprocated by the carriage motor 58 in a direction (main scanning direction) perpendicular to the paper surface of FIG. 7. A platen 62 is provided below the printing head 59. A medium Ma is sent by a paper feeding roller, which is not shown and is driven by the paper feeding mechanism 57, in a direction (referred to as a sub-scanning direction or a paper feeding direction) perpendicular to the main scanning direction, so as to thereby move on the platen 62. In the printer 20, for example, by repeating ink ejection for each pass (single movement of the printing head 59 in the main scanning direction) and paper feeding with a regular distance between the pass and pass, the print picture is formed on the medium Ma. Further, a dryer 65 (drying means) for drying the printed picture may be provided on the downstream side (the side on which the medium Ma is discharged) from the printing head 59 in the paper feeding direction. In addition, the printer 20 may be a line-head-type printer. Furthermore, in this embodiment, the printer 20 employs the ink jet type, but the embodiment of the invention can be applied to various printers other than the ink jet type.

Figure 8:
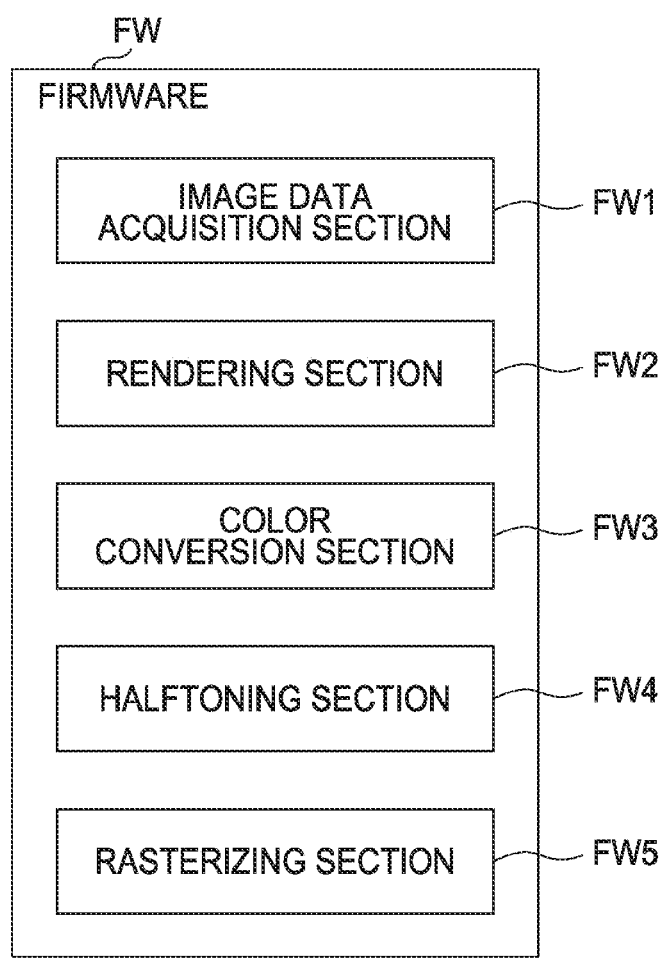
FIG. 8 is a block diagram illustrating a software configuration of the printer.

FIG. 8 shows a software configuration of the firmware FW. The firmware FW includes a picture data acquisition section FW1, a rendering section FW2, a color conversion section FW3, a halftoning section FW4, and a rasterizing section FW5. The picture data acquisition section FW1 acquires the print data PD as a printing target, which is arbitrarily selected by a user, from, for example, the print data PD stored in the memory card MC. The print data PD may be document data or graphic data, and may be photo picture data. The rendering section FW2 generates an input picture data ID used in printing on the basis of the print data PD. The input picture data ID is formed of pixels of which the number (print resolution× actual print size) corresponds to the print resolution (for example, 2880×2880 dpi), and is represented by RGB values complying with, for example, the sRGB color coordinate system in which each pixel has 8 bits (0 to 255).

The color conversion section FW3 acquires the input picture data ID, and performs color conversion on the input picture data ID. Specifically, the color conversion section FW3 is used in printing, and performs interpolation calculation while referring to the color correction LUT 700 corresponding to the designated medium type and the color coordinate system of the input picture data ID, thereby converting the data (For example, the RGB values) for each pixel into the ink amounts (CMYK) of the respective inks. The halftoning section FW4 performs halftoning processing based on the ink amounts of the respective inks which are output by the color conversion section FW3. The rasterizing section FW5 assigns each pixel of halftone data (as to whether or not to perform ejection), which was subjected to the halftoning processing, to each main scanning and each ink nozzle of the printing head 59, thereby generating the driving data. The driving data is output to the ASIC 55, and the ASIC 55 generates signals for driving the paper feeding mechanism 57, the carriage motor 58, and the printing head 59. In this embodiment, the color conversion processing is performed by the firmware FW in the printer 20, but the color conversion processing may be performed in the computer which is connected to the printer 20. That is, the color correction LUT 700 may be installed in not only the printer 20 but also the computer (printing control device) that controls the printer 20.

2. Base LUT Generation of Basic Medium 2-1. Basic Sequence

As described above, when the designated medium is the substitute medium, the processing from step S05 is performed. However, in the following description, first, a brief description will be given of processing (processing from the middle of step S06) after step S04 executed in the case where the basic medium is designated, that is, processing of creating the base LUT of the basic medium.

Figure 9:
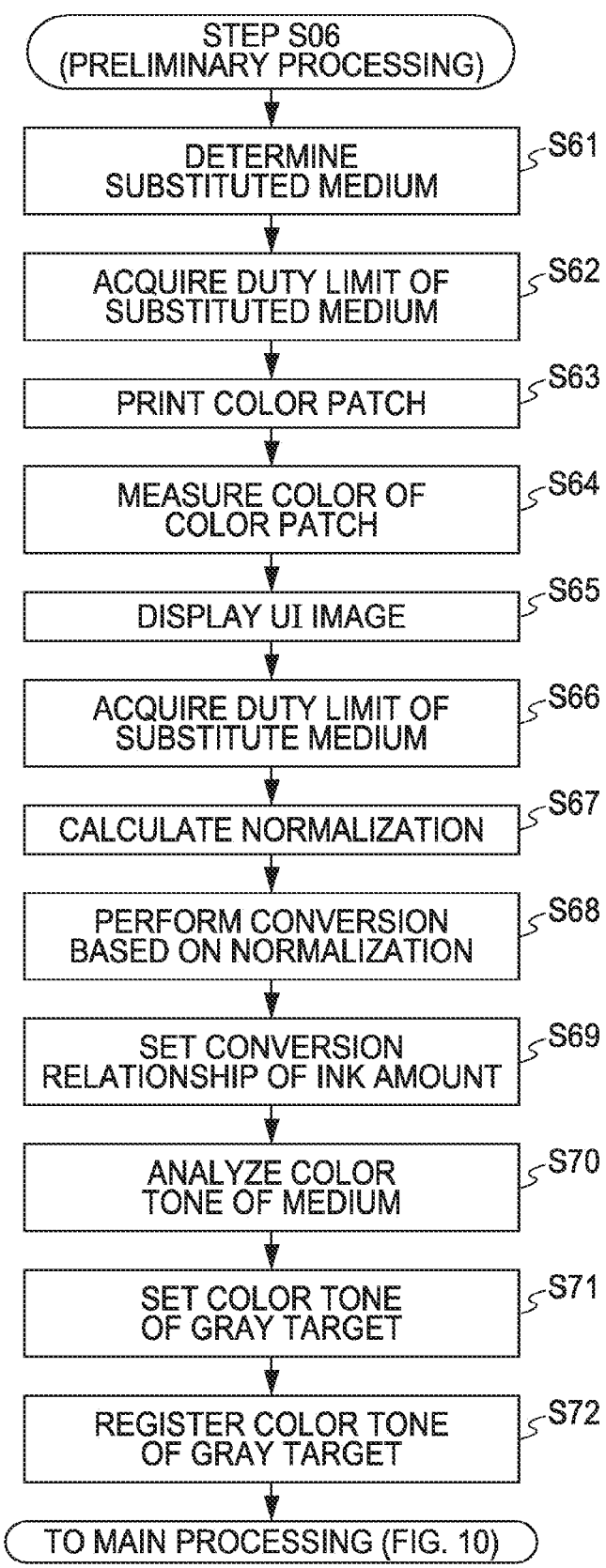
FIG. 9 is a flowchart illustrating preliminary processing included in base LUT generation processing.
Figure 10:
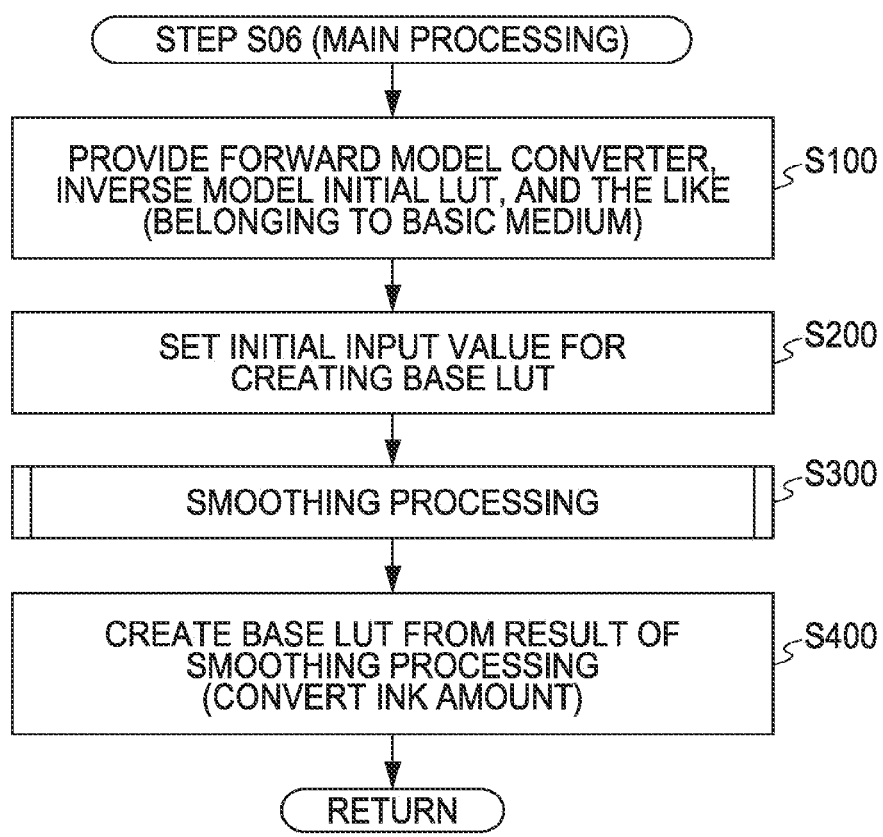
FIG. 10 is a flowchart illustrating main processing included in base LUT generation processing.

FIGS. 9 and 10 are flowcharts illustrating details of step S06. After step S05, as contents of step S06, processing of FIG. 9 (preliminary processing for base LUT generation) is executed, and subsequently processing of FIG. 10 (main processing for base LUT generation) is executed. Here, in step S06 in the case where the designated medium is the basic medium (that is, in the case where the routine advances from step S04 to step S06), the processing of FIG. 10 is executed.

FIGS. 11A to 11C are explanatory diagrams illustrating processing contents in a case of creating a base 3D-LUT through steps S100 to S300 of FIG. 10. In step S100, on the basis of the information stored in the setting table STB, the forward model converter 300, the inverse model initial LUT 410, and the picture quality rating index converter 136 are prepared (activated). As described above, as for the basic medium, there are provided the spectrum printing model converter 310 and the picture quality rating index converter 136 for the basic medium, and thus those are activated to be enabled. Here, the term "forward model" means a conversion model for converting the ink amounts $I_j$ into the color values of the device-independent color coordinate system (predicting the colorimetric values from the amounts of ink). Conversely, the term "inverse model" means a conversion model for converting the color values of the device-independent color coordinate system into the amounts of ink. In the embodiment, the CIE-Lab color coordinate system is used as a device-independent color coordinate system. In addition, hereinafter, the color values of the CIE-Lab color coordinate system are simply referred to as "L*a*b* values" or "Lab values".

As shown in FIG. 11A, the spectrum printing model converter 310 constituting the previous stage of the forward model converter 300 converts amounts of plural type inks into spectral reflectivities $R(\lambda)$ of the color patches which are formed by adhering the inks on the corresponding basic medium. In addition, in the specification, the term "color patch" is limited to a chromatic patch, but is defined to include an achromatic patch in a wider sense. Further, the term "print" means that the ink is adhered onto the medium in accordance with the ink amount. The spectrum printing model converter 310 uses the ink amounts $I_j$ of the four type inks mentioned above as inputs. The color calculation section 320 calculates the color values of the Lab color coordinate system from the spectral reflectivities $R(\lambda)$. In the calculation of the color values, a preselected light source (for example standard light D50) is used as a condition for observing the color patches. In addition, as a method of creating the spectrum printing model converter 310, for example, it is possible to employ a method disclosed in JP-T-2007-511175.

The inverse model initial LUT 410 is a look-up table in which the L*a*b* values are inputs and the ink amounts $I_j$ are outputs. In the initial LUT 410, for example, L*a*b* space is divided into a plurality of small cells, and the optimal ink amount $I_j$ is selected and registered for each small cell. This selection is performed in consideration of, for example, the picture quality of each color patch which is printed with the ink amount $I_j$ on the basic medium. Generally, there are multiple combinations of the ink amounts $I_j$ for reproducing a certain L*a*b* value. Therefore, in the initial LUT 410, the optimal ink amount, which is selected from the viewpoint of desired picture quality and the like among the multiple combinations of the ink amounts $I_j$ for reproducing substantially the same L*a*b* values, is registered. The L*a*b* values as input values of the initial LUT 410 is representative values of the respective small cells. On the other hand, the ink amount $I_j$ as an output value is to reproduce any of the L*a*b* values in the cell. Accordingly, in the initial LUT 410, the L*a*b* values as input values do not exactly correspond to the ink amounts $I_j$ as output values. Thus, when the ink amounts of the output values are converted into the L*a*b* values by the forward model converter 300, it is possible to obtain values slightly different from the input values of the initial LUT 410. Here, as the initial LUT 410, the LUT, in which the input values perfectly correspond to the output values, may be used. Further, it is possible to create the base LUT without using the initial LUT 410. In addition, as a method of creating the initial LUT 410 by selecting the ink amount most appropriate for each small cell, for example, the method disclosed in JP-T-2007-511175 may be adopted. In the method disclosed in JP-T-2007-511175, by forming the color patches on the target printing medium, the spectrum printing model converter 310 and the inverse model initial LUT 410 are created. That is, in order to create the base LUT of the basic medium, the spectrum printing model converter 310 and the inverse model initial LUT 410, which are created by forming the color patches on the basic medium, are provided.

In step S200 of FIG. 10, the initial input values for creating the base LUT are set by a user. FIG. 11B shows a configuration of the base 3D-LUT 510 and the example of the initial input value setting. As the input values of the base 3D-LUT 510, substantially equidistant values, which are determined in advance as the respective RGB values, are set. One set of the RGB values is considered to represent a point in the RGB color space. Therefore, one set of the RGB values is referred to as an "input grid point". In step S200, a user inputs the initial values of the ink amounts $I_j$ corresponding to a small number of several input grid points which are preselected from the plurality of input grid points. In this embodiment, when the respective values of RGB are expressed by 8 bits, all the input grid points ($17^3$ points), which satisfy (R, G, B)= ($16n_1-1$, $16n_2-1$, $16n_2-1$), are selected. The $n_1$ to $n_3$ are integers of 0 to 16, and R, G, B=0 when R, G, B=−1. The input grid points, at which the initial input values are set, include input grid points corresponding to vertexes of three-dimensional color solid in the RGB color space. At the vertexes of the three-dimensional color solid, the respective values of RGB are minimum values or maximum values of the defined range. Specifically, the initial input values of the ink amounts $I_j$ are set for eight input grid points of (R, G, B)=(0, 0, 0), (0, 0, 255), (0, 255, 0), (255, 0, 0), (0, 255, 255), (255, 0, 255), (255, 255, 0), and (255, 255, 255). Further, 17 input grid points (hereinafter denoted as gray grid points), at which $n_1=n_2=n_3$, are present on the gray axis in the RGB color space. In addition, all the ink amounts $I_j$ for the input grid point of (R, G, B)=(255, 255, 255) are set to 0. The initial input values of the ink amounts $I_j$ corresponding to other input grid points are arbitrary, and for example, are set to 0. In the example of FIG. 11B, although the ink amounts for the input grid point of (R, G, B)=(0, 0, 32) are set to values other than 0, the values are values obtained when the LUT 510 is completed.

In step S300 of FIG. 10, the base LUT generation module 100 (FIG. 1) executes smoothing processing (smoothing and optimization processing) on the basis of the initial input values which are set in step S200. FIG. 11C shows processing contents of step S300. On the left side of FIG. 11C, distribution of the plurality of color values in the state before the smoothing processing is represented by the double circles and the white circles. Such color values constitutes the three-dimensional color solid CS in the L*a*b* space. The L*a*b* coordinate values of the color values are values derived through conversion of the ink amounts $I_j$ at a plurality of input grid points of the base 3D-LUT 510 into the L*a*b* values by using the forward model converter 300 (FIG. 11A). As described above, in step S200, the initial input values of the ink amounts $I_j$ are set only for a small number of some input grid points. The initial values of the ink amounts $I_j$ for the other input grid points are set from the initial input values by the base LUT generation module 100. This initial value setting method will be described later.

The three-dimensional color solid CS of the Lab color coordinate system has the following eight vertexes (the double circle points of FIG. 11C). •Point $P_K$: paper black point corresponding to (R, G, B)=(0, 0, 0). •Point $P_W$: paper white point corresponding to (R, G, B)=(255, 255, 255). •Point $P_C$: cyan point corresponding to (R, G, B)=(0, 255, 255). •Point $P_M$: magenta point corresponding to (R, G, B)= (255, 0, 255). •Point $P_Y$: yellow point corresponding to (R, G, B)=(255, 255, 0). •Point $P_R$: red point corresponding to (R, G, B)=(255, 0, 0). •Point $P_G$: green point corresponding to (R, G, B)=(0, 255, 0). •Point $P_B$: blue point corresponding to (R, G, B)=(0, 0, 255).

On the right side in FIG. 11C, the distribution of the grid points (color values) after the smoothing processing is shown. The smoothing processing is a processing for shifting the plurality of grid points in the L*a*b* space to make the distribution of the grid points a smooth one that approximates equidistant spacing. In the smoothing processing, the optimal ink amounts $I_j$ for reproducing the L*a*b* values of the shifted grid points are determined as well. Upon registering these optimal ink amounts $I_j$ as output values in the base LUT 510, the base LUT 510 is completed.

Figure 12A:
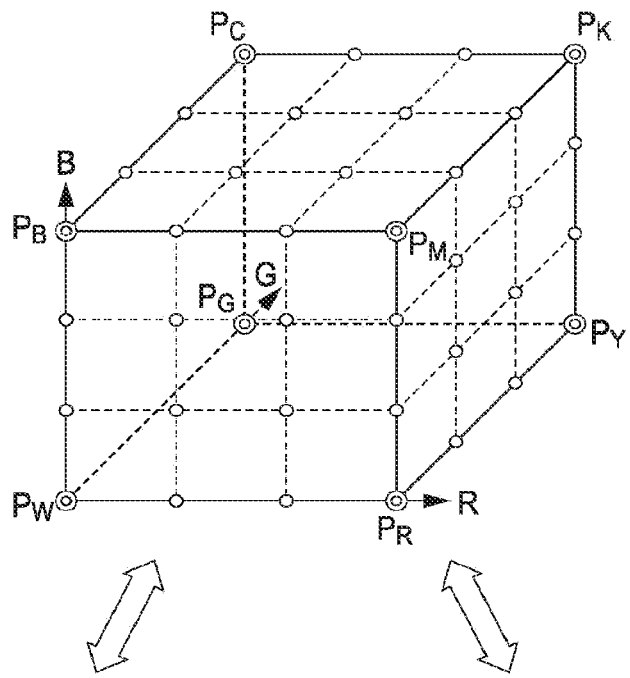
FIGS. 12A to 12C are explanatory diagrams illustrating a correspondence relationship between color values of a RGB color coordinate system as an input color coordinate system and color values of Lab color coordinate systems.
Figure 12B:
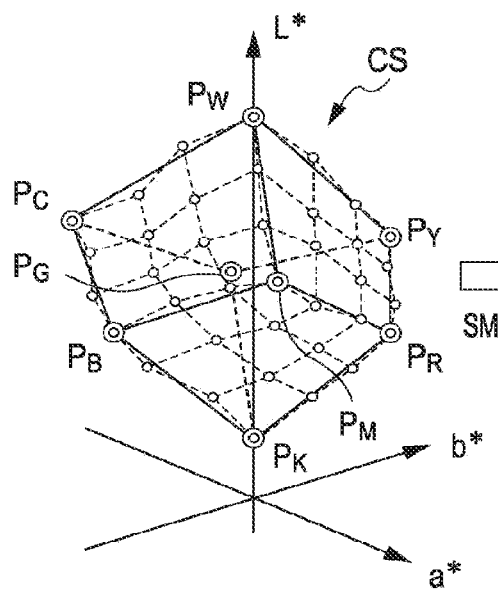
Figure 12C:
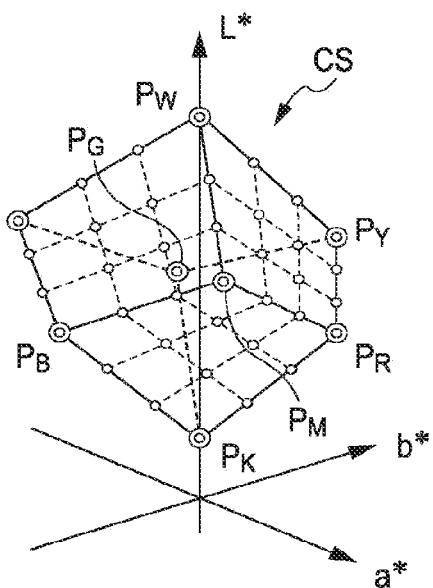

FIGS. 12A to 12C show a correspondence relationship between the grid points of the input color coordinate system (that is, input grid points) and the grid points of the Lab color coordinate system. The vertexes of the three-dimensional color solid CS of the Lab color coordinate system have one-to-one correspondence with the vertexes of the three-dimensional color solid of the input color coordinate system of the base LUT 510. The sides (the edge lines), which connect the vertexes, can also be considered to correspond to one another between the two solids. The color values of the grid points of the Lab color coordinate system prior to the smoothing processing are respectively associated with the input grid points of the base LUT 510. Accordingly, the color values of the grid points of the Lab color coordinate system after the smoothing processing likewise are respectively associated with the input grid points of the base LUT 510. In addition, the input grid points of the base LUT 510 are unchanged by the smoothing processing. The three-dimensional color solid CS of the Lab color coordinate system after the smoothing processing corresponds to the entirety of the color gamut reproducible by the ink set that constitutes the output color coordinate system of the base LUT 510. Consequently, the input color coordinate system of the base LUT 510 has the significance of being a color coordinate system representing the entirety of the color gamut reproducible by this ink set.

The reason for carrying out the smoothing processing in the L*a*b* space during creation of the base LUT 510 is as follows. In the base LUT 510, it is desirable to set the ink amounts $I_j$ of the output color coordinate system in such a way as to be able to reproduce the largest possible color gamut. On the other hand, the color gamut, which is reproducible on the medium by a specific ink set, depends on the duty limit $D_{Ij}$ unique to the medium. Therefore, when determining the possible range for the color values in the L*a*b* space by taking into consideration restriction conditions such as the duty limit $D_{Ij}$ during the smoothing processing, it is possible to determine the color gamut reproducible with a specific ink set. The algorithm used for shifting the grid points may utilize, for example, the dynamic model to be described later.

In step S400 of FIG. 10, the base LUT generation module 100 uses the results of the smoothing processing to create the base LUT 510. Specifically, the base LUT generation module 100 registers the optimal ink amounts $I_j$, which is for reproducing the color values of the grid points of the Lab color coordinate system associated with the input grid points, as the output values of the base LUT 510. The base LUT generated as described above is associated with the designated medium, and is stored in the HDD 400. In addition, in order to reduce the calculation load in the smoothing processing, it is possible to select, as targets for processing, only the color values of the grid points that correspond to only some of the input grid points of the base LUT 510. For example, when the interval of the RGB values at the input grid points of the base LUT 510 is 16, if the interval of the RGB values in the input grid points as the smoothing processing target is set to 32, the load of the smoothing processing may be reduced by half. In this case, the base LUT generation module 100 determines and registers the ink amounts $I_j$ for all the input grid points of the base LUT 510 by interpolating the smoothing processing results.

FIGS. 13A to 13C are explanatory diagrams illustrating processing contents in a case of creating the base 4D-LUT 520 through steps S100 to S300 of FIG. 10. FIG. 13A is the same as FIG. 11A. The base 4D-LUT 520 shown in FIG. 13B differs from the base 3D-LUT 510 shown in FIG. 11B in that the input is the CMYK color coordinate system. As the initial input values of this base 4D-LUT 520, initial values of the ink amounts are set for the 16 input grid points of (C, M, Y, K)=(0, 0, 0, 0), (0, 0, 255, 0), (0, 255, 0, 0), (0, 255, 255, 0), (255, 0, 0, 0), (255, 0, 255, 0), (255, 255, 0, 0), (255, 255, 255, 0), (0, 0, 0, 255), (0, 0, 255, 255), (0, 255, 0, 255), (0, 255, 255, 255), (255, 0, 0, 255), (255, 0, 255, 255), (255, 255, 0, 255), and (255, 255, 255, 255). The initial input values of the ink amounts for other input grid points are set arbitrarily, for example, to 0. In this embodiment, in the case of creating the base 4D-LUT 520, the 17 gray grid points on the gray axis in which C=M=Y is also included in the input grid points.

FIG. 13C shows the situation of the smoothing processing. As shown at the right end of FIG. 13C, as color solids corresponding to the base 4D-LUT 520 in the L*a*b* space, there is one three-dimensional color solid CS for each of the respective values of the K value among the input values. This example shows a plurality of color solids CS including a color solid of K=0 and a color solid of K=32. In the specification, these individual color solids CS are also referred to as "K layers". The reason is that each of the color solids CS may be thought of as corresponding to an input layer in which the K value of the CMYK values is constant and the C, M, and Y values are variable. The plurality of color solids CS represents progressively darker color gamuts for greater K values. The plurality of color solids CS can be realized by determining the ink amount of dark black ink K such that the ink amount $I_4$ of dark black ink K increases with a greater K value of the input color coordinate system. As described above, the reproducible color gamut is limited by the duty limit $D_{Ij}$. The duty limit $D_{Ij}$ depends on the type of the designated medium. Meanwhile, methods for reproducing dark colors are classified into methods of using achromatic ink such as black ink K, and methods of using composite black. However, with composite black, the total quantity of ink is greater, thereby making it more likely to come up against the duty limit $D_{Ij}$ as compared with dark black ink K, which is a disadvantage in terms of reproducing dark colors. Consequently, color solids having a greater K value of the input color coordinate system and a larger ink amount $I_4$ of the dark black ink K are able to reproduce darker colors than color solids having a smaller K value of the input color coordinate system and a less ink amount $I_4$ of the dark black ink K. In the following description, a brief description will be given of a dynamic model used in the smoothing processing (smoothing and optimization processing) in the embodiment, and subsequently, the processing sequence of the smoothing processing and the contents of the optimization processing will be sequentially described.

2-2. Dynamic Model

FIG. 14 is an explanatory diagram illustrating a dynamic model utilized in the smoothing processing (smoothing/optimization processing) of the embodiment. Here, grid points (white circles and double circles) corresponding to the above-mentioned input grid points are arranged in the L*a*b* color space. However, for convenience of description, the grid point arrangement is depicted two-dimensionally. In this dynamic model, it is assumed that virtual force $F_{pg}$ in the following expression relates to a particular grid point of interest g.

$$\vec{Fp_g} = \vec{F_g} - k_v \vec{V_g} \quad (1)$$
$$= k_p \sum_{n=1}^{N} (\vec{X_{gn}} - \vec{X_g}) - k_v \vec{V_g}$$

Here, $F_g$ is the sum total value of attraction forces that the grid point of interest g receives from adjacent grid points gn (n is 1 to N); $V_g$ is a velocity vector of the grid point of interest g; $-k_v V_g$ is resistance force depending on velocity; $X_g$ is a position vector of the grid point of interest g; $X_{gn}$ is a position vector of an adjacent grid point gn; and $k_p$, $k_g$ are coefficients. The coefficients $k_p$, $k_g$ are set to constant values in advance. In addition, the arrows that indicate the vectors are omitted in the text.

This model is a damped oscillation model of mass points linked to one another by a spring. Specifically, the virtual total force $F_{pg}$ relating to the grid point of interest g is the sum total value of spring force $F_g$ which increases with increasing distance between the grid point of interest g and the adjacent grid point gn, and resistance force $-k_v V_g$ which increases with increasing velocity of the grid point of interest g. According to this dynamic model, the position vector $X_g$ and the velocity vector $V_g$ are sequentially calculated over infinitesimal time increments for each color point after the initial values of the position vector $X_g$ and the velocity vector $V_g$ are set. The initial values of the velocity vectors $V_g$ of a plurality of color points is set to 0, for example. Through calculation (simulation) using such a dynamic model, it is possible to gradually shift the color points in the L*a*b* color space and obtain a smooth color point distribution.

In addition, forces other than spring force $F_9$ and resistance force $-k_v V_g$ may be used as forces relating to the color values. For example, the various other forces described in JP-A-

2006-197080 disclosed by the applicants of the invention may be utilized in this dynamic model as well. When applying the dynamic model to shift the color values, it is optionally possible to treat specific color values as constrained points which are not shifted by the dynamic model. In this embodiment, the color values of the grid points, which correspond to the above-mentioned 17 gray axis grid points, are constrained such that the color tone $(a_{gt}^*, b_{gt}^*)$ of the gray target is deviated in the indicated hue direction. In the case of the basic medium, the color tone $(a_{gt}^*, b_{gt}^*)$ of the gray target is set to (0, 0). Hence, the color values of the grid points corresponding to the gray axis grid points are constrained to represent the positions on the L* axis of the L*a*b* color space.

Figure 15:
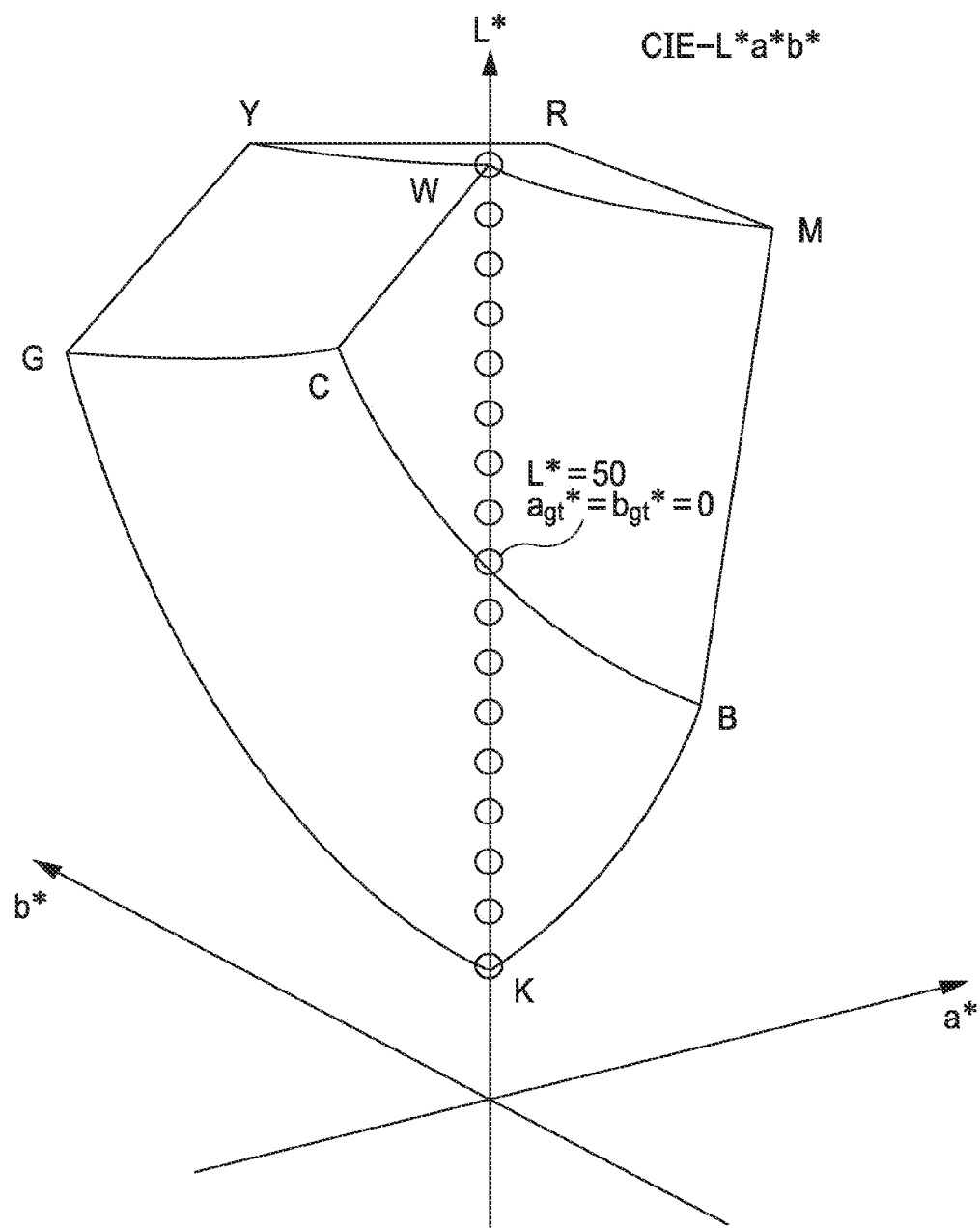
FIG. 15 is a diagram illustrating a situation in which grid points corresponding to gray axis grid points are constrained to a gray target.

FIG. 15 shows a situation in which the positions (color values) of the grid points corresponding to gray axis grid points are constrained to the gray target. As shown in the drawing, the grid points (white circles) corresponding to the gray axis grid points are constrained to represent the positions that equally divide the segment (gray target), which connects the paper black points and the paper white points on the L* axis of the L*a*b* color space, into 16 pieces. In addition, according to the method disclosed in JP-A-2006-217150, the specific grid points is constrained to specific positions of the L*a*b* color space. As described above, by equally constraining the grid points on the L* axis of the L*a*b* color space, it is possible to improve precision of interpolation calculation around the gray axis which is performed when creating the color correction LUTs 610 and 620 by using the base LUTs 510 and 520 after the smoothing processing. Accordingly, it is possible to create the color correction LUTs 610 and 620 excellent in the gradation and the color reproducibility around the gray axis.

2-3. Smoothing Processing (Smoothing and Optimization Processing)

Figure 16:
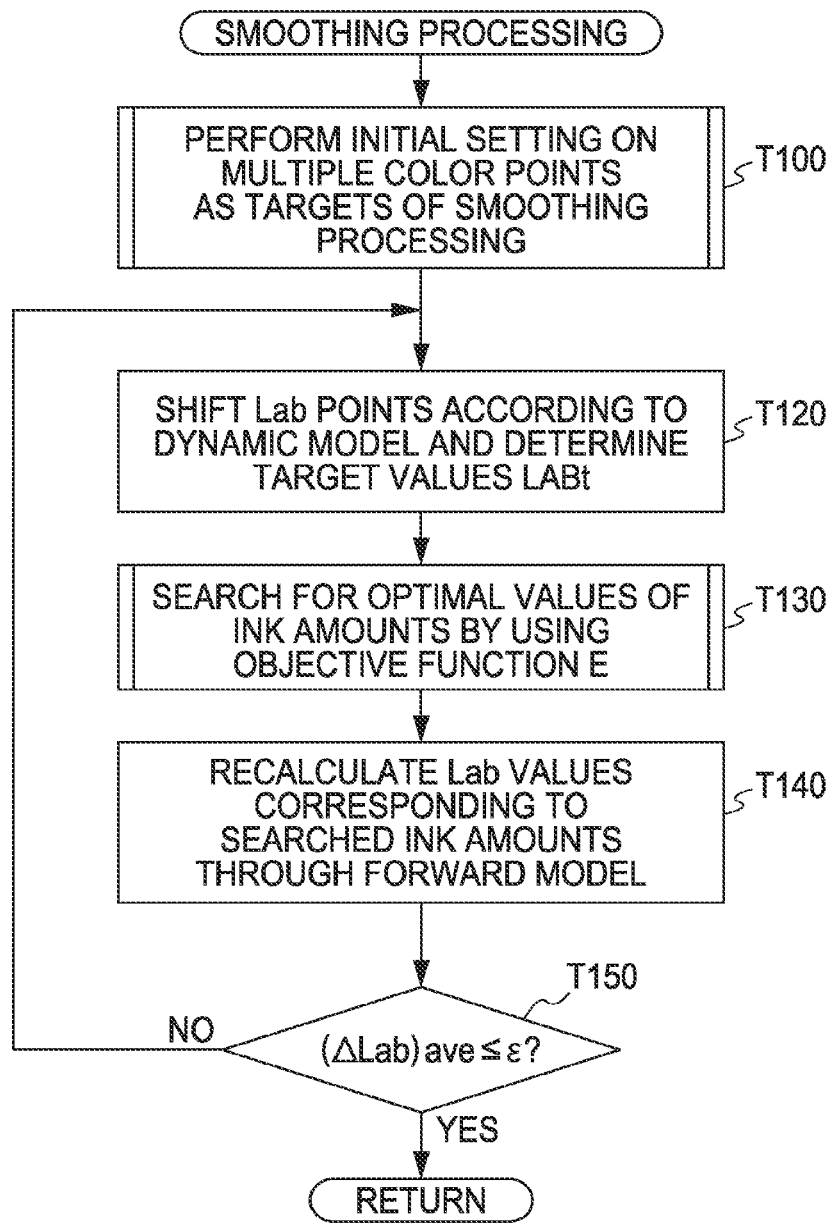
FIG. 16 is a flowchart illustrating a typical processing sequence of smoothing-processing.

FIG. 16 is a flowchart illustrating a typical processing sequence of the smoothing processing (step S300 of FIG. 10). In step T100, the base LUT generation module 100 initially sets a plurality of grid points serving as the smoothing processing targets.

Figure 17:
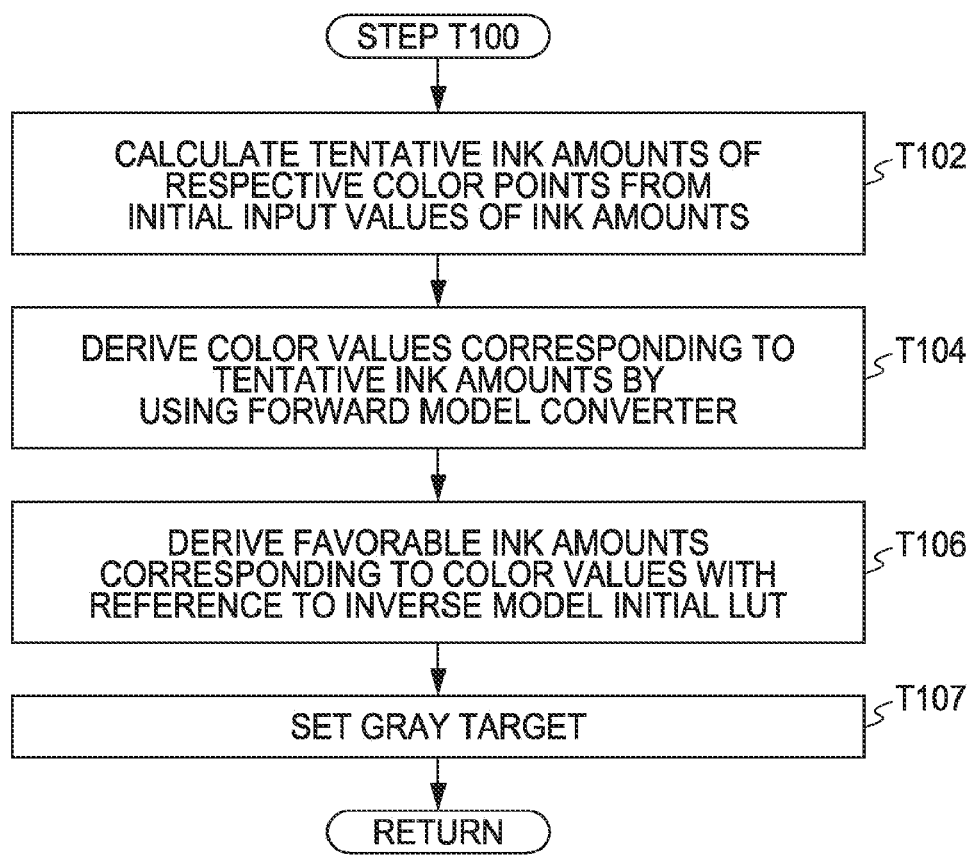
FIG. 17 is a flowchart illustrating in detail the sequence of step T100 of FIG. 16.

FIG. 17 is a flowchart illustrating in detail the sequence of step T100. In step T102, tentative ink amounts of the grid points as the smoothing processing targets are determined from the initial input values of the ink amounts (FIG. 11B, FIG. 13B). For example, in the smoothing processing for 3D-LUT, a tentative ink amount $I_{j(R, G, B)}$ for input grid points is determined according to the following Expressions (2) and (3).

$$I_{j(R,G,B)} = (1-r_R)(1-r_G)(1-r_B)I_{j(0,0,0)} + (1-r_R)(1-r_G)r_B I_{j(0,0,255)} + \\ (1-r_R)r_G(1-r_B)I_{j(0,255,0)} + r_R(1-r_G)(1-r_B)I_{j(255,0,0)} + \\ (1-r_R)r_G r_B I_{j(0,255,255)} + r_R(1-r_G)r_B I_{j(255,0,255)} + \\ r_R r_G(1-r_B)I_{j(255,255,0)} + r_R r_G r_B I_{j(255,255,255)}$$ (2)

$$r_R = \frac{R}{255}, r_G = \frac{G}{255}, r_B = \frac{B}{255}$$ (3)

Here, $I_{(R, G, B)}$ represents the ink amount $I_j$ (in the example of FIGS. 11A to 11C, the ink amount $I_j$ of four type inks) of the entire ink set (the sum of ink amounts of the plurality of inks) for the RGB values of the input grid points. The ink amounts (tentative ink amounts) for input grid points, which have RGB values of 0 or 255, are, values which are input by the user in advance in step S200 of FIG. 10. According to Expressions (2) and (3), it is possible to derive the tentative ink amount $I_{(R, G, B)}$ for arbitrary RGB values.

In the smoothing processing for 4D-LUT, the tentative ink amount $I_{(C, M, Y, K)}$ for each input grid point is determined according to the following Expressions (4) and (5).

$$I_{j(C,M,Y,K)} = (1-r_C)(1-r_M)(1-r_Y)(1-r_K) \cdot I_{j(0,0,0,0)} + \\ (1-r_C)(1-r_M)(1-r_Y)r_K I_{j(0,0,0,255)} + \\ (1-r_C)(1-r_M)r_Y(1-r_K)I_{j(0,0,255,0)} + \\ (1-r_C)r_M(1-r_Y)(1-r_K)I_{j(0,255,0,0)} + \\ r_C(1-r_M)(1-r_Y)(1-r_K)I_{j(255,0,0,0)} + \\ (1-r_C)(1-r_M)r_Y r_K I_{j(0,0,255,255)} + \\ (1-r_C)r_M(1-r_Y)r_K I_{j(0,255,0,255)} + \\ r_C(1-r_M)(1-r_Y)r_K I_{j(255,0,0,255)} + \\ (1-r_C)r_M r_Y(1-r_K)I_{j(0,255,255,0)} + \\ r_C(1-r_M)r_Y(1-r_K)I_{j(255,0,255,0)} + \\ r_C r_M(1-r_Y)(1-r_K)I_{j(255,255,0,0)} + (1-r_C)r_M r_Y r_M I_{j(0,255,255,255)} + \\ r_C r_M(1-r_Y)r_K I_{j(255,255,0,255)} + r_C r_M r_Y(1-r_k)I_{j(255,255,255,0)} + \\ r_C(1-r_M)r_Y r_K I_{j(255,0,255,255)} + r_C r_M r_Y r_K I_{j(255,255,255,255)}$$ (4)

$$r_C = \frac{C}{255}, r_M = \frac{M}{255}, r_Y = \frac{Y}{255}, r_K = \frac{K}{255}$$ (5)

In addition, as can be understood from Expression (4), there are 16 initial input values of the ink amounts for 4D-LUT, and thus setting of the initial input values is complicated. Accordingly, for example, the input grid points for setting the initial input values of the ink amounts may be set as only the eight vertexes of K=0, that is, the eight vertexes (C, M, Y, K)=(0, 0, 0, 0), (0, 0, 255, 0), (0, 255, 0, 0), (0, 255, 255, 0), (255, 0, 0, 0), (255, 0, 255, 0), (255, 255, 0, 0), and (255, 255, 255, 0); and one vertex of K=255, for example, (C, M, Y, K)=(0, 0, 0, 255). Thereby, the ink amount for the grid point of K=255 may be determined in the following Expression (6) or (7).

$$I_{(C,M,Y,255)} = f_{D1}(I_{(C,M,Y,0)}) + I_{(0,0,0,255)}$$ (6)

$$I_{(C,M,Y,255)} = f_{D2}(I_{(C,M,Y,0)}) + I_{(0,0,0,255)}$$ (7)

Here, $I_{(C, M, Y, K)}$ is an ink amount calculated by an expression similar to Expression (2) mentioned above, from initial input values of the ink amounts $I_j$ at the eight vertexes of K=0. The function $f_{D1}$ of Expression (6) is a function that, if the sum total value of the value $I_{(C, M, Y, 0)}$ and the value $I_{(0, 0, 0, 255)}$ exceeds the duty limit $D_{IS}$, subtracts the value $I_{(C, M, Y, 0)}$ so that the ink amount $I_{(C, M, Y, 255)}$ is held below the duty limit $D_{IS}$. The function $f_{D2}$ of Expression (7) is a function that, if the sum total value of the value $I_{(C, M, Y, 0)}$ and the value $I_{(0, 0, 0, 255)}$ exceeds the duty limit $D_{IS}$, subtracts the entire sum total value $(I_{(C, M, Y, 0)} + I_{(0, 0, 0, 255)})$ so that the ink amount $I_{(C, M, Y, 255)}$ is held below the duty limit $D_{IS}$.

In step T104 of FIG. 17, the color values L*a*b* corresponding to the tentative ink amounts $I_j$ are derived by using the forward model converter 300. This calculation can be represented by the following Expression (8) or (9).

$$L^*_{(R,G,B)} = f_{L^*FM}(I_{(R,G,B)})$$

$$a^*_{(R,G,B)} = f_{a^*FM}(I_{(R,G,B)})$$

$$b^*_{(R,G,B)} = f_{b^*FM}(I_{(R,G,B)})$$ (8)

$$L^*_{(C,M,Y,K)} = f_{L^*FM}(I_{(C,M,Y,K)})$$

$$a^*_{(C,M,Y,K)} = f_{a^*FM}(I_{(C,M,Y,K)})$$

$$b^*_{(C,M,Y,K)} = f_{b^*FM}(I_{(C,M,Y,K)})$$ (9)

Here, $L^*_{(B, G, B)}$, $a^*_{(R, G, B)}$, $b^*_{(R, G, B)}$, $L^*_{(C, M, Y, K)}$, $a^*_{(C, M, Y, K)}$, and $b^*_{(C, M, Y, K)}$ represent color values L*a*b* converted by the forward model converter 300, and the functions $f_{L^*FM}$, $f_{a^*FM}$, and $f_{b^*FM}$ means the conversion performed by the forward model converter 300. In addition, it can be understood from these expressions that the converted color values L*a*b* are associated with the RGB values or CMYK values as the base LUT input values.

In step T106 of FIG. 17, the color values L*a*b* obtained in step T104 are reconverted into the ink amounts by using the inverse model initial LUT 410. Here, the reason for reconversion into the ink amounts using the inverse model initial LUT 410 is that the initial input values of the ink amounts $I_j$ or the tentative ink amounts, which are determined in step T102, are not necessarily the ink amounts $I_j$ favorable as the ink amounts $I_j$ for reproducing L*a*b* values. On the other hand, in the inverse model initial LUT 410, the ink amounts, which are favorable in consideration of picture quality and the like, are registered. Therefore, when the L*a*b* values are reconverted into the ink amounts $I_j$ by using the LUT, the ink amounts $I_j$, which are favorable for realizing the L*a*b* values, may be obtained as initial values. However, step T106 may be omitted. In step T107, the above-mentioned gray target on the L* axis is set.

As a result of the processing of step T100 (FIG. 17) mentioned above, the following initial values are determined for the color values as the smoothing processing targets. (1) Values of the base LUT input grid points: (R, G, B) or (C, M, Y, K). (2) Initial coordinate values of the grid points of the Lab color coordinate system corresponding to the input grid points: ($L^*_{(B, G, B)}$, $a^*_{(R, G, B)}$, $b^*_{(R, G, B)}$) or ($L^*_{(C, M, Y, K)}$, $a^*_{(C, M, Y, K)}$, and $b^*_{(C, M, Y, K)}$). (3) The initial ink amounts corresponding to the input grid points: $I_{(R, G, B)}$ or $I_{(C, M, Y, K)}$.

From the above description, it can be understood that the base LUT generation module 100 has the function of setting initial values for different input grid points from input initial values for representative input grid points.

In step T120 of FIG. 16, the base LUT generation module 100 shifts the color values in the L*a*b* space in accordance with the dynamic model mentioned above.

FIGS. 18A to 18D are explanatory diagrams illustrating the processing contents of steps T120 to T150 of FIG. 16. As shown in FIG. 18A, before the smoothing processing, there is considerable bias in the distribution of the grid points. FIG. 18B shows the positions of the grid points after an infinitesimal time increment. The L*a*b* values of the shifted color values are referred to as "target values ($L^*_t$, $a^*_t$, $b^*_t$, or $LAB_t$)". The modifier "target" means that these target values $L^*_t$, $a^*_t$, $b^*_t$ are used as target values during the processing of searching for optimal values of the ink amounts described below.

In step T130, the base LUT generation module 100 searches for optimal values of the ink amounts $I_j$ for the target values $LAB_t$ (refer to FIG. 18C) by using a preset objective function E. That is, by approximately reproducing target values $LAB_t$, the ink amounts are optimized (the optimal ink amounts are retrieved) and determined through the objective function E which is for rating the picture quality when the inks are adhered onto the designated medium by the designated ink amounts $I_j$. In the optimization using this objective function E, the ink amounts $I_j$, which are for reproducing L*a*b* values approximate to the coordinates $LAB_t$ of the color values shifted by an infinitesimal amount in the dynamic model, are designated, and among the designated ink amounts $I_j$, the ink amounts, each of which has the smaller sum of squared errors of plural parameters $\Delta L^*$, $\Delta a^*$, $\Delta GI$, $\Delta CII$, and $\Delta TI$, are determined as the optimal ink amounts $I_j$. Further, the search for the optimal ink amounts $I_j$ starts from the initial ink values of the input grid points that are set in step T100. Accordingly, the ink amounts $I_j$ obtained by the search represent corrected values of these initial the ink amounts. As described in detail later, the objective function E, which is given by Expression (EQ1), can be written as a quadratic function relating to an ink amount vector I as represented by Expression (EQ2). The optimization of the ink amounts is executed through quadratic programming by using such a quadratic objective function E. In addition, the details of the sequence of step T130 and the contents of the objective function E will be described later.

In step T140 of FIG. 16, the L*a*b* values corresponding to the ink amounts $I_j$, which are retrieved in step T130 (which are determined as the optimal values in the latest step T130), are recalculated by the forward model converter 300 (refer to FIG. 18D). The reason for recalculating the L*a*b* values at this point is that, since the retrieved ink amounts $I_j$ are the ink amounts $I_j$ that minimize the objective function E, the L*a*b* values reproduced by the ink amounts $I_j$ will diverge somewhat from the target values LAB of the optimization processing. The L*a*b* values recalculated in this fashion are used as the coordinates of the shifted grid points.

In step T150, it is determined whether or not the average amount of shift $(\Delta Lab)_{ave}$ of the color values of the respective grid points is equal to or less than a preset threshold value $\epsilon$. The average amount of shift $(\Delta Lab)_{ave}$ is an average value of differences between the color values L*a*b* of the respective grid points before the shift of step T120 and the color values thereof recalculated in step T140. If the average amount of shift $(\Delta Lab)_{ave}$ is greater than the threshold value $\epsilon$, the routine returns to step T120, and the smoothing processing of steps T120 to T150 continues. On the other hand, if the average amount of shift $(\Delta Lab)_{ave}$ is equal to or less than the threshold value $\epsilon$, the distribution of color values is made to be sufficiently smooth, and thus the smoothing processing terminates. The threshold value $\epsilon$ is a value that is determined experimentally in advance to be appropriate.

In this way, according to the typical smoothing processing (smoothing/optimization processing) of the embodiment, the search for the optimal ink amounts $I_j$ corresponding to shifted color points is performed by the optimization method while shifting the grid points for each infinitesimal time interval on the basis of the dynamic model. Then, each processing continues until the amount of shift for the grid points is sufficiently small. As a result, as shown in FIG. 11C or 13C, it is possible through the smoothing processing to obtain a smooth grid point distribution.

2-4. Contents of Optimization Processing

The objective function E of the optimization processing (refer to FIG. 18C) may be represented using a Jacobian matrix J relating to the color values (L*a*b* values) which are a function of ink amount and to picture quality rating indices. Each picture quality rating index is calculated by the picture quality rating index converter 136. As described later, each picture quality rating index is an index for rating the picture quality when the ink is adhered onto the basic medium by each ink amount. The Jacobian matrix J may be represented by, for example, the following Expression (10).

$$J = \begin{pmatrix} \frac{\partial L^*}{\partial I_1} & \frac{\partial L^*}{\partial I_2} & \cdots & \frac{\partial L^*}{\partial I_4} \\ \frac{\partial a^*}{\partial I_1} & \frac{\partial a^*}{\partial I_2} & \cdots & \frac{\partial a^*}{\partial I_4} \\ \frac{\partial b^*}{\partial I_1} & \frac{\partial b^*}{\partial I_2} & \cdots & \frac{\partial b^*}{\partial I_4} \\ \frac{\partial GI}{\partial I_1} & \frac{\partial GI}{\partial I_2} & \cdots & \frac{\partial GI}{\partial I_4} \\ \frac{\partial CII_A}{\partial I_1} & \frac{\partial CII_A}{\partial I_2} & \cdots & \frac{\partial CII_A}{\partial I_4} \\ \vdots & \vdots & & \vdots \\ \frac{\partial CII_{F12}}{\partial I_1} & \frac{\partial CII_{F12}}{\partial I_2} & \cdots & \frac{\partial CII_{F12}}{\partial I_4} \\ \frac{\partial GMI}{\partial I_1} & \frac{\partial GMI}{\partial I_2} & \ddots & \frac{\partial GMI}{\partial I_4} \\ \frac{\partial TI}{\partial I_1} & \frac{\partial TI}{\partial I_2} & \cdots & \frac{\partial TI}{\partial I_4} \end{pmatrix} \quad (10)$$

The first to third rows of the right side of Expression (10) show values derived by partial differentiation of the color values L*a*b* with the individual ink amounts $I_j$. The fourth and subsequent rows show values derived by partial differentiation, with the individual ink amounts $I_j$, of picture quality rating indices (the granularity index GI, the color inconstancy index CII, the gamut rating index GMI, and the total ink amount TI) that represent the picture quality of a color patch printed with one set of the ink amounts $I_j$ (j=1 to 8). In addition, the picture quality rating indices GI, CII, GMI, and TI are indices for which smaller values tend to be associated with better picture quality of the color patch reproduced with an ink amount $I_j$.

Using the forward model converter 300, the color values L*a*b* are converted from the ink amounts $I_j$ through the following Expression (11).

$$L^* = f_{L^*FM}(I)$$

$$a^* = f_{a^*FM}(I)$$

$$b^* = f_{b^*FM}(I) \quad (11)$$

Generally, the picture quality rating indices GI, CII, TI, and GMI can also be respectively represented as functions of the ink amounts $I_j$ (j=1 to 4).

$$GI = f_{GI}(I) \quad (12)$$

$$CII_{ill} = f_{CII(ill)}(I) \quad (13)$$

$$TI = \sum I_j \quad (14)$$

$$GMI = \sqrt{\{L^*_{GM} - f_{L^*FM}(I)\}^2 + \{a^*_{GM} - f_{a^*FM}(I)\}^2 + \{b^*_{GM} - f_{b^*FM}(I)\}^2} \quad (15)$$

In addition, the subscript "ill" of the color inconstancy index $CII_{ill}$ of Expression (13) represents the type of a light source. In Expression (10) mentioned above, as the types of light sources, the standard light source A and the standard light source F12 are used. In addition, although an example of a method of calculating the color inconstancy index CII will be described later, any number of indices, which relate to one or a plurality of types of standard light source, can be used as the color inconstancy index CII.

The granularity index GI can be calculated by using various types of granularity prediction models, and can be calculated through, for example, the following Expression (16).

$$GI = a_L \int \sqrt{WS(u)} VTF(u) du \quad (16)$$

Here, aL is a lightness correction coefficient, WS(u) is the Wiener spectrum of an image indicated by the halftone data utilized to print the color patch, VTF(u) is a visual spatial frequency characteristic, and u is a spatial frequency. The halftone data is determined from the ink amount $I_j$ of the color patch by a halftoning processing (one the same as the halftoning processing executed by the printer 20). While Expression (16) mentioned above is represented in one dimension, it is a simple matter to calculate the spatial frequency of a two-dimensional image as the spatial frequency function. As methods of calculating the granularity index GI, for example, it is possible to use the method described in JP-A-2006-103640 which is disclosed by the applicants of the invention. In the method of JP-A-2006-103640, the granularity index GI in the case of performing printing with arbitrary ink amounts $I_j$ is predicted through a neural network learned on the basis of the granularity index GI obtained by measuring the color patches which are formed in a way of adhering the inks onto the printing medium by test ink amounts $I_j$. In this embodiment, the neural network is learned on the basis of the measurement result of the color patches formed on the basic medium. In practice, the picture quality rating index converter 136 inputs arbitrary ink amounts $I_j$ to the neural network, thereby calculating the granularity index GI when the inks are adhered onto the basic medium by the ink amounts $I_j$.

The color inconstancy index CII is given by, for example, the following Expression (17).

$$CII = \left[\left(\frac{\Delta L^*}{2S_L}\right)^2 + \left(\frac{\Delta C^*_{ab}}{2S_C}\right)^2 + \left(\frac{\Delta H^*_{ab}}{S_H}\right)^2\right] \quad (17)$$

Here, $\Delta L^*$ is the lightness difference of a color patch observed under two different observation conditions (under different light sources), $\Delta C^*_{ab}$ is the hue difference, and $\Delta H^*_{ab}$ is the hue difference. When calculating the color inconstancy index CII, L*a*b* values under the two different observation conditions are converted in a standard observation condition (for example, observation under a standard light source D65) by using a chromatic-adaptation convert (CAT). In addition, the L*a*b* values under the observation condition are calculated by the above-mentioned forward model converter 300. Since the forward model converter 300 (spectrum printing model converter 310) is provided for the basic medium, the forward model converter 300 is able to rate, on the basis of the color inconstancy index CII, the color inconstancy in the case where the respective inks are adhered onto the basic medium by the ink amounts $I_j$. With regard to the CII, reference may be made to Billmeyer and Saltzman's Principles of Color Technology, 3rd Edition, John Wiley & Sons, Inc., 2000, p. 129, pp. 213 to 215.

The gamut rating index GMI is given by the color difference $\Delta E$ (CIE 1976) between the target color value $L_{GM}^* a_{GM}^* b_{GM}^*$ and the color value L*a*b* obtained by the forward model converter 300. The target color value $L_{GM}^* a_{GM}^* b_{GM}^*$ is set as a color value which is located at the outermost periphery of the L*a*b* color space. The gamut rating index GMI may not be taken into account for all grid points, but may be taken into account only for the vertexes, the edge lines, and the grid points on the outer surface. Further, the target color value $L_{GM}^* a_{GM}^* b_{GM}^*$ is different for each grid point. For example, the hue angle and the color value L*a*b* obtained by the forward model converter 300 are the same. In addition, if a color value at a higher saturation (the outermost periphery of the L*a*b* color space) is set as the target color value $L_{GM}^* a_{GM}^* b_{GM}^*$, then it is possible to rate whether or not the gamut is wider on the higher saturation side. It should be noted that, by setting the target color values $L_{GM}^* a_{GM}^* b_{GM}^*$ for the grid points corresponding to the gray axis grid points as the color values of the gray target, it is also possible to constrain the grid points to the gray target.

For example, the component relating to the L* value of the plurality of components (also called elements) of the Jacobian matrix J is given by Expression (18).

$$\frac{\partial L^*}{\partial I_j} = \frac{f_{L^*FM}(I+h) - f_{L^*FM}(I)}{h_j} \quad (18)$$

Here, $f_{L^*FM}$ is a conversion function of converting the ink amount I based on the forward model into the L* value, $I_r$ is a current value of the ink amount I (the ink amount before the smoothing and optimization processing), and $h_j$ is an infinitesimal variation of the j-th ink amount $I_j$. As for the L* value, Expression (17) is exemplified, but it is the same for the a*b* value. Since the L*a*b* value is calculated by the above-mentioned forward model converter 300 (Expression (11)), the L*a*b* value is a color value in the case where the respective inks are adhered onto the basic medium by the ink amounts $I_j$. Other components except for the bottom row of the Jacobian matrix J are expressed in the same format. On the basis of Expressions (14) and (18), when the elements at the bottom row of the Jacobian matrix J are calculated, all the elements at the bottom row of Jacobian matrix J are set to 1. The reason is that, in the case where the ink amount $I_j$ of a certain ink is varied by only an infinitesimal variation $h_j$, the variation of the total ink amount TI is also equal to $h_j$.

The objective function E for optimization is given by, for example, the following Expression (19).

$$E = w_{L^*}(\Delta L^* - \Delta L^*_t)^2 + w_{a^*}(\Delta a^* - \Delta a^*_t)^2 + w_{b^*}(\Delta b^* - \Delta b^*_t)^2 + w_{GI}(\Delta GI - \Delta GI_t)^2 + w_{CII(A)}(\Delta CII_A - \Delta CII_{At})^2 + \ldots + w_{CII(F12)}(\Delta CII_{F12} - \Delta CII_{F12t})^2 + w_{TI}(\Delta TI - TI_t)^2 + w_{GMI}(\Delta GMI - GMI_t)^2 \quad (19)$$

Here, $w_{L^*}$, $w_{a^*}$, and the like, which appear at the beginning of each term on the right side, are weights of the respective terms. The weights $w_{L^*}$, $w_{a^*}$ . . . are designated by a user in step S02, and the weights $w_{L^*}$, $w_{a^*}$ . . . stored in the setting table STB are used. In particular, when a user does not shift the position of the pointer from the initial position, the default weights $w_{L^*}$, $w_{a^*}$ . . . are used. Accordingly, the items, on which weight is laid by the objective function E, are determined in accordance with a medium and a setting of a user.

The first term $w_{L^*}(\Delta L^* - \Delta L^*_t)^2$ on the right side in Expression (19) is a squared error relating to variations $\Delta L^*$ and $\Delta L^*_t$ of the color value L*. The variations $\Delta L^*$ and $\Delta L^*_t$ are given by the following expressions.

$$\Delta L^* = \sum \frac{\partial L^*}{\partial I_j} \Delta I_j = \sum \frac{\partial L^*}{\partial I_j}(I_j - I_{jr}) \quad (22)$$

$$\Delta L^*_t = L^*_t - f_{L^*FM}(I_r) \quad (21)$$

The partial differentiation value on the right side in Expression (20) mentioned above is a value given by a Jacobian matrix (Expression (10)), is the ink amount obtained as a result of the optimization processing, and $I_{jr}$ is the current ink amount. The first variation $\Delta L^*$ is a quantity derived by subjecting the ink amount variation $\Delta I_j$, attributed to the optimization processing, to linear conversion with a partial differentiation value which is a component of the Jacobian matrix. On the other hand, the second variation $\Delta L^*_t$ is the difference between the target value $L^*_t$ obtained in the smoothing processing of step T120, and the color value $L^*(I_r)$ given by the current ink amount $I_r$. It is possible to think of the second variation $\Delta L^*_t$ as being the difference between the L* values before and after the smoothing processing.

The second and following terms on the right side in Expression (19) are also given by expressions analogous to Expressions (20) and (21) mentioned above. Specifically, the objective function E is given as the sum of the squared error of the first variations $\Delta L^*$, $\Delta a^*$, $\Delta b^*$, $\Delta GI$ . . . obtained through linear conversion by a component of a Jacobian matrix of the ink amount variation $\Delta I_j$ attributed to the optimization processing, and second variations $\Delta L^*_t$, $\Delta a^*_t$, $\Delta b^*_t$, $\Delta GI_t$ . . . observed before and after the smoothing processing in relation to parameters L*, a*, b*, and GI.

However, using a matrix, it is possible for the first variations $\Delta L^*$, $\Delta a^*$, $\Delta b^*$, $\Delta GI$ . . . to be written in the form of Expressions (22) and (23).

$$\begin{pmatrix} \Delta L^* \\ \Delta a^* \\ \Delta b^* \\ \Delta GI \\ \Delta CII_A \\ \vdots \\ \Delta CII_{F12} \\ \Delta GMI \\ \Delta TI \end{pmatrix} = J \cdot \Delta I \quad (22)$$

$$\Delta I = I - I_r \quad (23)$$
$$= \begin{pmatrix} \Delta I_1 \\ \Delta I_2 \\ \vdots \\ \Delta I_4 \end{pmatrix}$$

Using a matrix, Expression (19) mentioned above can be denoted as Expression (24).

$$E = (J(I-I_r) - \Delta M)^T W_M (J(I-I_r) - \Delta M) = (I^T J^T - (I_r^T J^T + \Delta M^T)) W_M (JI - (JI_r + \Delta M)) = I^T J^T W_M JI - 2(I_r^T J^T + \Delta M^T) W_M JI + (I_r^T J^T + \Delta M^T) W_M (JI_r + \Delta M) \quad (24)$$

Here, T represents the transposition of the matrix. The matrix $W_M$ is a diagonal matrix (refer to Expression (25)) with weights positioned at respective diagonal elements, and the matrix $\Delta M$ is a target variation vector (refer to Expression (26))-relating to the parameters.

$$W_M = \begin{pmatrix} w_{L^*} & 0 & & & & & 0 \\ & w_{a^*} & & & & & \\ & & w_{b^*} & & & & \\ & & & w_{GI} & & & \vdots \\ \vdots & & & & \ddots & & \\ & & & & & w_{CII(F12)} & \\ & & & & & & w_{GMI} & 0 \\ 0 & & \cdots & & & & 0 & w_{TI} \end{pmatrix} \quad (25)$$

$$\Delta M = \begin{pmatrix} \Delta L_t^* \\ \Delta a_t^* \\ \Delta b_t^* \\ \Delta GI_t \\ \Delta CII_{A_t} \\ \vdots \\ \Delta CII_{F12_t} \\ \Delta GMI_t \\ \Delta TI_t \end{pmatrix} = \begin{pmatrix} L_t^* - f_{L^*FM}(I_r) \\ a_t^* - f_{a^*FM}(I_r) \\ b_t^* - f_{b^*FM}(I_r) \\ GI_t - GI(I_r) \\ CII_{At} - CII_A(I_r) \\ \vdots \\ CII_{F12} - CII_{F12}(I_r) \\ GMI_t - GMI(I_r) \\ TI_t - \sum I_{jr} \end{pmatrix} = const. \quad (26)$$

The right side of Expression (26) is the difference between the target values relating to the parameters L*, a*, b*, CII . . . (also called "elements"), and parameter values given by the current ink amount $I_r$. Among the target values for the various parameters, the color values $L^*_t$, $a^*_t$, and $b^*_t$ are determined by the smoothing processing (step T120). There are any number of determination methods for the target variations $\Delta GI_t$, $\Delta CII_t$, $\Delta TI_t$, and $\Delta GMI_t$ which are derived from target values for the picture quality rating indices and from current picture quality rating indices. The first method is one in which predetermined constants (for example, $\Delta GI_t = -2$, $\Delta CII_t = -1$, $\Delta TI_t = -1$, and $\Delta GMI_t = -1$) are used as the target variations $\Delta GI_t$, $\Delta CII_t$, $\Delta TI_C$, and $\Delta GMI_t$. In addition, the reason for using negative values as constants is that these picture quality rating indices are indices for which smaller values indicate higher picture quality. Further, it is preferable that the target value $GI_t$ of the granularity index GI should be zero. The second method involves defining the target values $GI_t$, $CII_t$, $TI_t$, and $\Delta GMI_t$ as functions of the target values $L^*_t$, $a^*_t$, and $b^*_t$ of color values. As described above, since the target values of the parameters are determined before the optimization processing, all of the respective components of the target variation vector $\Delta M$ are constants.

Among the terms in the right side in Expression (24), the third term $(I_r^T J^T + \Delta M^T) W_M (JI_r + \Delta M)$ is a constant since the term does not include the ink amount I obtained as a result of the optimization processing. Ordinarily, the objective function E used for optimization does not require a constant term. Accordingly, when eliminating the constant term from Expression (24) and multiplying the whole expression by ½, it is possible to obtain the following Expression (27).

$$E = \frac{1}{2} I^T J^T W_M JI - (I_r^T J^T + \Delta M^T) W_M JI \quad (27)$$

Here, when a matrix A and a vector g are defined as represented by the following Expressions (28) and (29), Expression (27) mentioned above may be written as Expression (30).

$$A = J^T W_M J \quad (28)$$

$$g = (I_r^T J^T + \Delta M^T) W_M J \quad (29)$$

$$E = \frac{1}{2} I^T A I - gI \quad (30)$$

It can be understood that the objective function E given by Expression (30) is a quadratic form relating to an ink amount vector I obtained through optimization. Expression (EQ1) and Expression (EQ2) shown in FIG. 18C are respectively the same as Expression (19) and Expression (30).

It is possible to employ quadratic programming as the optimization method because the optimization processing of the embodiment employs the quadratic objective function E as shown in Expression (30). Here, the "quadratic programming" means quadratic programming in a narrowly defined sense that excludes sequential quadratic programming. Through utilization of quadratic programming employing an objective quadratic function, it is possible for the processing to be appreciably faster, as compared with the case of quasi-Newton methods, sequential quadratic programming, or other nonlinear programming methods.

However, the search for the ink amounts through the optimization processing in the embodiment is executed under the following conditions: (optimization condition) the objective function E has to be minimized; and (constraint condition) the duty limit $D_{Ij}$ has to be kept.

In the case of the basic medium, the duty limit $D_{Ij}$ registered in the setting table STB in step S04 is used as a duty limit as it is. In addition, the picture quality rating index converter 136 and the forward model converter 300 (spectrum printing model converter 310) are able to predict the color values, the picture quality rating indices GI, and the like for the ink amounts $I_j$ which satisfies the duty limits $D_{Ij}$.

The constraint condition relating to the duty limit $D_{Ij}$ can be expressed by the following Expression (31).

$$b^T I = (1\ 0\ \ldots\ 0) I \leq D_I \quad (31)$$

Here, the vector b is a coefficient for identifying ink types as targets of the duty limit, and the elements of the vector are either 0 or 1. For example, in the case of a duty limit relating to a single type of ink, only one element of vector b is 1. On the other hand, in the case of a duty limit relating to the total ink amount of all the inks, all the elements of vector b are 1. The $D_I$ on the right side of Expression (31) is a vector which includes duty limits $D_{Ij}$ as elements thereof. On the right and left sides of Expression (31), j=1 to 8. That is, when the constraint condition on the duty limit is intended to be applied, the total ink amounts $I_5$ to $I_7$ of the secondary colors and the total sum ink amount $I_8$ are also taken into account.

The respective ink amounts $I_j$ (j=1 to 8) have the constraint that they are not negative. This nonnegative limit is represented by the following Expression (32).

$$b_{nz}^T I = (1\ 0\ \ldots\ 0) I \geq 0 \quad (32)$$

When the above-mentioned Expression (31) and Expression (32) are combined, the duty limit is given by the following Expression (33).

$$BI = \begin{pmatrix} 1 & 0 & \ldots & 0 \\ 0 & 1 & & \vdots \\ \vdots & & \ddots & 0 \\ 0 & \ldots & 0 & 1 \\ & & & \\ -1 & 0 & \ldots & 0 \\ 0 & -1 & & \vdots \\ \vdots & & \ddots & 0 \\ 0 & \ldots & 0 & -1 \end{pmatrix} I \leq \begin{pmatrix} D_{I1} \\ \vdots \\ \vdots \\ D_{I8} \\ \\ 0 \\ \vdots \\ \vdots \\ 0 \end{pmatrix} \quad (33)$$

The constraint represented by Expression (33) is a linear inequality constraint. Generally, it is possible for quadratic programming to be executed under a linear constraint. That is, in the optimization processing of the embodiment, quadratic programming is executed under the constraint of Expression (33) using the quadratic objective function E given by Expression (30) mentioned above, in order to search for the optimal ink amounts. As a result, it is possible for ink amount searches to be executed rapidly, while rigorously satisfying this linear constraint.

Figure 19:
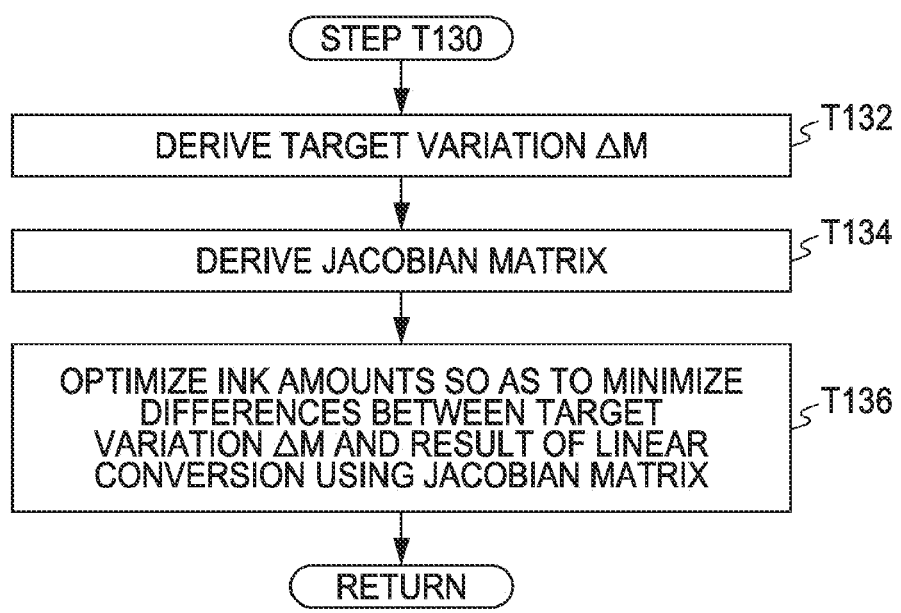
FIG. 19 is a flowchart illustrating in detail the sequence of the optimization processing (step T130 of FIG. 16).

FIG. 19 is a flowchart illustrating in detail the sequence of the optimization processing (step T130 of FIG. 16). In step T132, first, the target variation ΔM given by Expression (26) mentioned above is derived. As described above, this target variation ΔM is determined on the basis of the target values $L^*_t$, $a^*_t$, and $b^*_t$ obtained in step T120 (smoothing processing), the current ink amount $I_r$ and the like.

In step T134, the Jacobian matrix J given by Expression (10) mentioned above is calculated. In addition, as exemplified in Expression (18) mentioned above, the components of the Jacobian matrix J are values that are calculated in relation to the current values $I_r$ of the ink amounts (values before smoothing/optimization).

In step T136, optimization of the ink amounts $I_j$ is carried out so as to minimize differences between the results of linear conversion based on the Jacobian matrix J, that is, ΔL*, Δa*, Δb*, ΔGI ... and the target variation ΔM ($L^*_t$, $\Delta a^*_t$, $\Delta b^*_t$, $\Delta GI_t$, ...). Specifically, among a plurality of sets (a single set of ink amounts is constituted by $I_1$, $I_2$, $I_3$, and $I_4$) of ink amounts for reproducing L*, a*, and b* in the vicinity of the target values $LAB_t$ and keeping the duty limit, a set of ink amounts minimizing the objective function E is determined. This optimization is accomplished by executing quadratic programming using the quadratic objective function E given by Expression (30) mentioned above. As described above, in step S04, the ink amounts $I_j$ is optimized under the constraint based on the duty limit $D_{ij}$ stored in the setting table STB, and thus it is possible to obtain other optimization result in accordance with the medium. In particular, the magnitude of the gamut greatly depends on the duty limit $D_{ij}$, and is thus different between the respective media. It is apparent that since the color values obtained by the picture quality rating index converter 136 and the forward model converter 300 and the prediction results of the picture quality rating index GI and the like are also different in accordance with the respective media, it becomes optimization results of other ink amounts $I_j$.

In addition, as described previously in the flowchart of FIG. 16, if it is decided that convergence is insufficient after the optimization processing of step T130 ("No" in step T150), the smoothing processing (step T120) and the optimization processing (step T130) are executed again. At this time, values obtained from the previous smoothing/optimization processing are used as the initial values of the smoothing/optimization processing. This repeated processing is not essential, and it may be sufficient for the smoothing/optimization processing to be executed at least once.

3. Printer Adjustment

Figure 20:
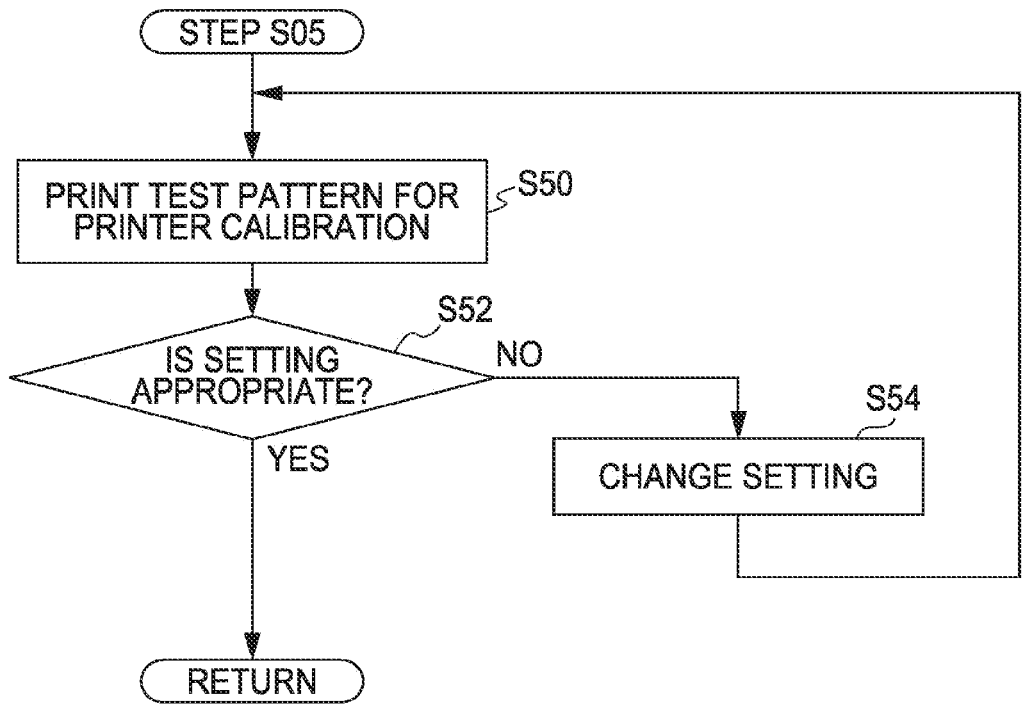
FIG. 20 is a flowchart illustrating details of printer adjustment processing (setting adjustment of printing environment).

Next, details of step S05 (FIG. 2) will be described. FIG. 20 shows the details of step S05 by using a flowchart. In step S50, the printer adjustment module 500 prints a test pattern for printer adjustment onto the designated medium. Specifically, the printer adjustment module 500 generates picture data for printing the test pattern for printer adjustment, and outputs the picture data to the halftoning section FW4 of the printer 20. The picture data is data of a picture of which the respective pixels have the respective ink amounts.

Figure 21:
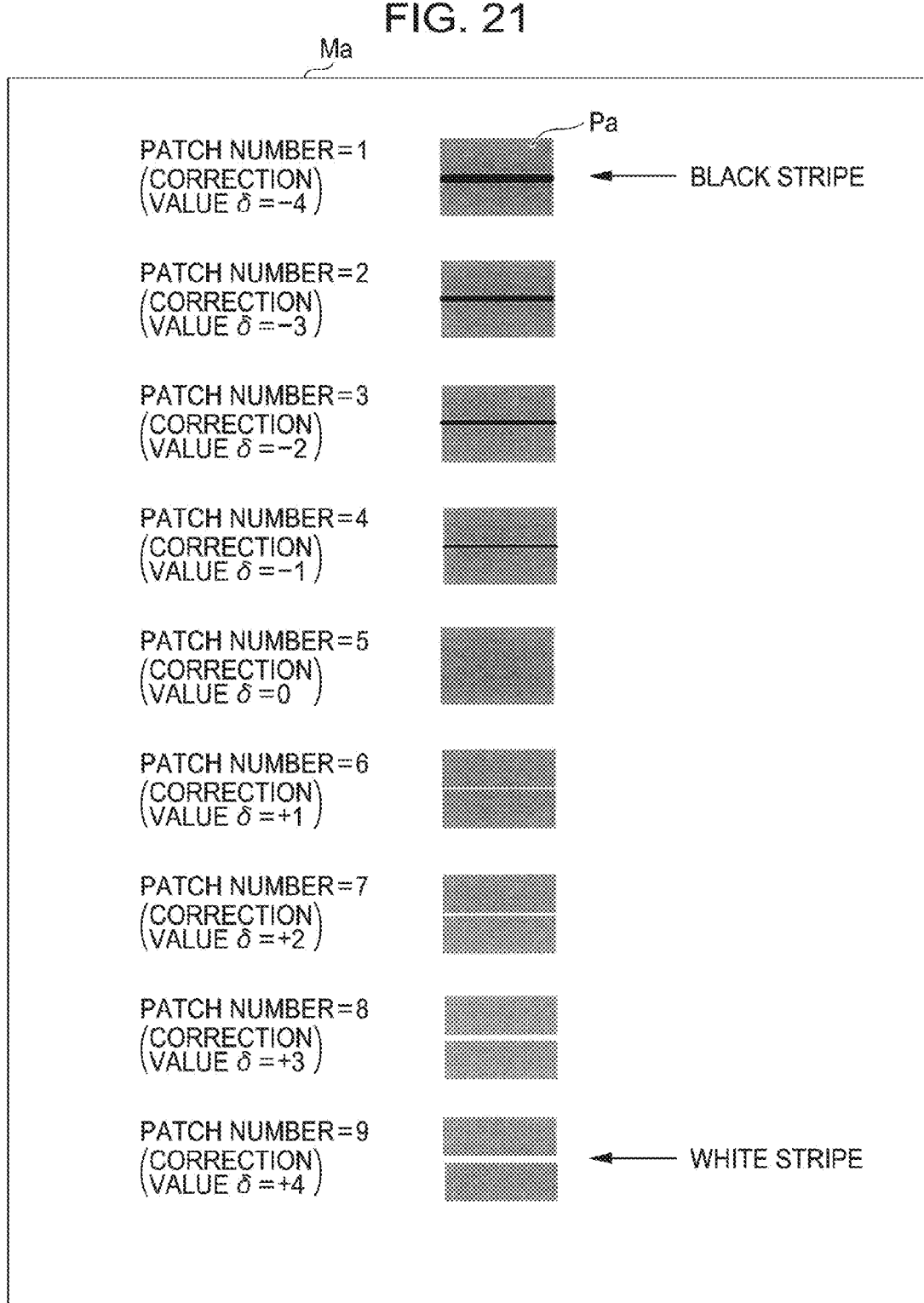
FIG. 21 is a diagram illustrating an example of test patterns printed in the printer adjustment processing.

FIG. 21 exemplifies the test pattern which is printed as one type of the test pattern for printer adjustment in order to determine whether or not the setting of the paper feeding amount is favorable for the printer 20. In the test pattern, a plurality (9) of patches Pa, of which paper feeding correction amounts δ are set to be different from each other for the designated medium Ma, are printed along the paper feeding direction of the printer 20. Each patch Pa is, for example, a gray patch with a predetermined concentration (ink amount) using a K ink. The areas of the upper half and the lower half constituting a single patch Pa are printed by different passes (here, the downstream side in the paper feeding direction is assumed as the "upper side" of the patch Pa, and the upstream side in the paper feeding direction is assumed as the "lower side"). The paper feeding amount between the pass for printing the upper half area and the pass for printing the lower half area is corrected by using a correction amount δ. That is, the relative positions of the upper half and the lower half of each patch Pa are different in accordance with the correction amount δ. As a result, in each patch Pa, a black stripe (a stripe with a dark color) or a white stripe (a stripe with a light color), which is substantially parallel with the main scanning direction, appears in accordance with the relationship between the correction value δ and a unique paper feeding error of the printer 20. The stripe-shaped color unevenness is also called banding. The patch numbers 1 to 9, which are printed aside of the respective patches Pa, are associated with the correction values in advance. Here, the correction values δ of FIG. 21 are noted for convenience of description, and are thus not printed in practice. The unit of the correction amount δ is, for example, pulse, and this corresponds to the pulse from the rotary encoder provided in the paper feeding roller. The correction amount δ is a command value for the paper feeding mechanism 57, and in the paper feeding mechanism 57, controls the rotation amount of the paper feeding roller using the paper feeding motor on the basis of the correction amount δ.

In the test pattern of FIG. 21, the correction amount δ of the patch Pa (number=5) at the center thereof is referred to as a "setting value of the current correction amount δ". The printer 20 has a unique paper feeding error for each product. For this reason, in the printer 20, the correction amount δ is set in the ROM 51 before shipment of the product so as to realize ideal paper feeding by negating the unique paper feeding error, and is thus used in correcting the paper feeding amount. Accordingly, "the setting value of the current correction amount δ" is a default value, which is set at the time of shipment of the product, when the correction amount δ is adjusted first after the shipment. In addition, when the default value is changed after the shipment, "the setting value of the current correction amount δ" is a setting value of the latest correction amount δ. Hence, as exemplified in FIG. 21, when there is no banding in the patch Pa at the center, it is not necessary to change "the setting value of the current correction amount δ". On the other hand, when there is a banding in the patch Pa at the center, it is preferable to newly employ the correction amount δ corresponding to the patch Pa with a different number in which it is most difficult to view a banding.

In step S52, the printer adjustment module 500 receives an input based on the test pattern, which is printed in step S50, through the display device and the input device, and determines whether or not the printing environment of the printer 20 is set to be favorable. In step S50, when the test pattern shown in FIG. 21 is printed, the input of the number of the patch Pa from a user is received. In this case, if the number 5 is input, it can be determined that "the setting value of the current correction amount δ" is favorable (Yes). In contrast, if one of the numbers 1 to 4 and 6 to 9 is input, it can be determined that "the setting value of the current correction amount δ" is not favorable (No), and the routine advances to step S54. In step S54, the printer adjustment module 500 changes the setting of the printing environment on the basis of the input in step S52, and subsequently the routine returns to step S50. That is, when the test pattern as shown in FIG. 21 is printed and one of the numbers 1 to 4 and 6 to 9 of the patches Pa is input, a command is issued to the printer 20, "the setting value of the current correction amount δ" is in the ROM 51 is rewritten into a correction value δ corresponding to the input number. Thereby, at the time of determining "Yes" in step S52, it is possible to adjust the paper feeding amount in the printer 20 such that a banding does not appear when the printing is performed on the designated medium. In addition, as for the adjustment of the paper feeding amount, appropriately refer to JP-A-2011-5875.

The items of the printing environment in the printer 20 as a target of the setting adjustment of the adjustment processing (FIG. 20) is not limited to the paper feeding amount. The printer adjustment module 500, for example, may adjust setting of the platen gap PG when the printer 20 performs printing on the designated medium. The platen gap PG is a distance between the ink ejection face of the printing head 59 and the platen 62 (refer to FIG. 7). The printer 20 changes the height position (distance from the printing head 59) of the platen 62 through a prescribed drive mechanism. The difference of the platen gap PG has an effect on the distance at which ink droplets ejected from the printing head 59 is landed on the medium. If the corresponding distance is different, spread of the ink droplets landed on the medium is different. Hence, in order to obtain the ideal printing result without color unevenness and the like, it is also necessary to adjust the platen gap PG.

Therefore, the printer adjustment module 500 causes the printer 20 to print the patch (test pattern) on the designated medium in each state where the platen gaps PG is differently set (each of a plurality of height positions from the platen 62 including the setting value of the height position of the platen 62 currently made in the ROM 51) (step S50). Then, among the plurality of patches for which settings of the platen gap PG are different, designation of the patch (for example, designation using the number of the patch), of which the printing result is most favorable (in which there is no unevenness), is received from a user, and on the basis of the received designation, it is determined whether or not the current setting of the platen gap PG is favorable (step S52). If the setting is not favorable (if "No" in step S52, that is, if the patch printed under a setting different from the current setting of the platen gap PG is designated), on the basis of the designation in step S52, the module causes the printer 20 to change the setting of the platen gap PG (step S54), and the routine returns to step S50. Thereby, at the time of determining "Yes" in step S52, it is possible to set the platen gap PG in the printer 20 such that the picture quality deterioration such as color unevenness is not caused by inappropriateness of the platen gap PG when the printing is performed on the designated medium.

Further, in the adjustment processing (FIG. 20), not only the paper feeding amount and the setting of the platen gap PG, but also the various settings for drying of the printed picture can be adjusted. Examples of the various settings for the drying include setting of temperature (temperature of a heater) of hot air generated by the above-mentioned dryer 65, wind-power setting of hot air generated by the dryer 65, velocity setting of movement of the printing head 59 at the time of the main scanning, and the like. The difference in setting has an effect on occurrence of ink bleeding and blurring in the printing result. The printer adjustment module 500 causes the printer 20 to print the patch (test pattern) on the designated medium in each state where various settings for the drying are differently made (each of a plurality of settings for the drying including the setting for the drying currently made in the ROM 51) (step S50). Then, among the plurality of patches for which settings for the drying are different, designation of the patch (for example, designation using the number of the patch), of which the printing result is most favorable (in which there is no ink bleeding and blurring), is received from a user, and on the basis of the received designation, it is determined whether or not the current setting for the drying is favorable (step S52). If the setting is not favorable (if "No" in step S52, that is, if the patch printed under a setting different from the current setting for the drying is designated), on the basis of the designation in step S52, the module causes the printer 20 to change the setting for the drying (step S54), and the routine returns to step S50. Thereby, at the time of determining "Yes" in step S52, it is possible to make the various settings for the drying in the printer 20 such that the picture quality deterioration such as bleeding and blurring is not caused by inappropriateness of the various settings for the drying when the printing is performed on the designated medium.

Besides, the printer adjustment module 500 causes the printer 20 to print, on the designated medium, the test pattern which is for checking whether or not the various settings, such as setting of absorption force of the platen 62 onto the medium and setting of tension applied to the medium by the transport roller, having an effect on the printing result in the printer 20 are favorable (step S50). Then, the module receives user's designation based on the printing result, and determines whether or not the current settings of the respective items thereof are favorable in accordance with the received designation (step S52). If the settings are not favorable, the module is able to causes the printer 20 to change the settings to appropriate settings according to the designation (step S54).

As described above, in the adjustment processing (FIG. 20), when the setting adjustment is performed on the plurality of items of the above-mentioned printing environment, the printer adjustment module 500 executes the processing from step S50 on one of the items. If the determination is "Yes" in step S52, then the module executes the processing from step S50 on the next item . . . , and repeats the above operations. Finally, if the determination is "Yes" in step S52 for all the items, the adjustment processing (FIG. 20) may be terminated.

In the above description, the determination in step S52 is made in accordance with the input instruction based on user's visual inspection of the test pattern. However, the determination may be automatically made. That is, the computer 10 (printer adjustment module 500) inputs a result of color measurement which is performed by using a colorimeter on the test pattern printed on the printer 20 in step S50, analyzes the input color measurement result, thereby selects the patch of which the picture quality is most favorable on the basis of prescribed reference, and may perform the branch of step S52 in accordance with which patch is the selected patch. In addition, all the test charts (patches) printed by the printer 20 in step S50 correspond to the first test pattern.

4. Base LUT Generation of Substitute Medium

In step S06 (step S06 in a case where the designated medium is a substitute medium) subsequent to step S05 of FIG. 2, as described above, the processing of FIG. 9 is executed first, and subsequently the processing of FIG. 10 is executed. In FIG. 9, in step S61, the base LUT generation module 100 determines the substituted medium. The substituted medium is a basic medium of which the type is the same as the type of the designated substitute medium. When the type of the designated substitute medium is unclassified, among the basic media, a basic medium, on which the color development characteristics of the respective inks are normal, is set as a substituted medium. Information specifying the substituted medium is registered in the setting table STB. In step S62, the base LUT generation module 100 acquires the duty limit $D_{Ij}$ (hereinafter referred to as a reference duty limit $D_{SIj}$) and the color development characteristic data of the substituted medium which is stored in the medium table MTB.

In step S63, the base LUT generation module 100 prints color patches, which are for rating the duty limit and the color development characteristic of the designated medium (substitute medium), on the designated medium. Specifically, the base LUT generation module 100 generates patch picture data for printing the color patches, and outputs the patch picture data to the halftoning section FW4 of the printer 20. The patch picture data is, for example, data of a picture of which the respective pixels have ink amounts $I_j$ (j=1 to 4), and is for printing the color patches based on gradations of the respective ink amounts $I_j$ (j=1 to 8) of the primary colors (C, M, Y, K) of the respective inks, the secondary colors (R, G, B), and the mixed color of all inks. For example, the individual ink amounts $I_j$ (j=1 to 4) in the gradations of all inks and the secondary colors are set to be equal. Each color patch is additionally noted by a character which represents the ink amount $I_j$ (j=1 to 8) used in the printing of the color patch. In step S64, the color of each printed color patch is measured by the colorimeter, and a colorimetric value (CIE-L*a*b* color coordinate system) is acquired. In step S65, the base LUT generation module 100 causes the display device to display a picture of medium characteristic designation UI for designating the color development characteristic and the like of the designated medium (substitute medium).

FIG. 22 is a diagram illustrating the picture of the UI for medium characteristic designation. In the drawing, the colorimetric values, which are obtained by measuring colors of the color patches (only C, M, Y, K) with the respective gradations, are represented by a graph. In the graph for the color patches (C, M, Y) representing chromatic colors, the vertical axis represents saturation C*. In the graph for the color patch (K) representing an achromatic color, the vertical axis represents lightness L*. The horizontal axis represents the ink amounts $I_j$ (j=1 to 8). In the respective graphs, the saturation C* and the lightness L* based on the colorimetric values of the respective color patches are plotted (as the white circles). Thereby, the graph shows the color development characteristics corresponding to the ink amounts $I_j$ (j=1 to 8) on the substitute medium. Further, in the respective graphs, the color development characteristics of the substituted medium acquired from the medium table MTB is plotted (as the black circles) to be comparable. As for the substituted medium (basic medium), the same color patch is printed and color-measured, and thus the color measurement result is stored as the color development characteristic data in the medium table MTB in advance.

Further, in the picture of the UI for medium characteristic designation, as a result that a user observes the color patches of the primary colors (C, M, Y, K) of the respective inks, the secondary colors (R, G, B), and all inks, there is provided a text box for respectively inputting the ink amounts $I_j$ (j=1 to 8), which are respectively noted to the color patches in which bleeding starts to occur, as the duty limits $D_{Ij}$. In the picture of the UI for medium characteristic designation, a button for confirming the duty limits is displayed, and thus when receiving the information that the button is clicked, the base LUT generation module 100 acquires the input duty limits $D_{Ij}$, and registers the duty limits $D_{Ij}$ in the setting table STB (step S66). However, in the computer 10, the base LUT generation module 100 may determine the ink amounts $I_j$ (j=1 to 8), at which the colorimetric values are destabilized by bleeding and the like, without depending on user's observation, and may set the determined ink amounts as the duty limits $D_{Ij}$. With the above-mentioned configuration, it is possible to set the duty limits $D_{Ij}$ even for the designated medium (substitute medium) in which the duty limits $D_{Ij}$ are unknown.

The test pattern formed of the color patches printed by the printer 20 in step S63 corresponds to a third test pattern. That is, in this embodiment, the printing environment of the printer 20 including the paper feeding amount and the like is adjusted to an optimal setting in step S05 (FIG. 2), and then the third test pattern is printed by the printer 20 in the following step S06. Hence, the third test pattern is printed without troubles such as ink unevenness, bleeding, blurring, and the like. As a result, on the basis of the third test pattern, it is possible to precisely obtain the duty limits and the color development characteristics when the printer 20 performs printing on the designated medium. Further, in the above description, in order to acquire the duty limits and the color development characteristics corresponding to the ink amounts for the designated medium, the third test pattern which is printed is shared, but in order to respectively acquire the duty limits and the color development characteristics corresponding thereto, separate third test patterns may be printed on the printer 20.

When the designated medium (substitute medium) duty limits $D_{Ij}$ can be set, the base LUT generation module 100 calculates a normalization ratio RW on the basis of the respective duty limits $D_{Ij}$ for the designated medium (substitute medium) and the respective reference duty limits $D_{SIj}$ for the substituted medium through the following Expression (34) (step S67).

$$RW = \min\left(\frac{D_{SI1}}{D_{I1}}, \frac{D_{SI2}}{D_{I2}}, \ldots \frac{D_{SI8}}{D_{I8}}\right) \quad (34)$$

As represented by Expression (34), the normalization ratio RW is a component with a smallest value among the limit ratio which is obtained by dividing the respective reference duty limits $D_{SIj}$ by the respective duty limit $D_{Ij}$. When the normalization ratio RW is calculated, the base LUT generation module 100 multiplies the ink amounts $I_j$ (j=1 to 4), which represent the positions of the plots (white circles) of the colorimetric values of the respective color patches printed on the designated medium (substitute medium) in the vertical axis direction, by the normalization ratio RW, thereby converting the ink amounts $I_j$ (j=1 to 4) into first tentative ink amounts $I_{PPj}$ (j=1 to 4) (step S68). That is, the relationship between the first tentative ink amounts $I_{PPj}$ and the ink amounts $I_j$ are represented by Expression (35).

$$I_{PPj} = RW \cdot I_j \quad (35)$$

The possible range of the first tentative ink amounts $I_{PPj}$ (j=1 to 4) is 0 to $D_{PIj}$). That is, $D_{PIj} = RW \cdot D_{Ij}$. In addition, the ink amounts $I_j$ (j=5 to 8) of the secondary and more colors are converted depending on the conversion of the ink amounts $I_j$ (j=1 to 4), and are thus not subjected to the conversion.

As described above, the ink amounts $I_j$ (j=1 to 4) of the color development characteristics which are obtained by printing the respective color patches on the designated medium (substitute medium), are multiplied by the normalization ratio RW, whereby the color development characteristics of the designated medium (substitute medium) is normalized relative to the color development characteristics of the substituted medium. In the specification, the color development characteristics mean transitions of L* and C* values of the colors reproduced on the respective media when the inks are adhered thereon by the ink amounts $I_j$. Next, the base LUT generation module 100 sets a nonlinear conversion function, which converts the first tentative ink amounts $I_{PPj}$ (j=1 to 4) into second tentative ink amounts $I_{SPj}$ (j=1 to 4), so as to further approximate the color development characteristics of the designated medium (substitute medium) to the color development characteristics of the substituted medium (step S69).

Figure 23A:
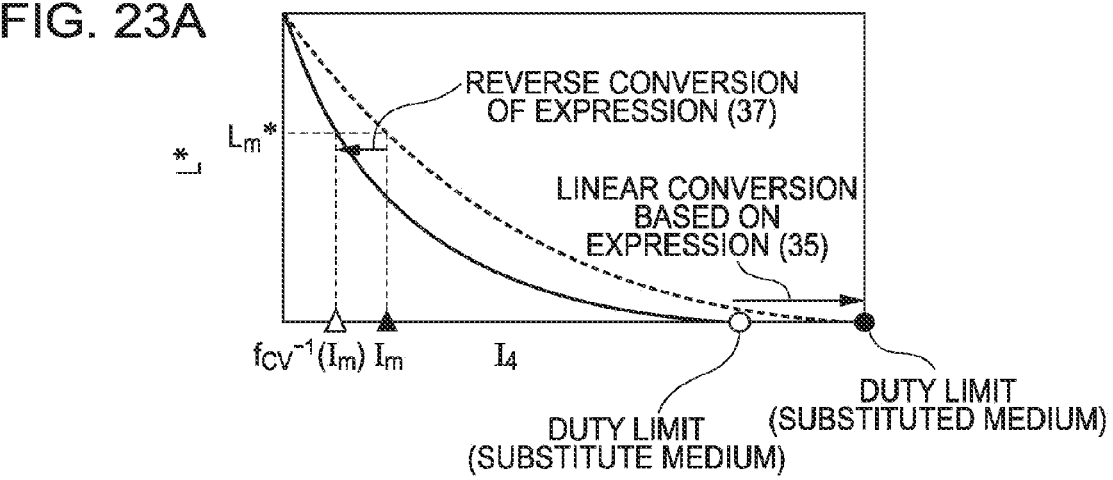
FIGS. 23A to 23C are graphs illustrating a situation in which a nonlinear conversion function is set.
Figure 23B:
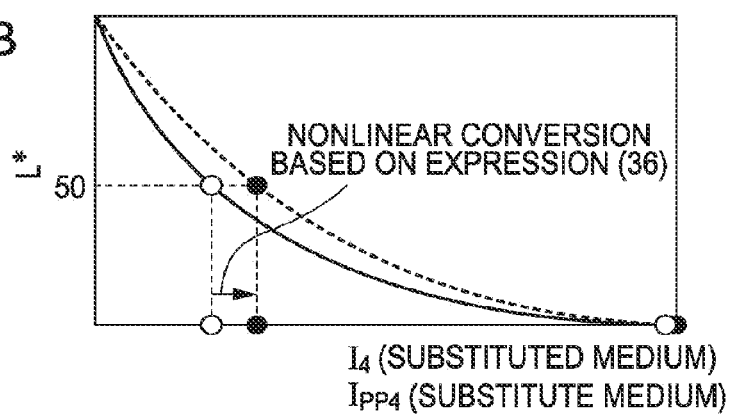
Figure 23C:
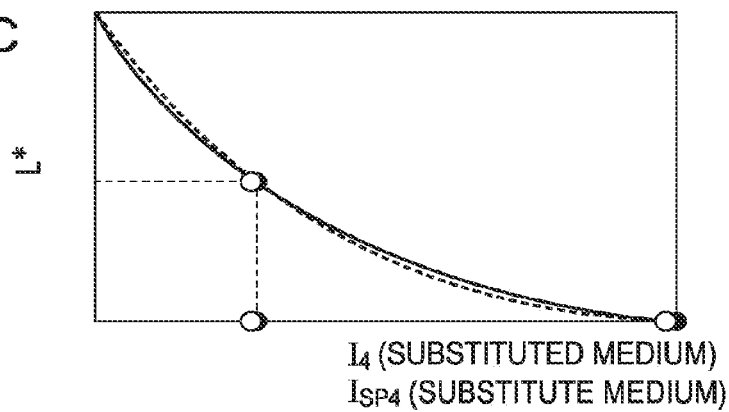

FIGS. 23A to 23C are graphs illustrating a situation in which the conversion function is set. In the drawing, an example of the color development characteristic of the K ink for the designated medium (substitute medium) is indicated by the solid line (and the white circles), and an example of the color development characteristic of the K ink for the substituted medium is indicated by the chain line (and the black circles). FIG. 23A shows the color development characteristics in a state where any conversion is not performed thereon. FIG. 23B shows a state where the ink amounts of the designated medium (substitute medium) shown in FIG. 23A are converted into the first tentative ink amounts $I_{PPj}$ (j=1 to 4) on the basis of the normalization ratio RW (the limit ratio of the K ink is assumed as the minimum). FIG. 23C shows a state where the ink amounts of the designated medium (substitute medium) shown in FIG. 23B are converted through nonlinear conversion into the second tentative ink amounts $I_{SPj}$ (j=1 to 4). In this embodiment, focusing on the color development of L*=50, a gamma function ($\gamma_j$ value), by which the first tentative ink amount $I_{PP4}$ for reproducing L*=50 on the designated medium (substitute medium) is converted into a value (second tentative ink amount $I_{SP4}$) equal to the ink amount $I_4$ for reproducing L*=50 on the substituted medium (the dashed line), is derived. The second tentative ink amounts $I_{SPj}$ are given by the following Expression (36).

$$I_{SPj} = D_{Plj} \cdot \left( \frac{I_{PPj}}{D_{Plj}} \right)^{\frac{1}{\gamma_j}} \tag{36}$$

The $\gamma_j$ value is derived as a different value for each ink (j=1 to 4). This embodiment focuses on the color development of L*=50, but the $\gamma_j$ values, at which the color development characteristics are approximated as a whole through the least-square method, may be calculated. Further, single or a plurality of control points, which can be dragged and dropped by a user in the color development characteristics shown in the graphs, are provided, and the $\gamma_j$ values, which passes the dragged and dropped control points, may be calculated. It is apparent that the approximation may be made through a non-linear function (a spline curve, a Bezier curve, an exponential function, or the like) other than the gamma function.

FIGS. 23A to 23C exemplifies the K ink, but even for other chromatic inks, the gamma functions, by which the first tentative ink amounts $I_{PPj}$ for reproducing a predetermined C* value for the designated medium (substitute medium) is converted into values (second tentative ink amounts $I_{SPj}$) equal to the ink amounts $I_j$ for reproducing the C* value for the substituted medium, are derived. In addition, since $I_{PPj}$=RW·$I_j$ and $D_{Plj}$=RW·$D_{Ij}$, through Expression (35), Expression (36) mentioned above is rewritten into the following Expression (37).

$$I_{SPj} = RW \cdot D_{Ij} \cdot \left( \frac{RW \cdot I_j}{RW \cdot D_{Ij}} \right)^{\frac{1}{\gamma_j}} = f_{CVj}(I_j) \tag{37}$$

In such a manner, it is possible to obtain a conversion equation (conversion relationship) for converting the ink amounts $I_j$ such that the color development characteristics obtained when the respective inks are adhered onto the designated medium (substitute medium) is approximate to the color development characteristics obtained when the respective inks are adhered onto the substituted medium. The $f_{CVj}$ means a conversion function of converting the ink amounts $I_j$ (j=1 to 4) into the second tentative ink amounts $I_{SPj}$. Here, when Expression (37) mentioned above is satisfied, it can be said that the color development (L* and C* values), which is obtained when the inks are adhered onto the substituted medium by the second tentative ink amounts $I_{SPj}$, is substantially the same as the color development (L* and C* values) obtained when the inks are adhered onto the designated medium (substitute medium) by the ink amounts $I_j$.

The base LUT generation module 100 registers the conversion function $f_{CVj}$ of Expression (37) in the setting table STB. Thereby, the base LUT generation module 100 is able to convert the ink amounts $I_j$ (j=1 to 4) into the second tentative ink amounts $I_{SPj}$ (j=1 to 4). Further, the base LUT generation module 100 is able to reversely convert the second tentative ink amounts $I_{SPj}$ into the ink amounts $I_j$ (j=1 to 4) by using a reverse conversion function $f_{CVj}^{-1}$ of the conversion function $f_{CVj}$. When the duty limits $D_{Ij}$ of the designated medium (substitute medium) are substituted into the ink amounts $I_j$ of Expression (37) mentioned above, the ink amounts are converted into the second tentative ink amounts $I_{SPj}$=RW·$D_{Ij}$. Comparing this with Expression (35) mentioned above, regarding the duty limits $D_{Ij}$, $I_{PPj}$=$I_{SPj}$=RW·$D_{Ij}$, and thus the first tentative ink amounts $I_{PPj}$ and the second tentative ink amounts $I_{SPj}$ are equal to each other. In addition, the base LUT generation module 100 may perform the conversion and the reverse conversion corresponding to $f_{CVj}$ and $f_{CVj}^{-1}$ by referring to the LUT which describes the correspondence relationship between the plurality of ink amounts $I_j$ and the second tentative ink amounts $I_{SPj}$.

In step S70, the a* and b* values (hereinafter noted as the substitute medium color tones ($a_{Cj}$*, $b_{Cj}$*) (j=1 to 3)), which are obtained when the CMY inks are individually adhered onto the designated medium (substitute medium) up to the duty limits $D_{Ij}$ (j=1 to 3), and the a* and b* values (hereinafter noted as the substituted medium color tones ($a_{Sj}$*, $b_{Sj}$*) (j=1 to 3)), which are obtained when the CMY inks are individually adhered onto the substituted medium up to the reference duty limits $D_{SIj}$ (j=1 to 3), are acquired, and those are analyzed. In steps S62 and S66, such color values are acquired as the colorimetric values which are obtained from the color patches corresponding to the duty limits $D_{Ij}$ (j=1 to 3) and the reference duty limits $D_{SIj}$ (j=1 to 3). In addition, the substitute medium color tones ($a_{Cj}$*, $b_{Cj}$*) and the substituted medium color tones ($a_{Sj}$*, $b_{Sj}$*) may be acquired from the color patches in which predetermined lightness L* and saturation C* are reproduced, and may be acquired from the color patches using predetermined ink amounts $I_j$ (for example, 15% of the duty limits $D_{Ij}$ and $D_{SIj}$). Furthermore, the substitute medium color tones ($a_{Cj}$*, $b_{Cj}$*) and the substituted medium color tones ($a_{Sj}$*, $b_{Sj}$*) may be acquired from the color patches of composite gray formed by adhering the inks onto the respective media by equivalent ink amounts $I_j$ (j=1 to 3). In any case, even when the own color values of the respective media are acquired, the color values of the respective media are acquired in a state where ink is adhered thereon by a certain amount. Hence, it is possible to rate a color tone of an intermediate lightness region.

Figure 24:
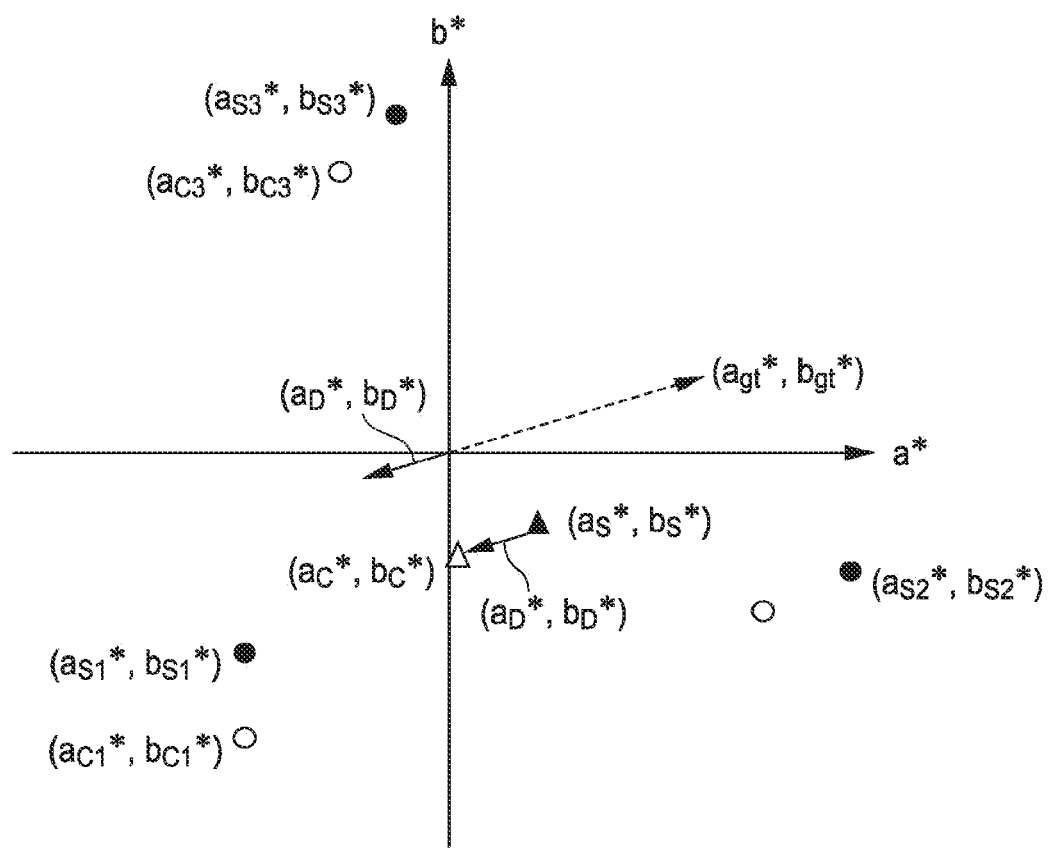
FIG. 24 is a graph in which color tones of a substitute medium and color tones of a substituted medium are plotted on the a*b* plane.

FIG. 24 is a graph in which the substitute medium color tones ($a_{Cj}^*$, $b_{Cj}^*$) (j=1 to 3) (white circles) and the substituted medium color tones ($a_{Sj}^*$, $b_{Sj}^*$) (j=1 to 3) (black circles) are plotted on the a*b* plane. The substitute medium and the substituted medium have color tones different from each other, the substitute medium color tones ($a_{Cj}^*$, $b_{Cj}^*$) and the substituted medium color tones ($a_{Sj}^*$, $b_{Sj}^*$) do not perfectly coincide with each other. In step S70, as represented by Expression (38), by setting the substitute medium color tones ($a_{Cj}^*$, $b_{Cj}^*$) (j=1 to 3) as position vectors from the origin point a*, b*=0 and adding them to each other, the substitute medium color tone ($a_C^*$, $b_C^*$) (white triangle) is calculated. Likewise, by adding the substituted medium color tones ($a_{Sj}^*$, $b_{Sj}^*$) to each other, the substituted medium color tone ($a_S^*$, $b_S^*$) (black triangle) is calculated.

$$(a_C^*, b_C^*) = \left( \sum_{j=1}^{3} a_{Cj}^*, \sum_{j=1}^{3} b_{Cj}^* \right) \quad (38)$$

$$(a_S^*, b_S^*) = \left( \sum_{j=1}^{3} a_{Sj}^*, \sum_{j=1}^{3} b_{Sj}^* \right)$$

Furthermore, as represented by Expression (39), by deducting the substituted medium color tone ($a_S^*$, $b_S^*$) (black triangle) from the substitute medium color tone ($a_C^*$, $b_C^*$) (white triangle), the differential color tone ($a_D^*$, $b_D^*$) is calculated.

$$(a_D^*, b_D^*) = (a_C^* - a_S^*, b_C^* - b_S^*) \quad (39)$$

In such a manner, when the differential color tone $a_D^*$, $b_D^*$ can be calculated, a hue direction indicated by a vector ($-a_D^*$, $-b_D^*$), in which the sign of the differential color tone ($a_D^*$, $b_D^*$) is reversed, is set as a hue direction of the color tone ($a_{gt}^*$, $b_{gt}^*$) of the gray target (step S71). That is, the color tone ($a_{gt}^*$, $b_{gt}^*$) of the gray target is a vector which is obtained by multiplying the vector ($-a_D^*$, $-b_D^*$) by a positive coefficient k. The magnitude of the coefficient k is, for example, set by a user. In step S72, the base LUT generation module 100 registers the color tone ($a_{gt}^*$, $b_{gt}^*$) of the gray target in the setting table STB.

Through the above-mentioned processing, the necessary setting information is stored in the setting table STB for the substitute medium shown in FIG. 5. Thereafter, referring to the setting table STB, the routine advances to the processing (processing of FIG. 10 in the case where the designated medium is the substitute medium) of creating the base LUT for the substitute medium. Here, a different part of the above-mentioned processing of creating the base LUT for the basic medium will be sequentially described.

First, in step S100 of FIG. 10, on the basis of the information stored in the setting table STB, the respective converters 300, 310, 410, 136, and the like are prepared (activated). However, in the case of the substitute medium, the respective converters 300, 310, 410, 136, and the like for the substituted medium stored in the setting table STB are prepared (activated). That is, since the respective converters 300, 310, 410, 136, and the like for the substitute medium do not exist, the respective converters 300, 310, 410, 136, and the like for the substituted medium which is the basic medium are substituted therefor. Further, interconversion between the second tentative ink amounts $I_{SPj}$ and the ink amounts $I_j$ using an inverse function $f_{CVj}^{-1}$ and the above-mentioned conversion function $f_{CVj}$ registered in the setting table STB is valid.

In the initial point setting processing in step T100 of FIG. 16, the color tone ($a_{gt}^*$, $b_{gt}^*$)=k×($-a_D^*$, $-b_D^*$) of the gray target stored in the setting table STB in step S72 of FIG. 9 is set. That is, when the base LUT of the basic medium is created, the gray target is normally set on the L* axis, whereas when the LUT of the substitute medium is created, the gray target shifts in the opposite hue direction of the relative color tone of the substitute medium.

Figure 25:
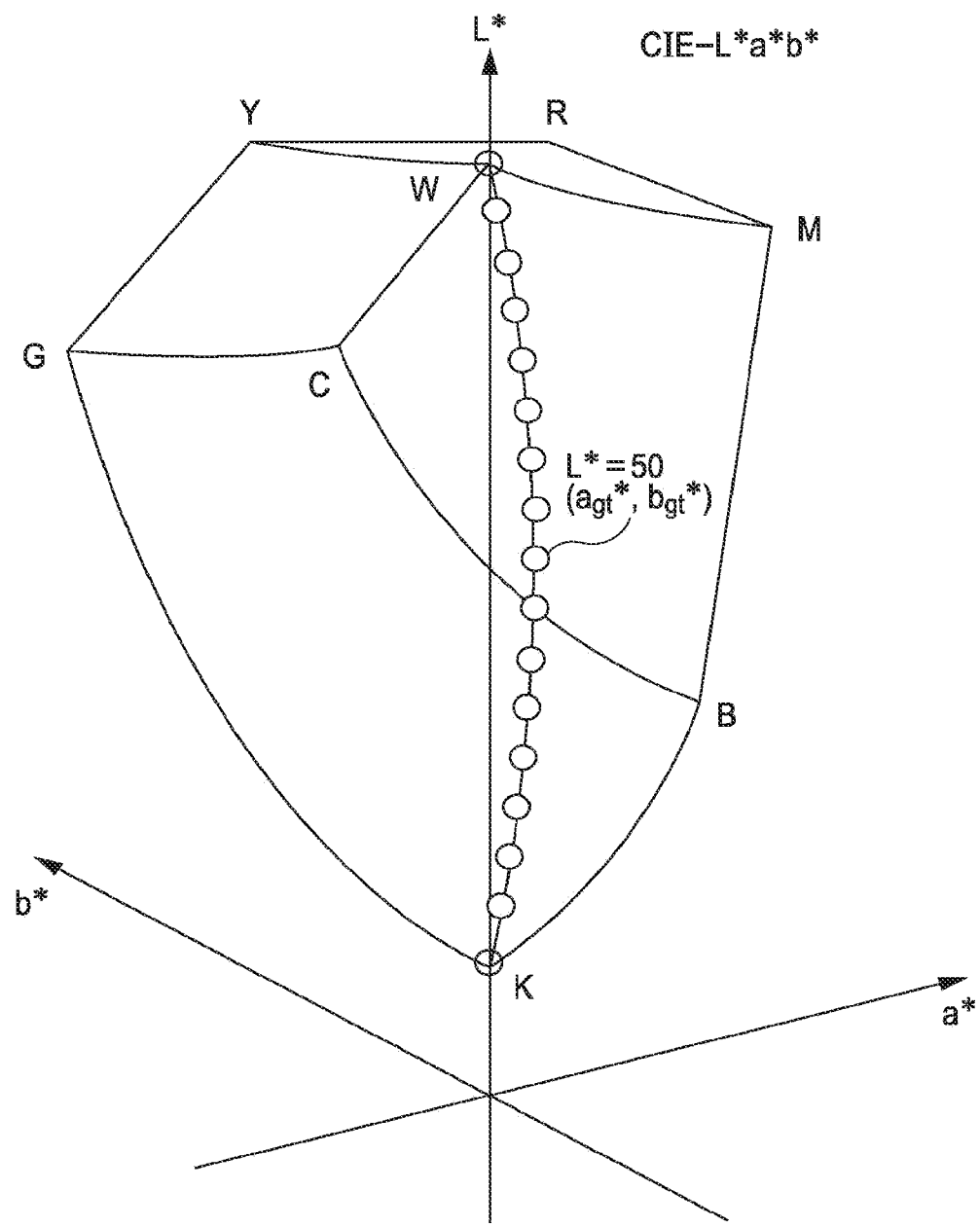
FIG. 25 is a diagram illustrating a gray target in a case of creating the LUT of the substitute medium.

FIG. 25 is a diagram illustrating the gray target in the case of creating the LUT of the substitute medium. As shown in the drawing, the grid points (white circles) corresponding to the gray axis grid points are constrained to represent the positions that equally divide the segment (gray target), which connects the paper black points and the paper white points on the L* axis of the L*a*b* color space and curves in the hue direction of the color tone ($a_{gt}^*$, $b_{gt}^*$) of the gray target, into 16 pieces. Thereby, the positions of the grid points corresponding to the gray axis grid points after the smoothing processing are deviated from the L* axis. The amount of the curvature is at the maximum in the intermediate lightness region, and thus in the embodiment, the maximum in L*=50 corresponds to the color tone ($a_{gt}^*$, $b_{gt}^*$) of the gray target. Further, single or a plurality of control points, which can be dragged and dropped by a user in the color development characteristics, may be provided in the gray target, and the coefficient k, which defines the amount of the curvature passing the dragged and dropped control points, may be determined.

Furthermore, in the optimization processing in step T130 of FIG. 16, the duty limits $D_{Ij}$ (j=1 to 8) of the respective inks for the designated medium (substitute medium) stored in the setting table STB are converted into the second tentative ink amounts $I_{SPj}$ (=tentative duty limit $D_{PIj}$) through the set conversion function $f_{CVj}$. That is, the duty limits $D_{Ij}$ (j=1 to 8) of the respective inks of the substitute medium stored in the setting table STB are not used as it is, but are used after converted into the tentative duty limits $D_{PIj}$. Accordingly, under the constraint condition of the tentative duty limits $D_{PIj}$, the optimization of the ink amounts $I_j$ is executed.

As represented by Expressions (35) and (37), the tentative duty limits $D_{PIj}$ are obtained by uniformly multiplying the real duty limits $D_{Ij}$ (j=1 to 8) by the normalization ratio RW. Thus, the relative ratio in the magnitude of the real duty limit $D_{Ij}$ between the respective inks is kept even in the tentative duty limit $D_{PIj}$. Accordingly, it is possible to optimize the ink amounts $I_j$ according to the real duty limits $D_{Ij}$ (j=1 to 8) of the respective inks on the substitute medium. As a result, it is possible to form the gamut corresponding to the relative ratio of the duty limits $D_{Ij}$ of the respective inks on the substitute medium.

As represented by Expression (34), the normalization ratio RW is the ink component with a smallest value of the limit ratios $D_{SIj}/D_{Ij}$ which is obtained by dividing the reference duty limits $D_{SIj}$ (j=1 to 8) of the substituted medium by the duty limits $D_{Ij}$ (j=1 to 8) of the substitute medium. Here, the ink component j, of which the limit ratio $D_{SIj}/D_{Ij}$ is smallest, is set such that j=z, and other ink components j are set such that j=q. Then, the following Expression (40) is established.

$$RW = \frac{D_{SIz}}{D_{Iz}} < \frac{D_{SIq}}{D_{Iq}} \quad (40)$$

When the both sides of Expression (40) are multiplied by the duty limit $D_{Iz}$ of the substitute medium in the case of ink component j=z and the duty limit $D_{Iq}$ of the substitute medium in the case of component j=q, respectively the following Expressions (41) and (42) are established.

$$RW \cdot D_{Iz} = D_{SIz} \quad (41)$$

$$RW \cdot D_{Iq} = \frac{D_{SIz}}{D_{Iz}} \cdot D_{Iq} < D_{SIq} \quad (42)$$

The terms $RW \cdot D_{Iz}$ and $RW \cdot D_{Iq}$ on the left sides of Expressions (41) and (42) mean the tentative duty limits $D_{PIz}$ and $D_{PIq}$ for the ink components j=z and j=q. As for the ink component j=z, the tentative duty limit $D_{PIz}$ is equal to the reference duty limit $D_{SIz}$ of the substituted medium. Accordingly, as for the ink component j=z, the respective converters 300, 310, 410, 136, and the like of the substituted medium are able to optimize the ink amounts $I_j$ throughout the entire range of the ink amounts $I_j$ in which the color values and the like are predictable.

On the other hand, as for the ink component j=q, the tentative duty limit $D_{PIq}$ is smaller than the reference duty limit $D_{SIj}$ of the substituted medium. Accordingly, the respective converters 300, 310, 410, 136, and the like of the substituted medium are able to optimize the ink amounts $I_j$ throughout the entire range of the ink amounts $I_j$ (j=1 to 8) in which the color values and the like are predictable. In any case, since the respective converters 300, 310, 410, 136, and the like of the substituted medium are able to optimize the ink amounts $I_j$ throughout the entire range of the ink amounts $I_j$ in which the color values and the like are predictable, it is possible to prevent the prediction using them from causing a failure. On the contrary, even when the duty limits $D_{Ij}$ of the designated medium (substitute medium) are less than the reference duty limits $D_{Ij}$ of the substituted medium, by maximally using the possible range of the ink amounts $I_j$ which are restricted by the reference duty limits $D_{Ij}$ of the substituted medium, it is possible to optimize the ink amounts $I_j$ (j=1 to 4).

Furthermore, in the creation of the base LUTs 510 and 520 in step S400 of FIG. 10, the ink amounts $I_j$ (j=1 to 4), which correspond to the respective grid points finally obtained through the smoothing and optimization processing, are not directly registered as the output values of the base LUTs 510 and 520, but the ink amounts $I_j$ (j=1 to 4) are registered as the output values of the base LUTs 510 and 520 after reversely converted through the set reverse conversion function $f_{CVj}^{-1}$. As described above, the ink amounts $I_j$ (j=1 to 4), which correspond to the respective grid points finally obtained through the smoothing and optimization processing, are optimized not in the possible range of the real ink amounts $I_j$ (j=1 to 4) adhered onto the designated medium (substitute medium) but in the range of the ink amounts $I_j$ in which the respective converters 300, 310, 410, 136, and the like for the substituted medium is able to predict the color values and the like. The ink amounts $I_j$ in this range are reversely converted through the reverse conversion function $f_{CVj}^{-1}$, whereby it is possible to recover the ink amounts $I_j$ (j=1 to 4) in the practically possible range of the ink amounts $I_j$ (j=1 to 4) for the designated medium (substitute medium). The reverse conversion function $f_{CVj}^{-1}$ of the conversion function $f_{CVj}$ shown in Expression (37) includes linear conversion (1/RW) that recovers the possible range of the ink amounts $I_j$ (j=1 to 4).

Further, by performing the reverse conversion through the reverse conversion function $f_{CVj}^{-1}$, it is possible to compensate the difference between the color development characteristics of the respective inks on the designated medium (substitute medium) and the color development characteristics of the respective inks on the substituted medium. The respective converters 300, 310, 410, 136, and the like for the substituted medium outputs the prediction results corresponding to the color development characteristics of the respective inks on the substituted medium. For example, it is assumed that, at a certain grid point, the ink amount $I_4=I_m$ (black triangle) of the K ink with the color development characteristic shown in FIG. 23A is optimized as an optimal ink amount $I_4$. In this case, it is possible to detect that, at the grid point, the ink amount $I_m$ is optimal, and simultaneously the color development using the ink amount $I_m$, that is, the lightness $L_m^*$, which is reproduced by the K ink of the ink amount $I_m$, is optimal.

The ink amount of the K ink capable of reproducing the lightness $L_m^*$ optimal for the substituted medium is the ink amount $I_m$, but the ink amount of the K ink capable of reproducing the lightness $L_m^*$ optimal for the designated medium (substitute medium) is not the ink amount $I_m$. That is, it can be inferred that not the ink amount $I_m$ of the K ink capable of reproducing the lightness $L_m^*$ optimal for the substituted medium, but the ink amount $I_4$ of the K ink capable of reproducing the lightness $L_m^*$ optimal for the designated medium (substitute medium) is a practically optimal ink amount for the designated medium (substitute medium). The ink amount $I_4$ of the K ink capable of reproducing the lightness $L_m^*$ optimal for the designated medium (substitute medium) can be obtained by reversely converting the ink amount $I_m$ (second tentative ink amounts $I_{SPj}$) of the K ink capable of reproducing the lightness $L_m^*$ optimal for the substituted medium through the reverse conversion function $f_{CVj}^{-1}$. Accordingly, by detecting that the ink amounts $I_j$ of the respective grid points finally obtained through the smoothing and optimization processing are the second tentative ink amounts $I_{SPj}$ and performing the reverse conversion through the reverse conversion function $f_{CVj}^{-1}$, it is possible to obtain the ink amounts $I_j$ optimal for the designated medium (substitute medium). By registering the optimal ink amounts $I_j$ obtained in such a manner as the output values of the base LUTs 510 and 520, it is possible to obtain the base LUTs 510 and 520 in which the ink amounts $I_j$ optimal for the designated medium (substitute medium) is defined. The reverse conversion function $f_{CVj}^{-1}$ of the conversion function $f_{CVj}$ represented by Expression (37) includes the nonlinear conversion based on the color development characteristics of the inks.

By displaying the picture of the UI for weight designation shown in FIG. 3, as for the weights $w_{L^*}$, $w_{a^*}$ ... in the objective function E at the time of the optimization of the ink amounts $I_j$, in particular unless a user changes the setting, the default weights $w_{L^*}$, $w_{a^*}$ ... appropriate for the type of the designated medium are set. Accordingly, even when the designated medium is a substitute medium, it is possible to create the base LUTs 510 and 520 laying weight on the items of the picture quality appropriate for the type of the medium. By designating the medium and successively displaying the picture of the UI for weight designation, it is possible to set the weights $w_{L^*}$, $w_{a^*}$ ... in accordance with the characteristics of the medium and the purpose of use.

By the way, the substitute medium and the substituted medium have own different color tones. Hence, deviation occurs in the prediction results of the color values which are obtained by the forward model converter 300 (spectrum printing model converter 310). It is apparent that, around the $L^*$ axis, deviation also occurs in the prediction results of the color values in accordance with the own color tones of the substitute medium and the substituted medium. In contrast, in this embodiment, the color tone $(a_{gt}^*, b_{gt}^*)$ of the gray target is intentionally shifted in the opposite hue direction of the differential color tone ($a_D^*$, $b_D^*$) between the substitute medium and the substituted medium. Hence, it is possible to position, on the L* axis, the real color values of the grid points corresponding to the gray axis grid points constrained to the gray target (the color values are not the color values predicted by the forward model converter 300, but the color values which are reproduced when the inks are adhered onto the substitute medium by the ink amounts $I_j$ corresponding to the grid points). By using the base LUTs 510 and 520, it is possible to perform interpolation calculation using the ink amounts $I_j$ capable of reproducing the achromatic color (gray) in practice. Accordingly, by using the color correction LUT or the device profile created on the basis of the base LUTs 510 and 520, it is possible to obtain the printing result excellent particularly in gradation or color reproducibility of the achromatic color (gray).

5. Device Profile Generation

Next, details of step S07 (FIG. 2) will be described.

Figure 26:
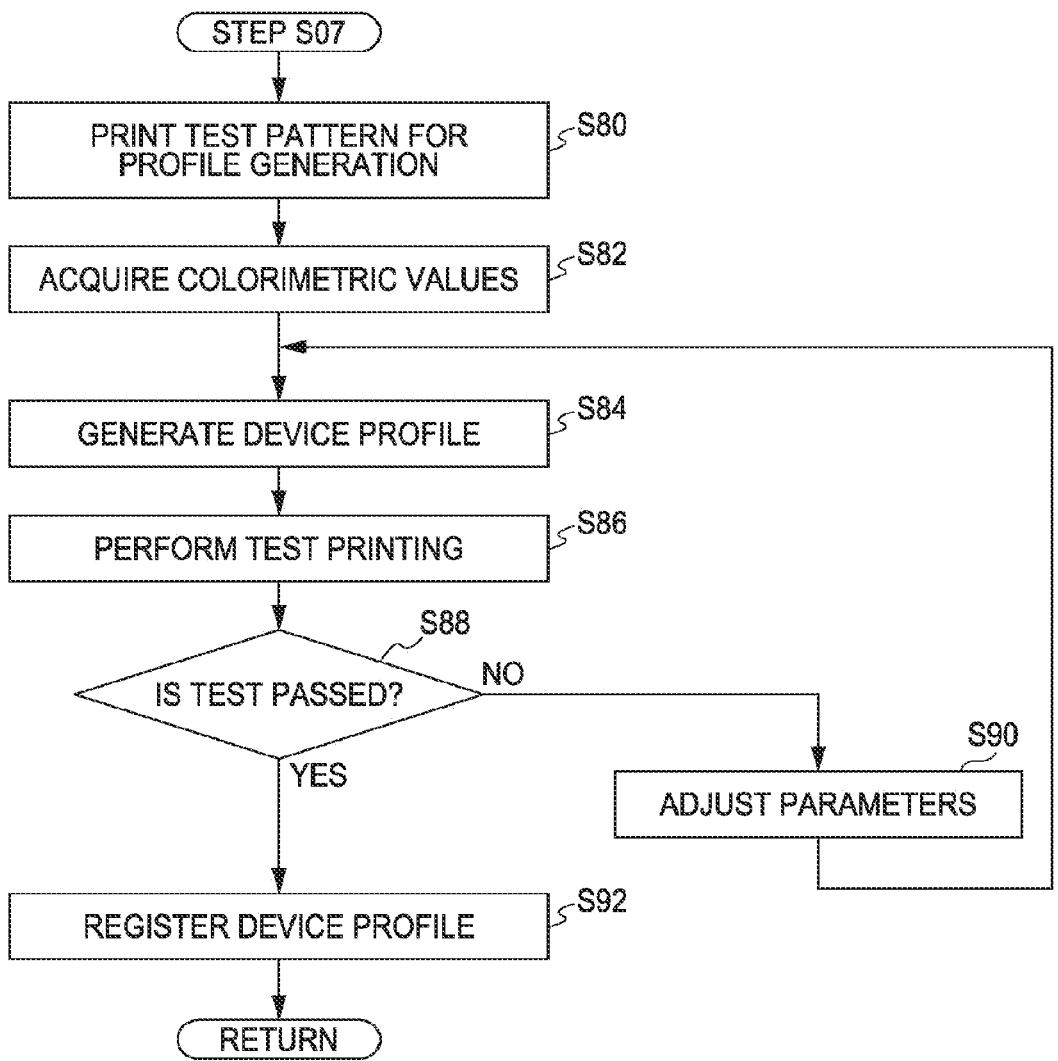
FIG. 26 is a flowchart illustrating details of device profile generation processing.

FIG. 26 shows the device profile generation processing in step S07 by using a flowchart. In step S80, the device profile generation module 200 color-converts the picture data, which represents the test pattern for prescribed profile generation, into the base LUT which is generated in accordance with the designated medium through step S06 mentioned above, and outputs the picture data (data of picture of which the respective pixels have the ink amounts $I_j$ of CMYK), which are generated by the color conversion, to the halftoning section FW4 of the printer 20, thereby printing the test pattern for profile generation on the designated medium. The test pattern for profile generation corresponds to the second test pattern. When the base 3D-LUT 510 is generated through step S06, in step S80, for example, the module color-converts the test pattern for profile generation, which provides a plurality of patches represented as gradation values of RGB at the respective input grid points of the base 3D-LUT 510, on the basis of the base 3D-LUT 510. On the other hand, when the base 4D-LUT 520 is generated through step S06, in step S80, for example, the module color-converts the test pattern for profile generation, which provides a plurality of patches represented as gradation values of CMYK at the respective input grid points of the base 4D-LUT 520, on the basis of the base 4D-LUT 520.

In step S82, the device profile generation module 200 causes a colorimeter to measure the colors of the respective patches in the test pattern printed on the designated medium in step S80, and acquires the colorimetric values (L*a*b* values) thereof. In step S84, the device profile generation module 200 generates the device profile (printer profile) on the basis of the L*a*b* value of each patch acquired in step S82. That is, when the base LUT 3D-510 is generated through step S06, RGB values of the respective input grid points are associated with the L*a*b* values of the respective patches which correspond one-to-one with the RGB values of the respective input grid points, thereby generating a first profile that converts the RGB values into the L*a*b* values. Further, the module also generates a second profile that defines a conversion relationship (L*a*b* value→RGB conversion) which is reverse to that of the first profile. The first and second profiles generated in such a manner correspond to the device 3D-profile 610.

In contrast, when the base LUT 4D-520 is generated through step S06, CMYK values of the respective input grid points are associated with the L*a*b* values of the respective patches which correspond one-to-one with the CMYK values of the respective input grid points, thereby generating a first profile that converts the CMYK values into the L*a*b* values. Further, the module also generates a second profile that defines a conversion relationship (L*a*b* value→CMYK conversion) which is reverse to that of the first profile. The first and second profiles generated in such a manner correspond to the device 4D-profile 620. The device profile generated through step S84 is associated with the type of the designated medium, and is temporarily stored. In addition, when the device profiles is generated in step S84, the device profile generation module 200 generates the device profile on the basis of various parameters which can be set in the profile generation. The various parameters described herein is, for example, parameters, such as a gamut mapping method, a color separation method, a type of an observation light source, and a degree of lightness correction, which have to be taken into account in order to generate the profile.

The gamut mapping method is a method of mapping (mapping the gamut defined by the second profile) the input values when the input values (L*a*b* values) outside the gamut defined by the above-mentioned second profile are input to the second profile. For example, it is possible to select a mapping method, which maintains the hue and the lightness by sacrificing the saturation, or a mapping method, which lays weight on saturation maintenance by sacrificing the hue, through parameter setting. Further, in the case of generating the profile that defines CMYK, through the parameter setting, it is possible to select GCR or UCR as the color separation method, and thus it is possible to select a start point, at which the K ink appears, and the like. Otherwise, it is possible to set various items, such as the observation light source and the degree of lightness correction, which are settable in order to generate the device profile through the parameters. The parameters are basically set by a user, but in the first step S84 subsequent to step S82, by employing default values which are set in the parameters in advance, the profile is generated.

In step S86, the device profile generation module 200 causes the printer 20 to perform test printing (printing on the designated medium) using the device profile which is generated in step S84.

FIG. 27A is a diagram illustrating the processing relating to test printing which is performed when the device 3D-profile 610 is generated. The device profile generation module 200 converts the picture data, in which the respective pixels are represented by the sRGB color coordinate system provided for the test printing, through a source profile SP1 which defines the conversion relationship between the sRGB values and the L*a*b* values. Next, the module (as necessary, performs the gamut mapping on the output values and) inputs the output values (L*a*b* values) from the source profile SP1 to the second profile (second profile 610*b*) as the device 3D-profile 610 corresponding to the designated medium, and converts the output values through the second profile 610*b*. Subsequently, the module inputs the output values (RGB) from the second profile 610*b* to the base 3D-LUT 510 corresponding to the designated medium, and converts the output values through the base 3D-LUT 510. In such a manner, by causing the printer 20 to perform printing using the ink amounts $I_j$ which are converted through the base 3D-LUT 510 and are output, the test printing on the designated medium is completed.

FIG. 27B is a diagram illustrating the processing relating to the test printing which is performed when the device 4D-profile 620 is generated. The device profile generation module 200 converts the picture data, in which the respective pixels are represented by the Japan color coordinate system provided for the test printing, through the known source profile SP2 which defines the conversion relationship between the L*a*b* values and the CMYK values (jCMYK) of the Japan color coordinate system. Next, the module (as necessary, performs the gamut mapping on the output values and) inputs the output values (L*a*b* values) from the source profile SP2 to the second profile (second profile 620b) as the device 4D-profile 620 corresponding to the designated medium, and converts the output values through the second profile 620b. Subsequently, the module inputs the output values (CMYK) from the second profile 620b to the base 4D-LUT 520 corresponding to the designated medium, and converts the output values through the base 4D-LUT 520. In such a manner, by causing the printer 20 to perform printing using the ink amounts $I_j$ which are converted through the base 4D-LUT 520 and are output, the test printing on the designated medium is completed.

In step S88, the device profile generation module 200 rates the printing result in step S86. In this case, a user visually checks the result of printing performed on the designated medium by the printer 20 through step S86, and if there is no problem in the picture quality, the user notifies the computer 10, through the input device and the display device, that the test printing is passed. In contrast, if there is a problem in the printing result in step S86, the user notifies the computer 10 that the test painting is rejected. In step S88, when the notification of pass is received, it is determined that the notification is a positive rating. Then, the routine advances to step S92, the device profiles, which are generated in step S84 and temporarily stored, are directly registered as device profiles 610 and 620 corresponding to the designated medium. Thereby, the processing of FIG. 2 terminates.

On the other hand, when the notification of rejection is received in step S88, it is determined that the notification is a negative rating, and the routine advances to step S90. In step S90, the device profile generation module 200 causes the display device to display the UI screen for setting predetermined, parameters, and receives an input of the parameter adjustment (the parameter change of the setting), which is performed by the user through the UI screen for setting the parameters, through the input device and the display device. The parameters described herein are parameters defining the various items which have to be taken into account in order to generate the device profile as described above. After the input of the parameter adjustment is received in step S90, the device profile generation module 200 returns to step S84, and regenerates the device profile on the basis of the setting of the adjusted parameters. In addition, in step S88, the device profile generation module 200 makes the determination on the basis of the input instruction of pass or rejection visually determined by the user. However, by analyzing the colorimetric values of the printing result in step S86 so as to thereby determine whether or not the printing result is favorable under a prescribed rule, the module may automatically perform the branch in step S88. Further, the adjustment of the parameters in step S90 may be automatically performed in accordance with the analysis result of the colorimetric values.

In addition, as indicated by the chain line in the FIG. 27A, the computer 10 generates a LUT in which the sRGB values input to the source profile SP1 is associated with the ink amounts finally output from the base LUT 510, and is thereby able to generate a color correction LUT 700a (one type of the color correction LUT 700) that converts the sRGB values into the ink amounts. Further, as indicated by the chain line in the FIG. 27B, the computer 10 generates a LUT in which the jCMYK values input to the source profile SP2 is associated with the ink amounts finally output from the base LUT 610, and is thereby able to generate a color correction LUT 700b (one type of the color correction LUT 700) that converts the CMYK values of the Japan color coordinate system into the ink amounts. The color correction LUT 700 can be associated with the designated medium, and be stored in a storage area in the HDD 400 or the printer 20.

6. Reprocessing in Case of Receiving Low Rating

Hitherto, on the basis of the flowchart of FIG. 2, description has been given in the range from designation of the medium to generation of the device profiles 610 and 620 corresponding to the medium. After the device profiles 610 and 620 are generated and registered as described above, a user is able to arbitrarily cause the computer 10 or the printer 20 to execute the printing processing (printing performed on the designated medium by the printer 20) accompanied with the color conversion using the profiles 610 and 620. However, while the normal printing processing is repeated, the user may gradually feel discontented with the picture quality in the printing result. Accordingly, in this embodiment, after end of the processing of FIG. 2, if the user feels discontented with the printing result (the user rates the picture quality low), the low rating is received, and solution processing according to the received low rating is automatically performed.

Figure 28:
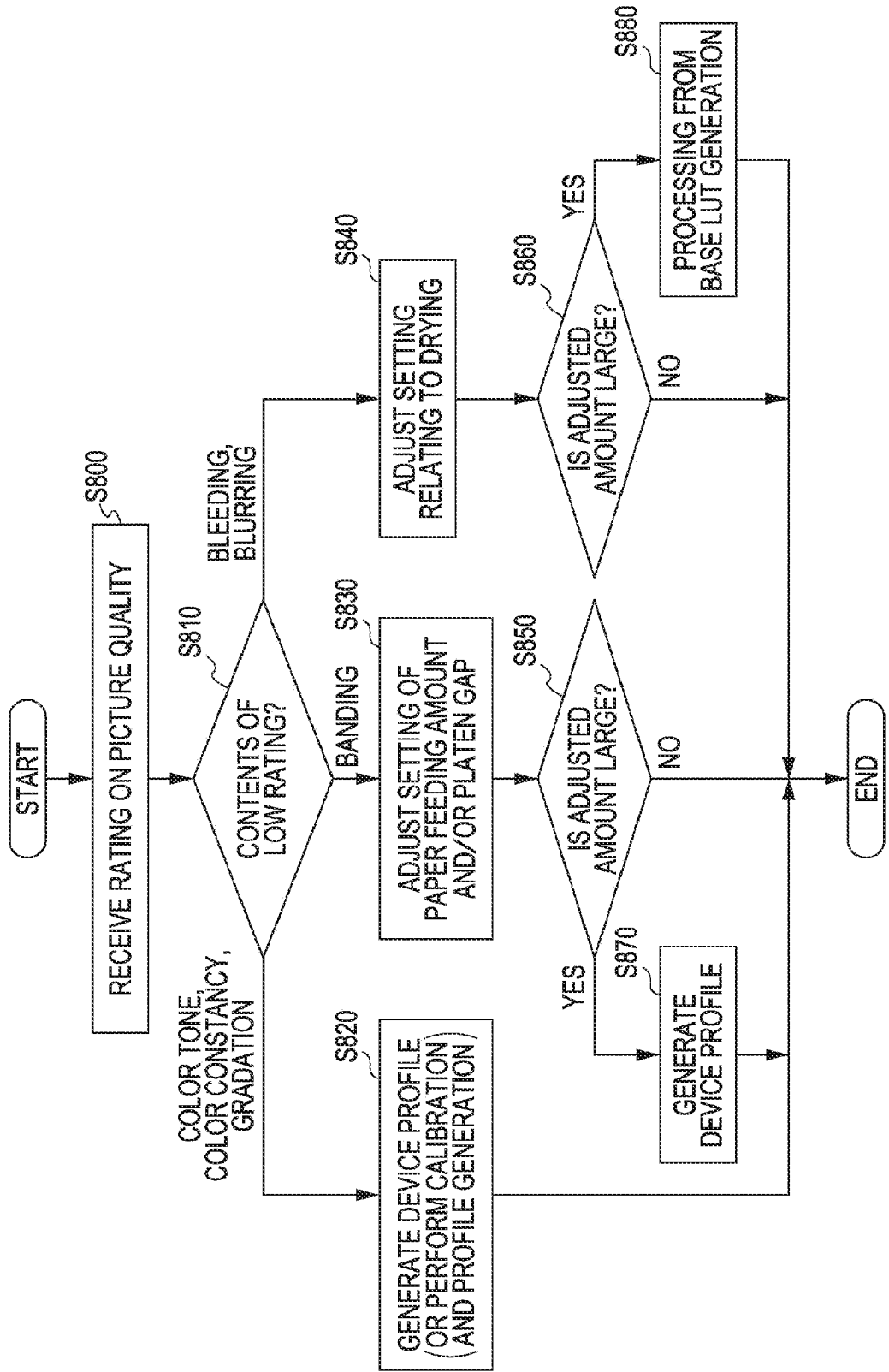
FIG. 28 is a flowchart illustrating processing executed by a reprocessing control module.

FIG. 28 shows the processing executed by the reprocessing control module 600 (FIG. 1) through the flowchart. In step S800, the reprocessing control module 600 receives the rating from the user through the prescribed UI screen for receiving rating. Specifically, the reprocessing control module 600 causes the display device to display the UI screen for receiving rating in accordance with user's input operation, and thereby receives the rating from the user through the input device and the UI for receiving the displayed rating.

FIG. 29 shows an example of the UI screen for receiving the rating. Since the UI screen is configured to make inquiries as to what problem occurs in the printing result through specific examples, the user is able to select the corresponding problem by operating the input device. In addition, in step S800, the reprocessing control module 600 receives information on the problem (low rating), and also receives information on the type of the medium, in which the problem arises in the printing result, from the user. In the following description based on the flowchart of FIG. 28, the type of the medium determined by the user in step S800 is treated as the designated medium.

In step S810, the reprocessing control module 600 branches the following processing on the basis of the low rating received in step S800. As an example, in a case of receiving a low rating (a negative feedback to the effect that the color tone is poor, the granularity is conspicuous, or the gradation is poor) on any of the color tone, the granularity, and the gradation of the printing result, the routine advances to step S820. Further, in a case of receiving a low rating to the effect that banding occurs in the printing result, the routine advances to step S830. In a case of receiving a low rating to the effect that bleeding or blurring occurs in the printing result, the routine advances to step S840.

In step S820, the reprocessing control module 600 determines that the device profile has to be generated, and instructs the device profile generation module 200 to generate the device profile for the designated medium. In response to the instruction, the device profile generation module 200 executes the above-mentioned profile generation processing (step S07 of FIG. 2) again. In this case, the device profile generation module 200 regenerates the device profiles 610 and 620 by using the base LUTs 510 and 520 which are registered in advance so as to correspond to the designated medium. Thereby, the device profile that suppresses picture quality deterioration (problems in color tone, granularity, gradation, and the like), which occurs when the printer 20 performs the printing on the designated medium, is newly generated. In addition, in order to execute the generation processing of the device profile again as described above, by adjusting the respective parameters for the profile generation (step S90 of FIG. 26), the device profile, which has the characteristics changed from the device profile used hitherto, is generated.

Further, when the device profile is intended to be generated again as described above, the reprocessing control module 600 may calibrate the base LUT first, and then perform the generation. The calibration of the base LUT is processing of converting the picture data, which represents a prescribed test pattern (fourth test pattern), into ink amounts through the currently registered base LUT, causing the printer 20 to print the fourth test pattern on the designated medium by the ink amounts obtained by the color conversion, comparing the colorimetric values of the printing result and the predetermined reference values (calibration reference values), and correcting the output values (ink amounts) of the currently registered base LUT on the basis of the comparing result (color differences between the current colorimetric values and the reference values) (correcting the ink amounts through a γ curve or the like so as to suppress the color differences). The fourth test pattern described herein may be the same as, for example, the test pattern for profile generation printed in step S80 (FIG. 26) mentioned above. While executing the processing of FIG. 2 once as described above, the computer 10 acquires the calibration reference values, and stores them in the HDD 400 or the like. The test pattern for profile generation printed in step S80 (FIG. 26) mentioned above may be treated as the fourth test pattern. In this case, the colorimetric values of the respective patches, which constitute the test pattern for profile generation printed when the device profile corresponding to the designated medium is firstly generated, are set as the reference values for the next calibration. In such a manner, when the configuration is made such that the base LUT is calibrated first in step S820, it is possible to correct the outputs of the base LUT so as to cancel the deviation of the ink ejection characteristics caused by temporal change of the printer 20. Hence, by generating the device profile on the basis of the calibrated base LUT, it is possible to generate the device profile optimal for the current state of the printer 20.

In step S830, the reprocessing control module 600 determines that the setting of the printing environment in the printer 20, in particular, the setting of the paper feeding amount and/or the platen gap PG has to be adjusted, and instructs the printer adjustment module 500 to adjust the setting of the printing environment using the designated medium. In response to the instruction, the printer adjustment module 500 performs the above-mentioned setting adjustment (step S05 of FIG. 2) of the printing environment again. Here, at least either the adjustment of the setting of the paper feeding amount or the adjustment of the setting of the platen gap PG mentioned above should be performed. Thereby, the setting (correction value δ) of the paper feeding amount or the setting of the platen gap PG in the printer 20 is changed, and subsequently occurrence of banding is suppressed when the printer 20 performs printing on the designated medium.

In step S850, the reprocessing control module 600 determines whether or not a degree of change (adjustment amount) through the setting adjustment executed in step S830 is larger than a predetermined value. If it is determined that the degree of change is larger, the routine further advances to step S870. For example, when the setting of the paper feeding amount is adjusted in step S830, if the difference of the correction amounts δ before and after the adjustment (change) is larger than a predetermined value, it is determined that the adjustment amount is larger. Further, when the setting of the platen gap PG is adjusted, if the difference of the height positions of the platen 62 before and after the adjustment is larger than a predetermined distance, it is determined that the adjustment amount is larger. In step S870, the reprocessing control module 600, similarly to step S820, instructs the device profile generation module 200 to generate the device profile for the designated medium. That is, when the printing environment in the printer 20 is greatly changed to a certain extent, it can be inferred that the corresponding change has an effect on the color tones, which are printed by the printer 20, and the like. Hence, if the adjustment amount is large to a certain extent, by regenerating the device profile, it is possible to register the device profile optimal for the current state of the printer 20.

In step S840, the reprocessing control module 600 determines that the setting of the printing environment in the printer 20, in particular, the above-mentioned setting for drying of the printed picture has to be adjusted, and instructs the printer adjustment module 500 to adjust the setting of the printing environment using the designated medium. In response to the instruction, the printer adjustment module 500 performs the above-mentioned setting adjustment (step S05 of FIG. 2) of the printing environment again. Here, at least the above-mentioned setting for the drying (the setting of temperature of hot air generated by the dryer 65, the wind-power setting of hot air generated by the dryer 65, the velocity setting of movement of the printing head 59, and the like) is adjusted. Thereby, the setting for the drying in the printer 20 is changed, and subsequently ink bleeding or blurring is suppressed when the printer 20 performs printing on the designated medium.

In step S860, the reprocessing control module 600 determines whether or not a degree of change (for example, at least one of a degree of change in the setting of temperature of hot air, a degree of change in the wind-power setting of hot air, a degree of change in the velocity setting of movement of the printing head 59, and the like) through the setting adjustment executed in step S840 is larger than a predetermined value. If it is determined that the degree of change is larger, the routine further advances to step S880. In step S880, the reprocessing control module 600 activates the base LUT generation module 100 and the device profile generation module 200 so as to thereby generate the base LUT for the designated medium (step S06 of FIG. 2) and generate the subsequent device profile (step S07 of FIG. 2). That is, when the setting for the drying in the printer 20 is greatly changed to a certain extent, the amounts of the inks adhered onto the designated medium is also changed, and thus it is necessary to acquire again the duty limits for the designated medium. Accordingly, by repeating the routine starting from the base LUT generation processing and including the processing (steps S63 to S66 of FIG. 9) of acquiring the duty values of the designated medium once, when the routine up to the processing of step S07 is completed, the base LUT and device profile optimal for the current state of the printer 20 are registered.

The processing shown in FIG. 28 is an example of processing which is executed when the reprocessing control module 600 receives a low rating (negative feedback) on the printing result from a user, and there are various kinds of possible variations as to which processing is executed when a certain problem is pointed out. For example, even when the amount of adjustment is smaller than a predetermined reference (No in steps S850 and S860), a user may recheck the printing result based on the setting after the adjustment, and may input a low rating again. In this case, the device profile generation processing or the processing from the base LUT generation may be executed.

As described above, according to the embodiment, when a user arbitrarily designates a medium, even in a situation in which the forward model converter 300 and the like for the designated medium are not present, the ink amounts are optimized through the objective function E on the basis of the color prediction result and the like using the forward model converter 300 provided for limited media (substituted media), and the ink amounts determined by the optimization is converted through the conversion relationship based on the color development characteristics between the designated medium and the substituted medium, whereby it is possible to generate the base LUT defining the ink amounts optimal for the designated medium. Further, on the basis of the base LUT, it is possible to generate the device profile which defines the recording characteristics of the printer 20 for the designated medium. That is, it is possible to generate the base LUT and the device profile for a medium which is arbitrarily selected by a user in his house or working place.

Furthermore, according to the embodiment, when there is a problem in the result of the printing which is performed by the printer 20 on the basis of the device profile or the like generated by a user as described above, information on the presence of the corresponding problem is received through the UI screen (FIG. 29), and an optimal solution to cope with the received problem is automatically performed (FIG. 28). Hence, the user is able to easily obtain the base LUT or the device profile, which is optimal for the state of the user's printer 20, for the designated medium arbitrarily selected.

7. Modified Examples

The invention is not limited to the examples and the embodiments described above, and may be modified into various forms without departing from the technical scope thereof, and for example the following modifications are also possible. The embodiments and the respective modified examples can be appropriately combined.

Modified Example 1

In the embodiment, when the base LUT is generated for the basic medium, the duty limits $D_{Ij}$ recorded in the medium table MTB in advance is used. However, even when a user sets the basic medium as the designated medium, the processing (step S05 of FIG. 2) of adjusting the setting of the printing environment of the printer 20 may be executed, and the processing from steps S63 to S66 of FIG. 9 may be executed for the sake of also acquiring the duty limits $D_{Ij}$ for the basic medium again. In addition, under the constraint of the duty limits $D_{Ij}$ acquired on the basis of the test pattern which is practically printed on the basic medium by the printer 20 as described above, the base LUT for the basic medium may be generated.

Modified Example 2

In the embodiment, also considering the color development characteristics, the ink amounts $I_j$, which are registered as the output values of the base LUTs 510 and 520 through the conversion function $f_{CVj}$ ($f_{CVj}^{-1}$) represented by Expression (37), but the ink amounts $I_j$ may be converted through Expression (35) in which only the difference in duty limit between media is considered. In this case, although an error caused by the difference of the color development characteristics occurs, it is possible to create the base LUTs 510 and 520 in which the duty limits of the respective inks on the substitute medium are reflected.

Modified Example 3

FIG. 30 is a diagram illustrating the picture of the UI for medium characteristic designation. In the drawing, the color development characteristics (saturation C* values) of the substituted medium and the substitute medium are shown. Generally, when the inks with the duty limits $D_{Ij}$ are adhered onto the respective media, even if the inks are adhered by an amount equal to or larger than that, the color development is not changed. Hence, the ink amount $I_j$, at which the absolute value ($|\delta C^*/\delta I_j|$) of the slope of the C* values is equal to a predetermined reference value ($\approx 0$), may be set as the duty limit $D_{Ij}$. In the example of FIG. 30, each ink amount $I_j$, at which the absolute value ($|\delta C^*/\delta I_j|$) of the slope in the graph of the color development characteristic is equal to the reference value, is indicated by a marker (white triangle). Thereby, a user is able to recognize which ink amount $I_j$ the duty limit $D_{Ij}$ is set to. In the example of FIG. 30, it is also possible to directly designate the duty limits $D_{Ij}$ in a way that a user selects a radio button. Thereby, it is possible to cope with for example such a case where the position of the marker is apparently different from that of the ink amount $I_j$ of the color patch from which a user senses bleeding.

Modified Example 4

In the embodiment, by using the normalization ratio RW which is a ratio of the duty limit $D_{Ij}$ of the substitute medium and the reference duty limit $D_{SIj}$ of the substituted medium, the duty limit $D_{Ij}$ of the substitute medium is converted into the tentative duty limit $D_{PIj}$, but the normalization ratio RW may be determined by a different index. For example, when the absolute values of the slopes of the color development characteristics of the substituted medium and substitute medium is equal to the constant reference value ($\neq 0$), the ratio of the ink amounts $I_j$ may be set as the normalization ratio RW.

Modified Example 5

In the embodiment, the CIE-Lab color coordinate system is used as the device-independent color coordinate system, but other arbitrary device-independent color coordinate systems such as the CIE-XYZ color coordinate system and the CIE-L*u*v* color coordinate system may be used. Here, in terms of realizing smooth color reproduction, it is preferable to use the device-independent color coordinate systems which are equivalent color spates such as the CIE-Lab color coordinate system and CIE-L*u*v* color coordinate system.

Modified Example 6

In the embodiment, as the smoothing processing, the processing using the dynamic model is employed, but different type smoothing processing may be employed. For example, by measuring the spaces between the color values adjacent to each other, it is also possible to employ the smoothing processing which adjusts the individual spaces so as to approximate them to the average value thereof.

Modified Example 7

In the specification, the term "ink" is not limited to liquid ink of the sort used in inkjet printers, offset printers, and the like, but is used in a broad sense to include toners used in laser printers. It is possible to employ terms such as "color material", "coloring material", or "coloring agent" as other terms comparably broad in meaning to "ink" in this sense.

Modified Example 8

In the embodiment, the description was given of the method and the device for creating the color conversion profile like the look-up table, but it is also possible for the invention to be applied to a printing apparatus manufacturing system provided with an incorporating portion that incorporates a color conversion profile obtained in this way into the printing apparatus. The color conversion profile creation device for creating the color conversion profile may be included in this printing apparatus manufacturing system, or included in another system or device. The incorporating portion of the manufacturing system may be realized as a printer driver installer (install program), for example.

The entire disclosure of Japanese Patent Application No. 2011-041887, filed Feb. 28, 2011 is expressly incorporated by reference herein.

What is claimed is:

1. A printing control device capable of:
receiving designation of a printing medium;
adjusting a setting of a printing environment of a printing apparatus based on a printing result of a first test pattern, which is for determining whether or not the setting is appropriate, by causing at least a printing apparatus to print the first test pattern on the designated printing medium;
generating a color conversion table for the designated printing medium by determining an ink amount, which is for reproducing a color value indicated by a grid point of a device-independent color coordinate system, through ink amount optimization using an objective function, which is for rating picture quality obtained when an ink is adhered onto a basic printing medium different from the designated printing medium, after the adjusting of the setting, and by defining a correspondence relationship between a grid point of a predetermined input color coordinate system and ink amounts into which the determined ink amounts are converted on the basis of a conversion relationship between an ink color development characteristic of the basic printing medium and an ink color development characteristic of the designated printing medium; and
generating a device profile, which defines characteristics of the printing apparatus, on the basis of a colorimetric value of a second test pattern, by performing color conversion on data, which represents the second test pattern, through the generated color conversion table, and by causing the printing apparatus to print the second test pattern on the designated printing medium on the basis of the color-converted data,
wherein when receiving a prescribed low rating on the printing which is performed on the designated printing medium by the printing apparatus through printing control processing including the color conversion based on the generated device profile, in accordance with contents of the rating, the printing control device performs at least one of the adjusting of the setting, the generating of the color conversion table, and the generating of the device profile.

2. The printing control device according to claim 1, wherein in the generating of the color conversion table, the printing control device causes the printing apparatus to print a third test pattern on the designated printing medium, acquires a limit of an ink amount, which can be adhered onto the designated printing medium, and the color development characteristic of the designated printing medium on the basis of the printing result of the third test pattern, and restricts a range of the ink amounts in the case of determining the ink amount through the optimization on the basis of the limit.

3. The printing control device according to claim 1, wherein when receiving a low rating on any of color tone, granularity and gradation in the printing result, by performing the generating of the device profile, the printing control device adjusts a predetermined parameter having an effect on a conversion characteristic of the device profile in the generating of the device profile.

4. The printing control device according to claim 3, wherein when receiving the low rating, the printing control device performs color conversion on data, which represents a fourth test pattern, on the basis of the color conversion table, causes the printing apparatus to print the fourth test pattern on the designated printing medium on the basis of the color-converted data, compares a predetermined reference value with a colorimetric value of the fourth test pattern, performs calibration for correcting an ink amount, which is defined by the color conversion table, on the basis of the comparison result, and subsequently performs the generating of the device profile.

5. The printing control device according to claim 1, wherein when receiving a low rating to the effect that color unevenness is present in the printing result, the printing control device performs the adjusting of the setting, and in the adjusting of the setting, the printing control device performs processing of printing the first test pattern, which is for determining whether or not setting of an amount of feed is appropriate when the printing apparatus transports the printing medium, and adjusting the amount of feed in accordance with the printing result of the first test pattern, and/or processing of printing the first test pattern, which is for determining whether or not setting of a gap between a printing head provided in a printing apparatus and a platen on which the transported printing medium is placed is appropriate, and adjusting the gap in accordance with the printing result of the first test pattern.

6. The printing control device according to claim 1, wherein when receiving a low rating to the effect that either bleeding or blurring occurs in the printing result, the printing control device performs the adjusting of the setting, and in the adjusting of the setting, the printing control device prints the first test pattern, which is for determining whether or not setting for drying a printed picture is appropriate, and adjusts the setting for the drying in accordance with the printing result.

7. The printing control device according to claim 5, wherein when an adjustment amount is equal to or greater than a predetermined amount in the adjusting of the setting, the printing control device further performs the generating of the device profile, or performs the generating of the color conversion table and the generating of the device profile.

8. A non-transitory recording medium, having a printing control program for causing a computer to control a printing apparatus and causing the computer to execute functions of:
receiving designation of a printing medium; adjusting a setting of a printing environment of a printing apparatus based on a printing result of a first test pattern, which is for determining whether or not the setting is appropriate, by causing at least a printing apparatus to print the first test pattern on the designated printing medium;
generating a color conversion table for the designated printing medium by determining an ink amount, which is for reproducing a color value indicated by a grid point of a device-independent color coordinate system, through ink amount optimization using an objective function, which is for rating picture quality obtained when an ink is adhered onto a basic printing medium different from the designated printing medium, after the adjusting of the setting, and by defining a correspondence relationship between a grid point of a predetermined input color coordinate system and ink amounts into which the determined ink amounts are converted on the basis of a conversion relationship between an ink color development characteristic of the basic printing medium and an ink color development characteristic of the designated printing medium; and generating a device profile, which defines characteristics of the printing apparatus on the basis of a colorimetric value of a second test pattern, by performing color conversion on data, which represents the second test pattern, through the generated color conversion table, and by causing the printing apparatus to print the second test pattern on the designated printing medium on the basis of the color-converted data, wherein when receiving a prescribed low rating on the printing which is performed on the designated printing medium by the printing apparatus through printing control processing including the color conversion based on the generated device profile, in accordance with contents of the rating, the computer performs at least one of the adjusting of the setting, the generating of the color conversion table, and the generating of device profile.

* * * * *